US008351707B2

(12) United States Patent  
Sakamoto et al.

(10) Patent No.: US 8,351,707 B2  
(45) Date of Patent: Jan. 8, 2013

(54) IMAGE PROCESSING APPARATUS, IMAGE FORMING APPARATUS, IMAGE PROCESSING SYSTEM, AND IMAGE PROCESSING METHOD

(75) Inventors: Akira Sakamoto, Yamatokoriyama (JP); Hiroki Yoshino, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1196 days.

(21) Appl. No.: 12/182,938

(22) Filed: Jul. 30, 2008

(65) Prior Publication Data

US 2009/0034848 A1 Feb. 5, 2009

(30) Foreign Application Priority Data

Jul. 31, 2007 (JP) ................................. 2007-199975  
Nov. 1, 2007 (JP) ................................. 2007-285349  
May 22, 2008 (JP) ................................. 2008-134726

(51) Int. Cl.  
*G06K 9/46* (2006.01)

(52) U.S. Cl. ........ 382/195; 382/192; 382/194; 382/190; 382/270

(58) Field of Classification Search .................. 382/195, 382/194, 190, 192, 270  
See application file for complete search history.

(56) References Cited

U.S. PATENT DOCUMENTS

| 5,594,814 | A | * | 1/1997 | Fast et al. | 382/254 |
| 5,799,115 | A | | 8/1998 | Asano et al. | |
| 2002/0044688 | A1 | * | 4/2002 | Naoi et al. | 382/190 |
| 2007/0165280 | A1 | * | 7/2007 | Yago | 358/2.99 |

FOREIGN PATENT DOCUMENTS

| EP | 1914680 A1 | 4/2008 |
| JP | 08-096084 A | 4/1996 |
| JP | 8-255236 A | 10/1996 |
| WO | WO-2006/092957 A1 | 9/2006 |

* cited by examiner

*Primary Examiner* — Vikkram Bali  
*Assistant Examiner* — Ruiping Li  
(74) *Attorney, Agent, or Firm* — Birch, Stewart, Kolasch & Birch, LLP

(57) ABSTRACT

Line images in horizontal and vertical directions are detected from input image data, and an intersection of the line images is calculated. the calculated intersection is regarded as a feature point of input image data. Thus, it is possible to easily and promptly extract, from image data, a feature point that allows specifying the image data appropriately.

16 Claims, 49 Drawing Sheets

| -3 | -2 | -1 | 1 | -1 | -2 | -3 |
|---|---|---|---|---|---|---|
| -2 | -2 | 1 | 4 | 1 | -2 | -2 |
| -1 | 1 | 8 | 15 | 8 | 1 | -1 |
| 1 | 5 | 16 | 25 | 16 | 5 | 1 |
| -1 | 1 | 8 | 15 | 8 | 1 | -1 |
| -2 | -2 | 1 | 4 | 1 | -2 | -2 |
| -3 | -2 | -1 | 1 | -1 | -2 | -3 |

FIG. 8 (a)

| HASH VALUE | INDEX INDICATIVE OF DOCUMENT |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 8 (b)

| HASH VALUE | INDEX INDICATIVE OF DOCUMENT |
|---|---|
| H1 | ID1、ID1 |
| H2 | ID1 |
| H3 | ID1、ID2 |
| H4 | ID1 |
| H6 | ID1、ID2 |
| ⋮ | ⋮ |

| tan Θ | Θ |
|---|---|
| −0.17632698 | −10.0 |
| −0.17452794 | −9.9 |
| −0.17272999 | −9.8 |
| −0.17093313 | −9.7 |
| −0.16913734 | −9.6 |
| −0.16734261 | −9.5 |
| −0.16554893 | −9.4 |
| ⋮ | ⋮ |
| 0.16554893 | 9.4 |
| 0.16734261 | 9.5 |
| 0.16913734 | 9.6 |
| 0.17093313 | 9.7 |
| 0.17272999 | 9.8 |
| 0.17452794 | 9.9 |
| 0.17632698 | 10.0 |

INPUT IMAGE   EDGE-ENHANCED IMAGE

X:20 × Y:150

| Y | SUMMATION OF PROJECTED LUMINANCE | |
|---|---|---|
| 0 | 4469 | |
| 1 | 4276 | |
| 2 | 3588 | |
| 3 | 4622 | |
| ⋮ | ⋮ | |
| 88 | 4366 | |
| 89 | 4625 | |
| 90 | 3741 | |
| 91 | 2009 | MINIMUM VALUE |
| 92 | 2784 | |
| 93 | 4398 | |
| 94 | 4687 | |
| 95 | 4408 | |
| ⋮ | ⋮ | |
| 146 | 4472 | |
| 147 | 4519 | |
| 148 | 4200 | |
| 149 | 4546 | |

FIG. 36

| -1 | -2 | -3  | -2  | -1 |
|----|----|-----|-----|----|
| -2 | -12| -5  | -12 | -2 |
| -3 | -5 | 101 | -5  | -3 |
| -2 | -12| -5  | -12 | -2 |
| -1 | -2 | -3  | -2  | -1 |

FIG. 38
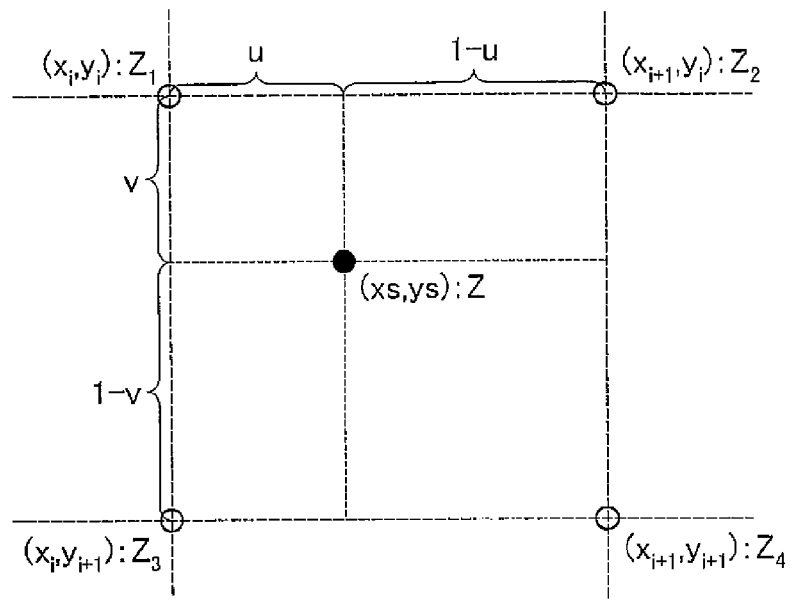
INPUT IMAGE BEFORE ROTATION
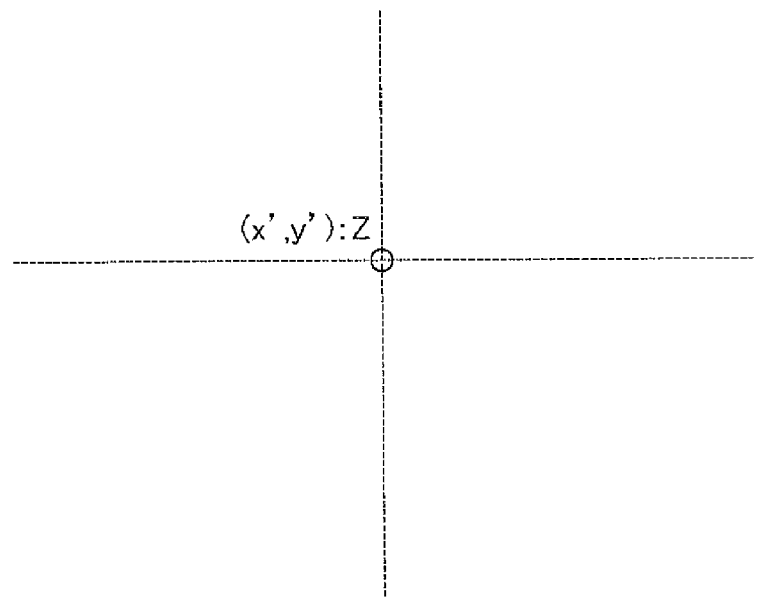
INPUT IMAGE AFTER ROTATIONAL CORRECTION FIG. 41 (a)
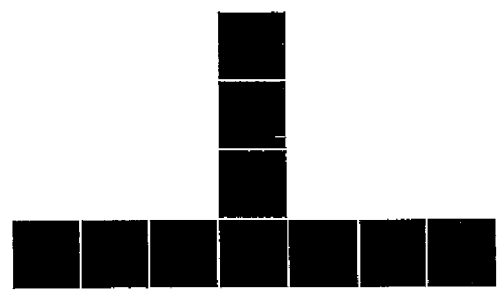
FIG. 41 (b)
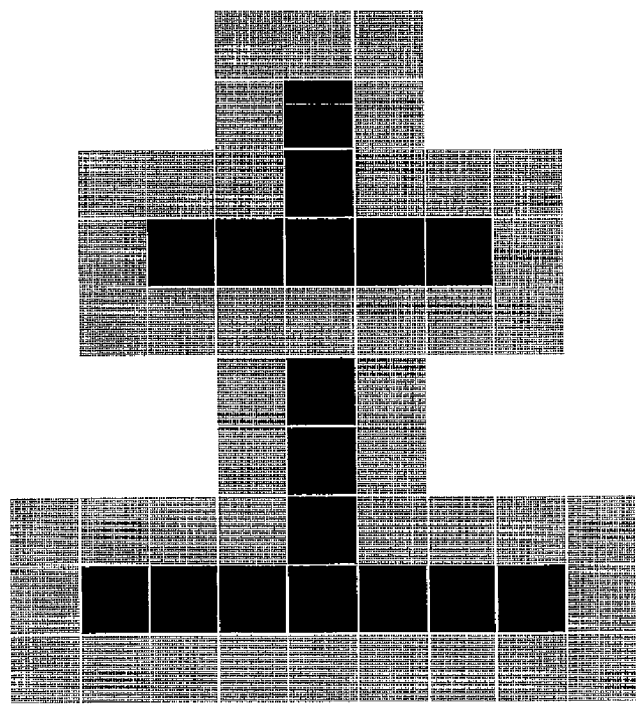

FIG. 46
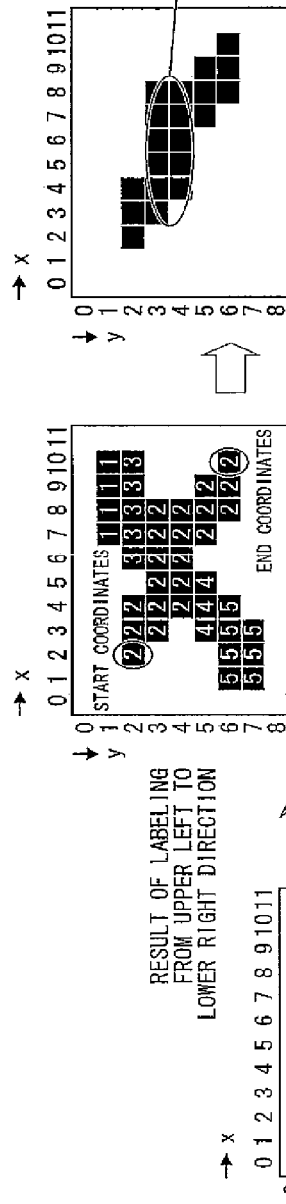
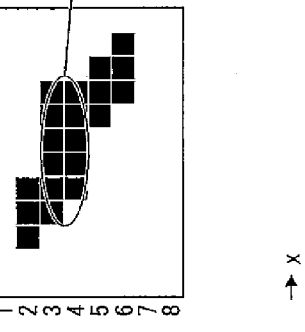
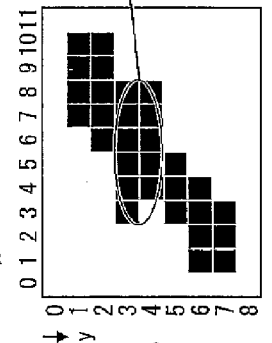
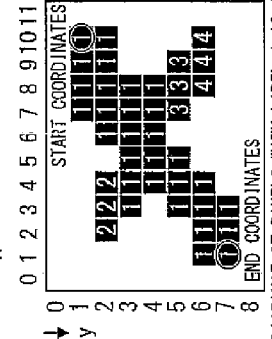

FIG. 47
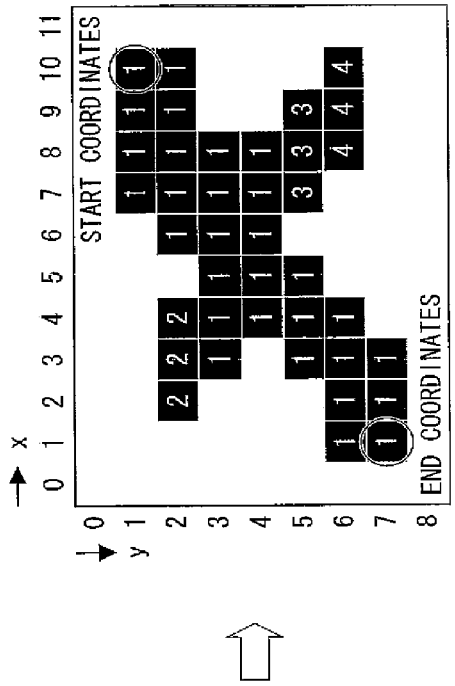
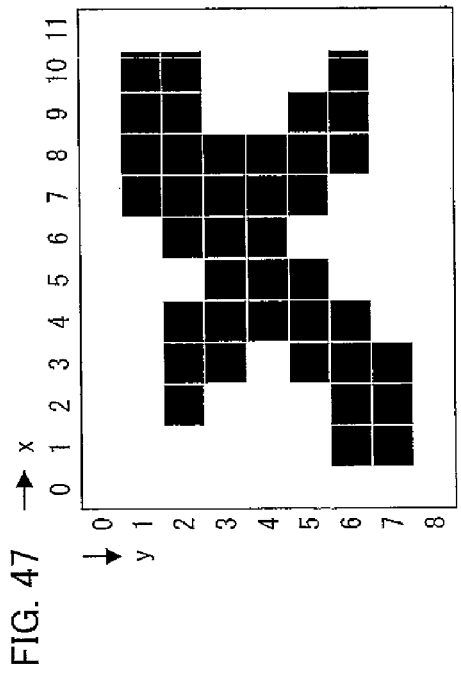
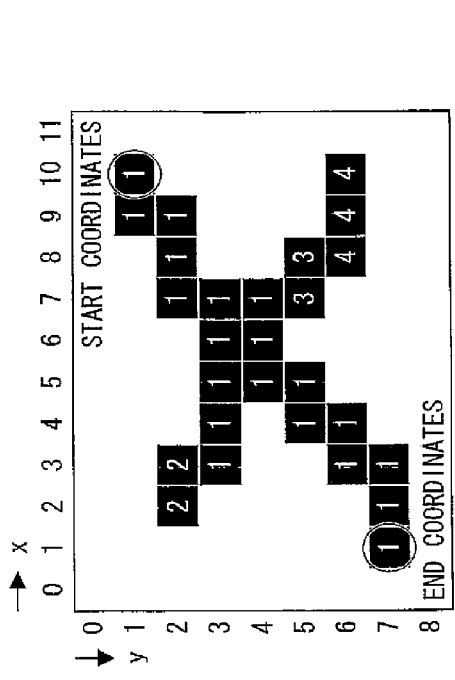
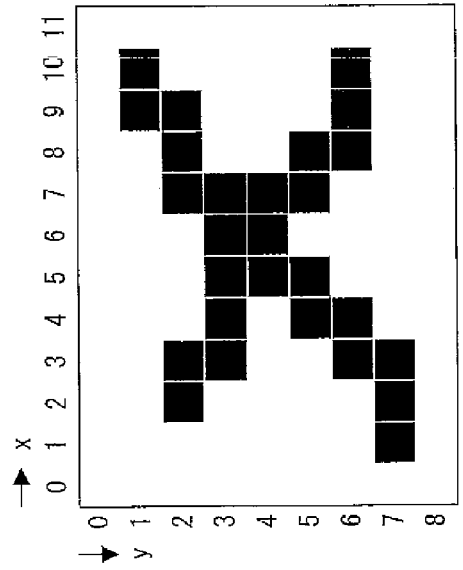

TARGET PIXEL

TARGET PIXEL

MISALIGNMENT OCCURS DUE TO FLUCTUATION IN SCANNING INPUT SIGNAL

SAME LABEL AS THAT OF UPPER LEFT PIXEL IS ASSIGNED

IMAGE PROCESSING APPARATUS, IMAGE FORMING APPARATUS, IMAGE PROCESSING SYSTEM, AND IMAGE PROCESSING METHOD

This Nonprovisional application claims priority under 35 U.S.C. §119(a) on Patent Applications No. 199975/2007 filed in Japan on Jul. 31, 2007, No. 285349/2007 filed in Japan on Nov. 1, 2007, and No. 134726/2008 filed in Japan on May 22, 2008, the entire contents of which are hereby incorporated by reference.

FIELD OF THE INVENTION

The present invention relates to: an image processing apparatus, an image forming apparatus, an image transmitting apparatus, an image reading apparatus, an image processing system, each including a features calculation section for extracting features of image data; and to an image processing method, an image processing program, and a storage medium, each allowing extraction of features of image data.

BACKGROUND OF THE INVENTION

There have been proposed various techniques for comparing (i) input image data obtained by a scanner reading a document image with (ii) a preliminarily stored image so as to determine a similarity between the input image data and the preliminarily stored image.

Examples of the method for determining a similarity include: a method in which a text image is extracted, a keyword is extracted from the text image with OCR (Optical Character Reader) so as to carry out matching with the keyword; and a method in which features of a ruled line included in an image are extracted so as to carry out matching with the features.

Further, Patent Document 1 (Japanese Unexamined Patent Publication No. Tokukaihei 8-255236 (published on Oct. 1, 1996)) discloses a technique in which texts, frames for text strings, frames etc. are recognized from an input image and matching is performed with respect to each frame based on frame information, thereby performing a format recognition of a ruled line image etc.

Further, Patent Document 2 (International Publication No. WO 2006/092957A1, pamphlet (published on Sep. 8, 2006) discloses a technique in which a centroid of a word in an English document, a centroid of a connected component of a black pixel, a closed space of a kanji character, a specific portion repeatedly appearing in an image etc. are extracted as feature points, a set of local feature points are determined out of the extracted feature points, a partial set of feature points is selected out of the determined set of local feature points, invariants relative to geometric transformation each as a value characterizing the selected partial set are calculated in accordance with plural combinations of feature points in the partial set, the calculated invariants are regarded as features, and a document matching is performed in accordance with the features.

However, the technique disclosed in Patent Document 1 requires a complex process and a long processing time since it is necessary to extract plural kinds of elements such as texts, frames for text strings, lines indicative of frames etc. from an input image and to perform matching with respect to each of the extracted elements.

Further, in a case where a centroid of a text is regarded as a feature point as in the technique of Patent Document 2, a document with a small amount of texts has a small amount of extracted feature points, resulting in low accuracy in document matching.

SUMMARY OF THE INVENTION

The present invention was made in view of the foregoing problems. An object of the present invention is to provide an image processing apparatus and an image processing method, each capable of easily and quickly extracting, from input image data, feature points that allow properly specifying the input image data.

In order to solve the foregoing problem, the image processing apparatus of the present invention is an image processing apparatus including: a feature point calculation section for calculating feature points included in input image data; and a features calculation section for calculating features of the input image data in accordance with relative positions of the feature points calculated by the feature point calculation section, the feature point calculation section including: a line detection section for detecting, from the input image data, a line image extending in a first direction and a line image extending in a second direction that is different from the first direction; and an intersection calculation section for calculating, as a feature point, an intersection of the line image extending in the first direction and the line image extending in the second direction.

In order to solve the foregoing problem, the image processing method of the present invention is an image processing method for calculating feature points of input image data and calculating features of the input image data in accordance with relative positions of the calculated feature points, the method comprising the steps of: detecting, from the input image data, a line image extending in a first direction and a line image extending in a second direction that is different from the first direction; and calculating, as a feature point, an intersection of the line image extending in the first direction and the line image extending in the second direction.

In order to solve the foregoing problem, the image processing system of the present invention is an image processing system, including: an image processing apparatus; and a server communicably connected with the image processing apparatus, a feature point calculation section for calculating feature points of input image data and a features calculation section for calculating features of the input image data in accordance with relative positions of the feature points calculated by the feature point calculation section being included in the image processing apparatus or the server, or being divided into the image processing apparatus and the server, the feature point calculation section including a line detection section for detecting a line image extending in a first direction and a line image extending in a second direction that is different from the first direction, and an intersection calculation section for calculating, as a feature point, an intersection of the line image extending in the first direction and the line image extending in the second direction.

With the image processing apparatus, the image processing method, and the image processing system, a line image extending in a first direction and a line image extending in a second direction that is different from the first direction are detected from input image data, and an intersection of the line image extending in the first direction and the line image extending in the second direction is calculated as a feature point. Thus, by regarding the intersection of the line images as a feature point, it is possible to extract a large number of feature points even in a case of input image data read out from a document with little texts, allowing appropriately specifying input image data. Further, only extraction of line images and calculation of an intersection of the line images are required, so that it is possible to simplify an algorithm for calculation of feature points and to shorten a process time for the calculation, compared with a case of calculating feature points from input image data in accordance with plural kinds of elements such as texts, frames for text strings, frames, and lines indicative of frames.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 8(a) and 8(b) are explanatory drawings each illustrating an example of a hash value stored in a hash table and an index indicative of input image data.

FIG. 20 is an explanatory drawing illustrating how to label pixels when detecting a line image extending from upper right to lower left from the input image data in FIG. 18.

FIG. 34 is an explanatory drawing illustrating an example of a tangent-angle table used in the skew detection section in the feature point calculation section in FIG. 32.

FIG. 36 is an explanatory drawing illustrating an example of an edge detection filter used in the edge detection process carried out by the skew detection section in the feature point calculation section in FIG. 32.

FIG. 38 is an explanatory drawing illustrating an example of a skew correction process carried out by a skew correction process section in the feature point calculation section in FIG. 32.

FIGS. 41(a) and 41(b) are explanatory drawings illustrating a dilation process carried out by a dilation process section in the feature point calculation section in FIG. 40.

FIG. 46 is an explanatory drawing illustrating the results of detecting line images in oblique directions from input image data in FIG. 23, and the result of calculating an intersection of the line images.

FIG. 47 is an explanatory drawing illustrating a difference in the result of detecting line images in oblique directions between a case where a line image extending from upper right to lower left is detected using a label count and a case where the line image is detected using a distance between a start coordinate and an end coordinate of the line image.

DESCRIPTION OF THE EMBODIMENTS

Embodiment 1

An embodiment of the present invention is explained below. Explained in this embodiment is a case where the present invention is applied to a digital color multi-function printer (MFP).

(1-1. Arrangement of Digital Color Multi-Function Printer 1)

Figure 2:
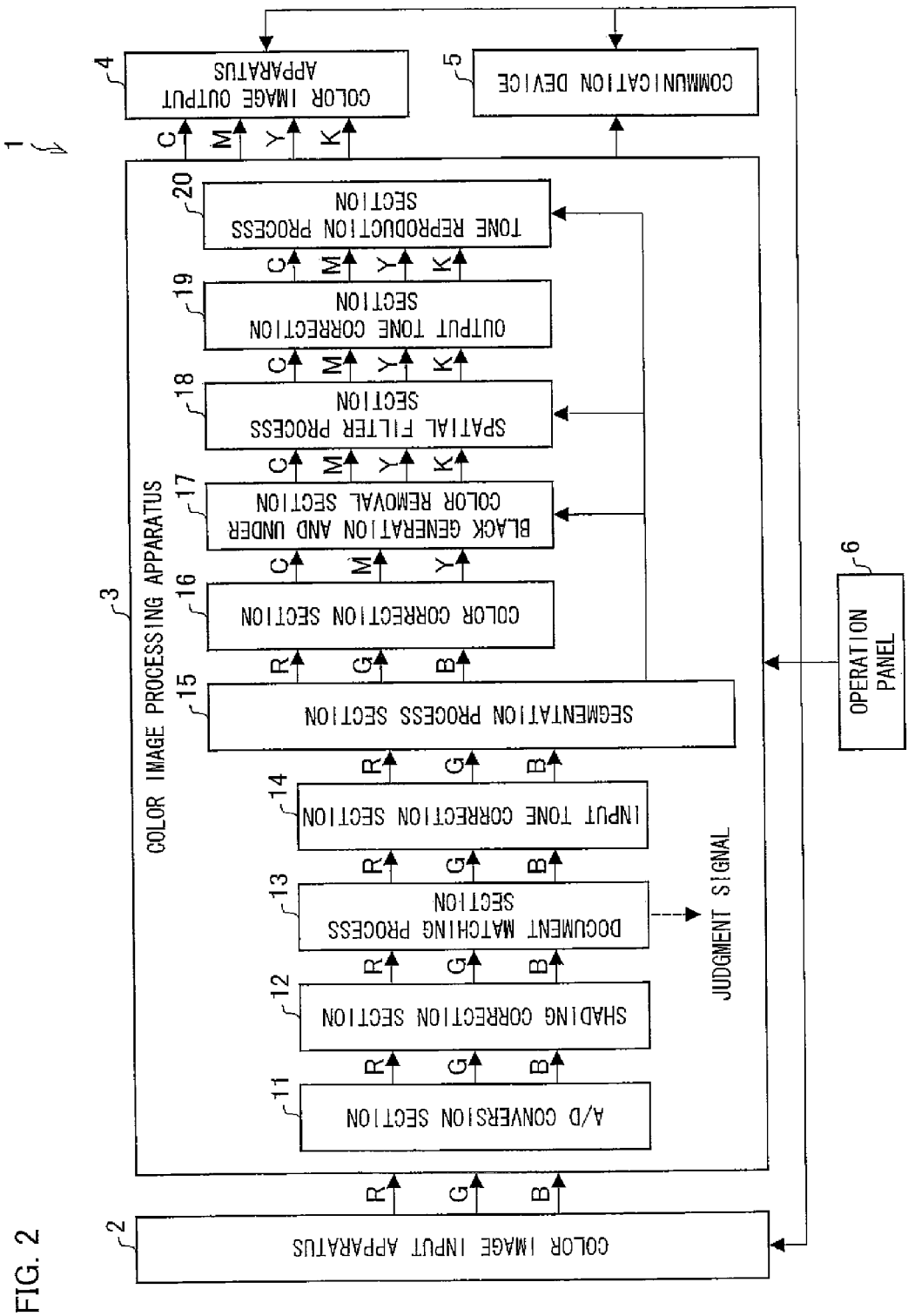
FIG. 2 is a block diagram schematically illustrating an arrangement of an image processing apparatus in accordance with an embodiment of the present invention.

FIG. 2 is a block diagram schematically illustrating an arrangement of a digital color multi-function printer (image processing apparatus, image forming apparatus, image reading apparatus) 1 according to the present embodiment. The digital color multi-function printer 1 has a copying function, a printing function, a facsimile-transmission function, a scanning function, a scan-to-E-mail function, and the like.

As illustrated in FIG. 2, the digital color multi-function printer 1 includes a color image input apparatus 2, a color image processing apparatus 3, a color image output apparatus 4, a communication device 5, and an operation panel 6.

The color image input apparatus (image reading apparatus) 2 is, for example, composed of a scanner (not shown) including a CCD (Charge Coupled Device) for converting optical information into an electric signal. The color image input apparatus 2 reads an optical image reflected from an original document as RGB (R: Red, G: Green, B: Blue) analog signals and supplies the RGB analog signals to the color image processing apparatus 3.

The color image processing apparatus 3 includes an A/D converter 11, a shading correction section 12, a document matching process section 13, an input tone correction section 14, a segmentation process section 15, a color correction section 16, a black generation and under color removal section 17, a spatial filter process section 18, an output tone correction section 19, and a tone reproduction process section 20. The analog signals read by the color image input apparatus 2 are transmitted to the A/D converter 11, the shading correction section 12, the document matching process section 13, the input tone correction section 14, the segmentation process section 15, the color correction section 16, the black generation and under color removal section 17, the spatial filter process section 18, the output tone correction section 19, and the tone reproduction process section 20 in this order in the color image processing apparatus 3. Ultimately, the analog signals are outputted to the color image output apparatus 4 as CMYK digital color signals.

The A/D (Analog/Digital) converter 11 converts the RGB analog signals into RGB digital signals.

The shading correction section 12 removes various distortions produced in an illumination system, an image focusing system, and an image sensing system of the color image input apparatus 2 from the RGB digital signals transmitted from the A/D converter 11. Moreover, the shading correction section 12 adjusts color balance of the RGB digital signals and converts each signal into a signal such as a density (pixel value) signal which can be processed easily by an image processing system used in the color image processing apparatus 3.

The document matching process section 13 extracts a feature point from input image data, and calculates features in accordance with the extracted feature point. Further, the document matching process section 13 causes the calculated features to be stored in a later-mentioned hash table in such a manner that the features are related to image data. Further, the document matching process section 13 compares the calculated features with features of a reference image stored in the hash table so as to determine a similarity between an input image and a reference image. Further, the document matching process section 13 outputs the inputted RGB signals to the subsequent input tone correction section 14 without any modification. Note that, the document matching process section 13 will be detailed later.

The input tone correction section 14 removes background color (density component of the background: background density) from the RGB signals whose various distortions have been removed by the shading correction section 12, and adjusts image quality such as contrast.

The segmentation process section 15 separates each pixel of an input image into either one of a text region, a halftone dot region, or a photograph (continuous tone) region, according to the RGB signals. On the basis of a result of the separation, the segmentation process section 15 outputs a segmentation class signal, indicating which region a pixel of the input image belongs to, to the color correction section 16, the black generation and under color removal section 17, the spatial filter process section 18, and the tone reproduction process section 20. The segmentation process section 15 also outputs the input signal as received from the input tone correction section 14 to the subsequent color correction section 16 without any modification.

The color correction section 16 removes color impurity on the basis of spectral characteristics of CMY (C: Cyan, M: Magenta, and Y: Yellow) color materials including an unnecessarily absorption component, in order to realize a faithful color reproduction.

The black generation and under color removal section 17 performs (i) black generation processing for generating a black (K) signal from three color (CMY) signals after the color correction processing and (ii) generation processing of new CMY signals by removing the K signal obtained by the black generation processing from the original CMY signals. As a result, the three CMY signals are converted into four CMYK signals.

With the use of a digital filter, the spatial filter process section 18 performs a spatial filter process on the basis of a segmentation class signal, with respect to the image data which is received in the form of the CMYK signals from the black generation and under color removal section 17. In the spatial filter process, the spatial filter process section 18 corrects a spatial frequency characteristic, so as to reduce blur or granularity deterioration in an output image. The tone reproduction process section 20, as with the spatial filter process section 18, performs a predetermined process with respect to the image data in the form of the CMYK signals, on the basis of the segmentation class signal.

For example, in the region separated into a text region by the segmentation process section 15, the spatial filter process section 18 strongly emphasizes a high frequency component in an edge enhancement process of a spatial filter process, in order to improve reproducibility of a black text or a color text especially. Concurrently, the tone reproduction process section 20 selects either a binarization process or a multi-level dithering process on a high-resolution screen suitable for reproducing the high frequency component.

In the region separated into a halftone dot region by the segmentation process section 15, the spatial filter process section 18 performs a low pass filter processing for removing an input halftone dot component. The output tone correction section 19 performs the output tone correction processing in which a signal such as a density signal is converted into a halftone dot area rate that is characteristics of the color image output apparatus 4. Subsequently, the tone reproduction process section 20 performs the tone reproduction processing (halftone generation) so that, ultimately, an image is segmented into pixels and each tone of the pixels can be reproduced. In the region separated into a photograph region by the segmentation process section 15, the binarization process or the multi-level dithering process is performed on a screen suitable for tone reproduction.

The image data which has been subjected to each of the processing mentioned above is temporarily stored in a storage device (not shown). The image data is read from the storage device at a predetermined timing and supplied to the color image output apparatus 4.

The color image output apparatus 4 outputs the image data supplied from the color image processing apparatus 3 to a recording medium such as paper. The color image output apparatus 4 is not particularly limited and may be a color image output apparatus which uses an electrophotographic method or an ink-jet method.

The communication device 5 is composed of a modem or a network card for example. The communication device 5 communicates with other apparatus connected to a network (e.g., a personal computer, a server, other digital color multi-function printer, a facsimile and the like) via a network card, a LAN cable, and the like.

Note that, in case of transmitting image data, the communication device 5 carries out a transmission procedure to secure a state where transmission can be performed, and then reads out, from a memory, the image data compressed in a predetermined format (image data scanned by a scanner) and carries out necessary processing such as conversion of the encoding format so as to sequentially transmit the image data via a communication line.

Further, in case of receiving image data, the communication device 5 carries out a communication procedure and receives the image data from an originating communication device so as to input the image data to the color image processing apparatus 3. The received image data is subjected to a predetermined process such as a decoding process, a rotation process, a resolution conversion process, output tone correction, and a tone reproduction process by the color image processing apparatus 3, and the image data thus processed is outputted by the color image output apparatus 4. Note that, the present invention may be arranged so that the received image data is stored in a storage device (not shown) and the stored image data is read out by the color image processing apparatus 3 as necessary so as to be subjected to the aforementioned processing.

The operation panel 6 includes, for example, a display section (not shown) such as a liquid crystal display and setting buttons (not shown). The operation panel 6 causes the display section to display information corresponding to an instruction of a main control section (not shown) of the digital color multi-function printer 1 and transmits information, inputted by the user with use of the setting buttons, to the main control section. The user can input, from the operation panel 6, processing requests (e.g., a processing mode (copy, printing, transmission, editing, a feature point calculation method carried out by an intersection calculation section 45 (whether extraction of a line image in an oblique direction is necessary or not) and the like), the number of images to be processed (the number of images to be copied, the number of images to be printed), a destination of input image data, and the like) with respect to the image data. The main control section is composed of a CPU (Central Processing Unit) and the like for example. In accordance with a program or various data stored in a ROM (not shown) or the like and information which is entered from the operation panel 6, the main control section controls each operation of each section of the digital color multi-function printer 1.

(1-2 Document Matching Process Section 13)

Next explained is the document matching process section 13 in detail. The document matching process section 13 according to the present embodiment extracts plural feature points from the input image data, determines a set of local feature points relative to each of the extracted feature points, selects a partial set of feature points out of the determined set of local feature points, calculates invariants each of which is relative to geometric transformation as a value characterizing the selected partial set in accordance with plural combinations of feature points in the partial set, calculates a hash value (features) by combining the calculated invariants, and votes for a reference image corresponding to the hash value, thereby retrieving a reference image similar to the input image data and carrying out a similarity determination process (whether there is any similarity or not) with respect to the reference image. Further, it is possible to cause the calculated hash value to be stored in the hash table in such a manner that the calculated hash value is related to the image from which the hash value was extracted.

Figure 1:
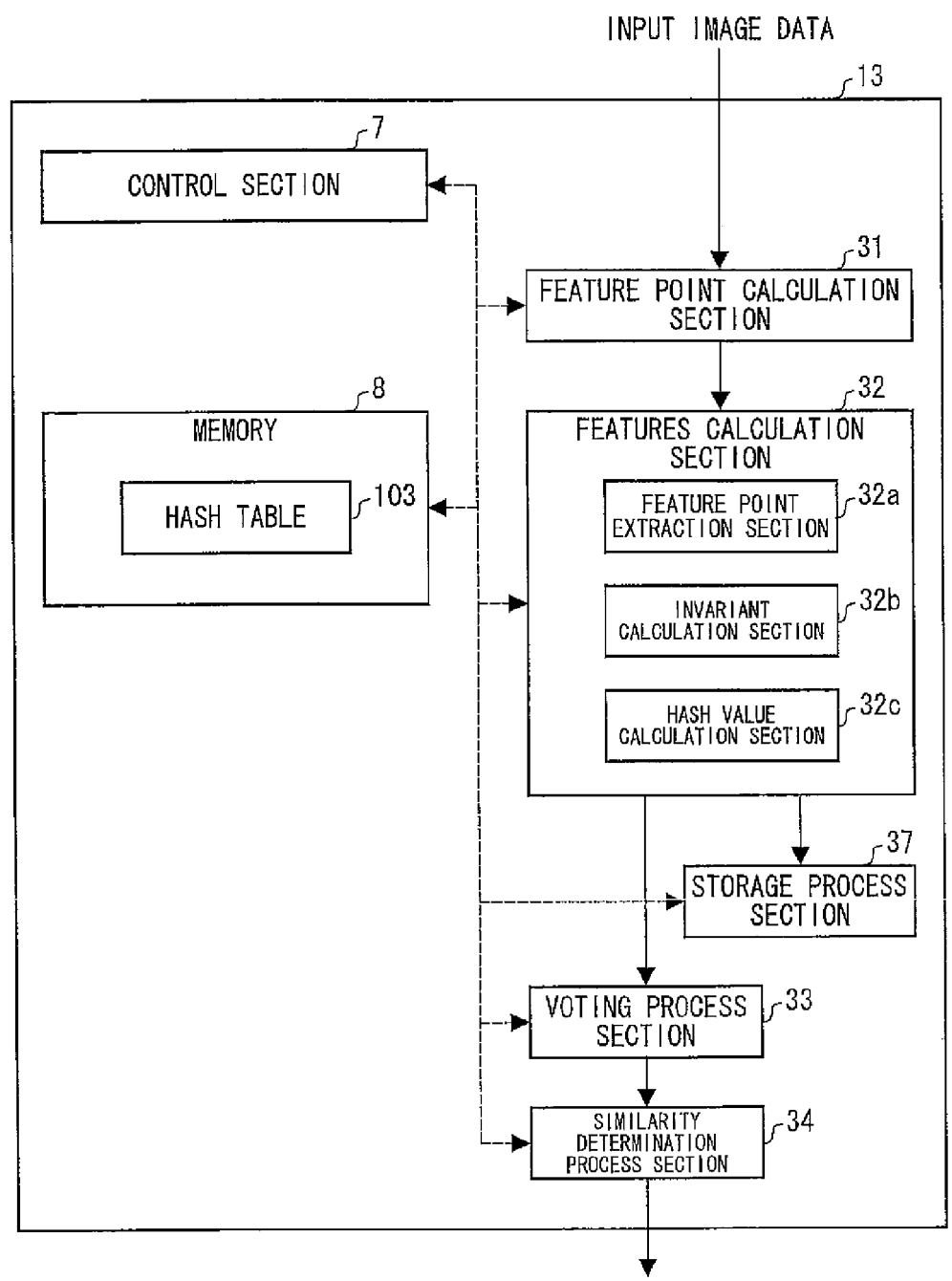
FIG. 1 is a block diagram schematically illustrating an arrangement of a document matching process section included in an image processing apparatus in accordance with an embodiment of the present invention.

FIG. 1 is a block diagram schematically illustrating an arrangement of the document matching process section 13. As illustrated in FIG. 1, the document matching process section 13 includes a pre-process section 30, a feature point calculation section (feature point extracting section) 31, a features (feature vectors) calculation section 32, a voting process section 33, a similarity determination process section 34, a storage process section 37, a control section 7, and a memory 8.

The control section 7 controls operations of the sections of the document matching process section 13. Note that, the control section 7 may be provided in the main control section for controlling operations of the sections of the digital color multi-function printer 1 or may be provided separately from the main control section so as to cooperate with the main control section in controlling operations of the document matching process section 13.

Further, in the memory 8, there is provided a hash table 103 for storing an index for specifying a reference image and features extracted from the reference image in such a manner that the index and the features are related to each other. Further, in the memory 8, there are provided not only the hash table 103 but also a storage section in which various data used in processes of the sections of the document matching process section 13 and results of the processes etc. are stored. The hash table 103 will be detailed later.

The feature point calculation section 31 extracts line images from an image, such as a text and a line, included in input image data, and calculates an intersection of the line images.

Figures 3, 4:
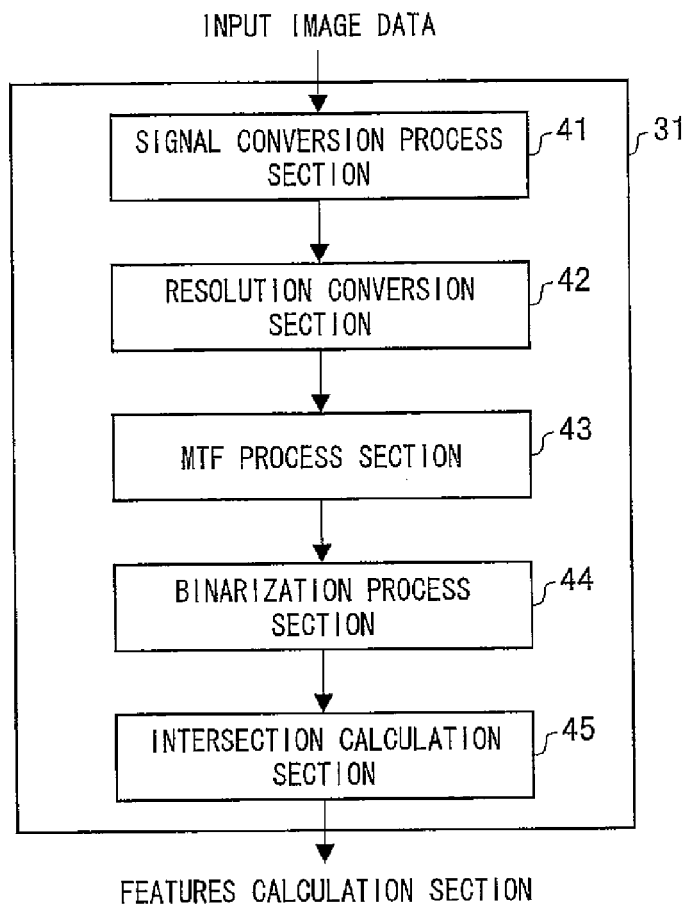
FIG. 3 is a block diagram schematically illustrating a feature point calculation section included in the document matching process section in FIG. 1.
FIG. 4 is an explanatory drawing illustrating an example of filter coefficients for a mixing filter included in an MTF process section of the feature point calculation section in FIG. 3.

FIG. 3 is a block diagram schematically illustrating an arrangement of the feature point calculation section 31. As illustrated in FIG. 3, the feature point calculation section 31 includes a signal conversion process section 41, a resolution conversion section 42, an MTF process section 43, a binarization process section 44, and the intersection calculation section 45.

In case where image data (RGB signals) inputted from the shading correction section 12 is a color image, the signal conversion process section 41 achromatizes the image data and converts the achromatized image data into a lightness signal or a luminance signal.

For example, the signal conversion process section 41 converts the RGB signals into a luminance signal Y in accordance with the following expression.

$$Yi = 0.30Ri + 0.59Gi + 0.11Bi$$

"Y" refers to a luminance signal of each pixel, and each of R, G, and B is a color component of the RGB signals, and "i" subsequently added to "Y", "R", "G", and "B" represents a value given to each pixel (i is an integer not less than 1).

Alternatively, the RGB signals may be converted into CIE1976L*a*b* signal (CIE: Commission International de l'Eclairage, L*: lightness, a*, b*: chromaticity).

The resolution conversion section 42 scales up/down the input image data. For example, in case where the input image data is optically scaled up/down by the image input apparatus 2, the resolution conversion section 42 scales up/down the input image data again so as to have a predetermined resolution. Further, in order to reduce processes carried out by the subsequent process sections, the resolution conversion section 42 may convert resolution so as to make the resolution lower than a resolution in being scanned by the image input apparatus 2 at an equal scale factor (for example, image data scanned at 600 dpi (dot per inch) is converted into data of 300 dpi or a similar operation is carried out).

The MTF (modulation transfer function) process section 43 is used to cover (adjust) unevenness of spatial frequency characteristics among a plurality of color image input apparatuses 2. In the image signal outputted from the CCD, MTF deterioration occurs due to an optical component such as a lens or a mirror, an aperture in a light receiving surface of the CCD, transfer efficiency or afterimage, storage effect or scanning unevenness caused by physical scanning, and a similar cause. The MFT deterioration causes the scanned image to blur. The MTF process section 43 carries out an appropriate filtering process (emphasizing process) so as to recover the blur caused by the MTF deterioration. Further, the MTF process section 43 is used also to suppress a high frequency component that is unnecessary in a later-mentioned feature point extracting process. That is, a mixing filter (not shown) is used to carry out an emphasizing process and a smoothing process. Note that, FIG. 4 illustrates an example of a filter coefficient of the mixing filter.

The binarization process section 44 compares achromatized image data (luminance value (luminance signal) or brightness value (brightness signal)) with a predetermined threshold value so as to binarize the image data.

The intersection calculation section 45 extracts line images from binarized image data and outputs an intersection of the extracted line images as a feature point to the features calculation section 32. The process in the intersection calculation section 45 will be detailed later.

The features calculation section 32 includes a feature point extraction section 32a, an invariant calculation section 32b, and a hash value calculation section 32c. A feature point calculated by the feature point calculation section 31 is used to calculate features (hash value and/or invariant) which are invariable relative to geometric transformation such as rotation, parallel shift, scaling up, scaling down, and the like of a document image.

Figure 5:
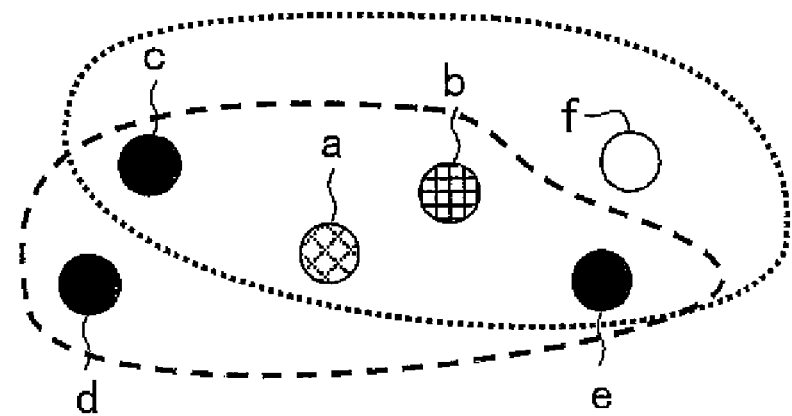
FIG. 5 is an explanatory drawing illustrating examples of a target feature point and peripheral feature points that are extracted at a time when a features calculation section in the document matching process section in FIG. 1 calculates features.

As illustrated in FIG. 5, the feature point extraction section 32a regards only one feature point as a target feature point and sequentially extracts peripheral feature points around the target feature point in such order that a feature point nearer to the target feature point is more preferentially extracted so as to extract a predetermined number of feature points (four feature points herein). In FIG. 5, four feature points b, c, d, and e are extracted as peripheral feature points in case where a feature point a is regarded as a target feature point, and four feature points a, c, e, and f are extracted as peripheral feature points in case where a feature point b is regarded as a target feature point.

Figure 6:
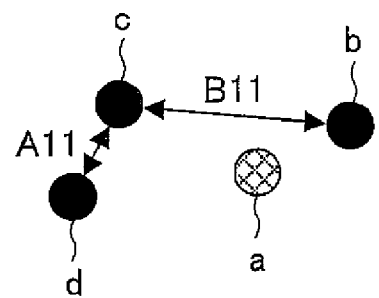
FIGS. 6(a) to 6(c) are explanatory drawings each illustrating an example of a combination of a target feature point and peripheral feature points that are extracted at a time when the features calculation section calculates features.
Figure 6:
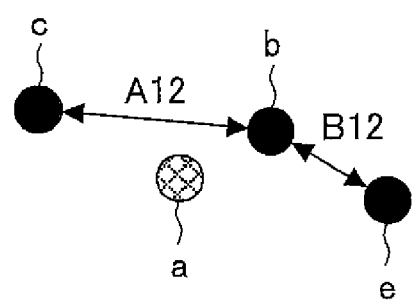
Figure 6:
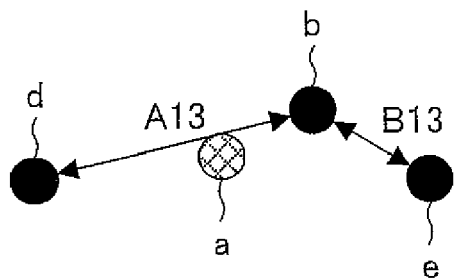

Further, the feature point extraction section 32a extracts a combination of three points which can be selected from the four peripheral feature points extracted in the foregoing manner. For example, as illustrated in FIGS. 6(a) to 6(c), in case where the feature point a in FIG. 5 is regarded as a target feature point, a combination of three feature points out of b, c, d, and e, that is, a combination of peripheral feature points b, c, and d, a combination of peripheral feature points b, c, and e, and a combination of peripheral feature points c, d, and e are extracted.

Next, the invariant calculation section 32b calculates an invariant (one of features) Hij of the extracted combination relative to geometrical transformation. Herein, "i" represents the number of target feature point(s) (i is an integer not less than 1), and "j" represents the number of combinations of three peripheral feature points (j is an integer not less than 1). In the present embodiment, a ratio of lengths of two lines connecting the peripheral feature points is set as the invariant Hij. Note that, the lengths of the lines are calculated in accordance with coordinates of the peripheral feature points. For example, in FIG. 6(a), when a length of a line connecting the feature point c and the feature point d is A11 and a length of a line connecting the feature point c and the feature point b is B11, the invariant H11 is such that H11=A11/B11. Further, in FIG. 6(b), when a length of a line connecting the feature point c and the feature point b is A12 and a length of a line connecting the feature point b and the feature point e is B12, the invariant H12 is such that H12=A12/B12. Further, in FIG. 6(c), when a length of a line connecting the feature point d and the feature point b is A13 and a length of a line connecting the feature point b and the feature point e is B13, the invariant H13 is such that H13=A13/B13. In this manner, the invariants H11, H12, and H13 are calculated in the examples illustrated in FIGS. 6(a) to 6(c).

Next, the hash value calculation section 32c calculates a remainder of $(Hi1\times10^2+Hi2\times10^1+Hi3\times10^0)/D$ as a hash value (one of features) Hi and stores the calculated Hi into the memory 8. Note that, D is a constant number which is set beforehand according to a range which is to be set as a remainder value range.

Note that, how to calculate the invariant Hij is not particularly limited. For example, a value calculated in accordance with a compound ratio of five points in the vicinity of the target feature point, or a value calculated in accordance with a compound ratio of five points extracted from n points in the vicinity of the target feature point (n is such an integer that $n\geq5$), or a value calculated in accordance with an arrangement of m points extracted from n points in the vicinity of the target feature point (m is such an integer that $m<n$ and $m\geq5$) and a compound ratio of five points extracted from the m points may be set as the invariant Hij relative to the target feature point. Note that, the compound ratio is a value calculated from four points in a straight line or from five points on a plane and is known as an invariant relative to projective transformation which is a kind of geometric transformation.

Further, calculation of the hash value Hi is not limited to calculating a remainder of the expression $(Hi1\times10^2+Hi2\times10^1+Hi3\times10^0)/D$ and regarding the remainder as the hash value Hi, and other hash function (for example, any one of hash functions mentioned in Patent Document 2) may be used.

Further, when extraction of peripheral feature points around a target feature point and calculation of the hash value Hi are completed, each section of the features calculation section 32 focuses on another feature point to change the target feature point and performs extraction of peripheral feature points and calculation of a hash value. In this manner, each section of the features calculation section 32 calculates hash values corresponding to all the feature points.

Figure 7:
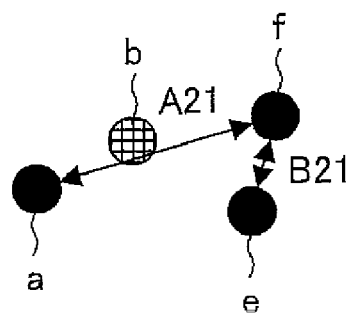
FIGS. 7(a) to 7(c) are explanatory drawings each illustrating an example of a combination of a target feature point and peripheral feature points that are extracted at a time when the features calculation section calculates features.
Figure 7:
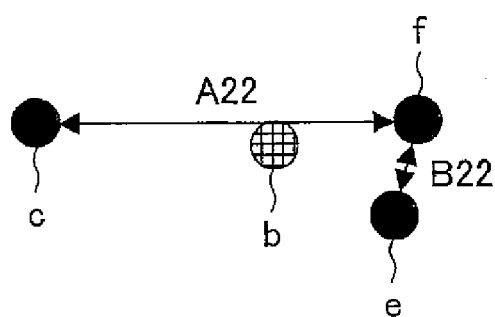
Figure 7:
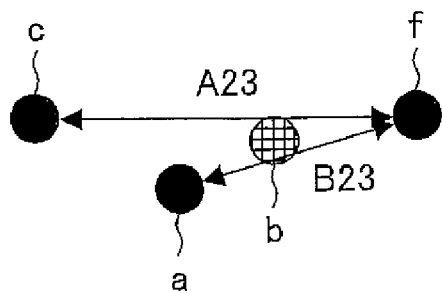

In FIG. 5, when extraction of peripheral feature points around a feature point a regarded as a target feature point and calculation of a hash value are completed, peripheral feature points around a feature point b regarded as a target feature point are extracted and a hash value is calculated. In FIG. 5, four feature points a, c, e, and f are extracted as peripheral feature points in case where the feature point b is regarded as a target feature point. Further, as illustrated in FIGS. 7(a) to 7(c), a combination of three points (peripheral feature points a, e, and f, peripheral feature points c, e, and f, peripheral feature points a, c, and f) selected from the peripheral feature points a, c, e, and f is extracted and a hash value corresponding to the combination is calculated, and the calculated hash value is stored in the memory 8. Further, this process is repeated so as to correspond to the number of the feature points, thereby calculating hash values corresponding to the respective feature points each of which is regarded as the target feature point. Then, the calculated hash values are stored in the memory 8.

Note that, how to calculate the invariant when the feature point a is regarded as the target feature point is not limited to the aforementioned manner. For example, it may be so arranged that: as illustrated in FIG. 30(a) to FIG. 30(d), in case where the feature point a illustrated in FIG. 5 is regarded as the target feature point, four peripheral feature points b, c, d, and e that are nearest to the feature point a are selected, a combination of three points out of the selected peripheral feature points b, c, d, and e, that is, a combination of peripheral feature points b, c, and d, a combination of peripheral feature points b, c, and e, a combination of peripheral feature points b, d, and e, and a combination of peripheral feature points c, d, and e are extracted, and an invariant (one of features) Hij relative to geometric transformation is calculated with respect to each of the extracted combinations. In this case, the invariant may be calculated through the same method as the aforementioned method.

Figure 30:
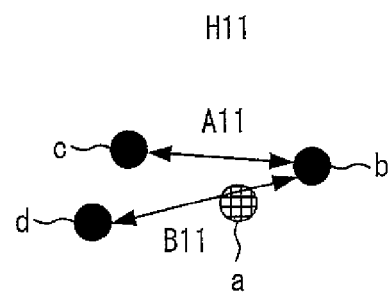
FIGS. 30(a) to 30(d) are explanatory drawings each illustrating an example of a combination of a target feature point and peripheral feature points that are extracted at a time when the features calculation section in the image processing apparatus in accordance with an embodiment of the present invention calculates features.
Figure 30:
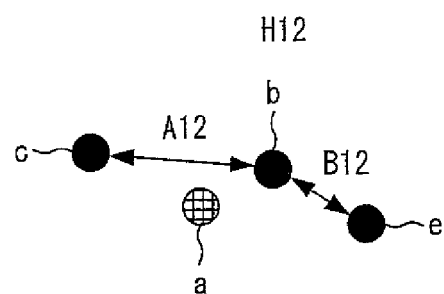
Figure 30:
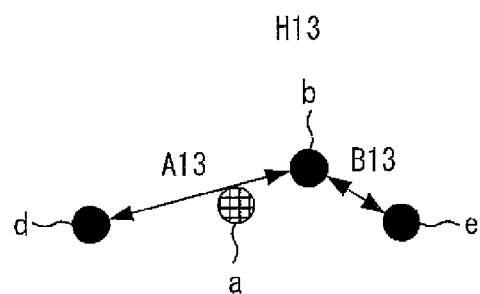
Figure 30:
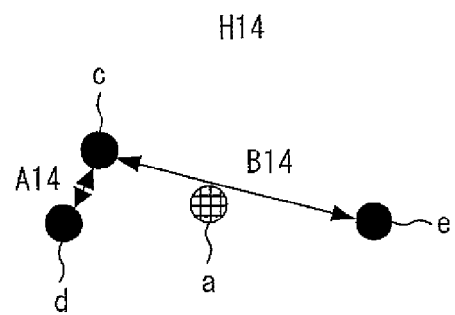
Figure 31:
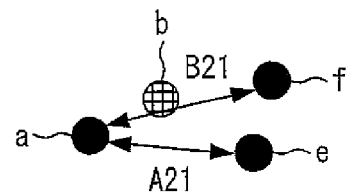
FIGS. 31(a) to 31(d) are explanatory drawings each illustrating an example of a combination of a target feature point and peripheral feature points that are extracted at a time when the features calculation section in the image processing apparatus in accordance with an embodiment of the present invention calculates features.
Figure 31:
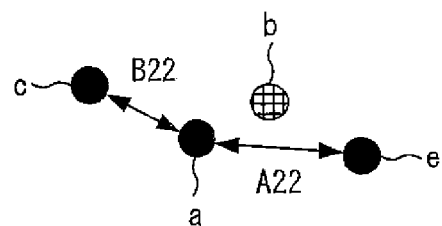
Figure 31:
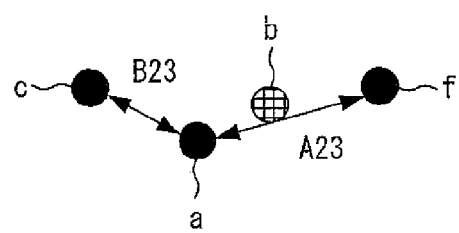
Figure 31:
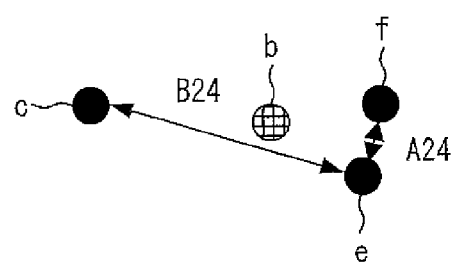

For example, it may be so arranged that: a line connecting a peripheral feature point nearest to the target feature point and a peripheral feature point secondarily nearest to the target feature point is Aij and a line connecting the peripheral feature point nearest to the target feature point and a peripheral feature point thirdly nearest to the target feature point is Bij, and the invariant Hij=Aij/Bij. In the example of FIG. 30(a), when the line connecting the peripheral feature point b and the peripheral feature point c is A11 and the line connecting the peripheral feature point b and the peripheral feature point d is B11, invariant H11=A11/B11. Further, in the example of FIG. 30(b), when the line connecting the peripheral feature point b and the peripheral feature point c is A12 and the line connecting the peripheral feature point b and the peripheral feature point e is B12, invariant H12=A12/B12. Further, in the example of FIG. 30(c), when the line connecting the peripheral feature point b and the peripheral feature point d is A13 and the line connecting the peripheral feature point b and the peripheral feature point e is B13, invariant H13=A13/B13. Further, in the example of FIG. 30(d), when the line connecting the peripheral feature point c and the peripheral feature point d is A14 and the line connecting the peripheral feature point c and the peripheral feature point e is B14, invariant H14=A14/B14.

Further, it may be so arranged that: in case where the feature point b illustrated in FIG. 5 is regarded as the target feature point, as illustrated in FIGS. 31(a) to 31(d), four peripheral feature points that are nearest to the feature point b are selected, a combination of three points (peripheral feature points a, e, and f, peripheral feature points a, c, and c, peripheral feature points a, f, and c, peripheral feature points e, f, and c) is extracted from the four feature points a, c, e, and f, and an invariant Hij relative to geometric transformation is calculated with respect to each combination. The method for calculating a hash value based on an invariant may be the same as the aforementioned method. That is, a remainder of (Hi1× $10^3$+Hi2×$10^2$+Hi3×$10^1$+Hi4×$10^0$)/D is calculated as a hash value, and the calculated hash value is stored in the memory 8.

Further, in the aforementioned example, a line connecting a peripheral feature point nearest to the target feature point and a peripheral feature point secondarily nearest to the target feature point is Aij and a line connecting the peripheral feature point nearest to the target feature point and a peripheral feature point thirdly nearest to the target feature point is Bij, but the definition is not limited to this. For example, the lines used to calculate the invariant Hij may be set in any manner as in such a manner that the lines are set in accordance with a length of each of lines connecting the peripheral feature points.

Note that, in case of storing the input image data as a reference image, the features calculation section 32 transmits the hash value (features) calculated in the foregoing manner and corresponding to each feature of the input image data to the storage process section 37. Further, in case of determining whether input image data is image data of a reference image having been already stored (similarity determination process), the features calculation section 32 transmits the hash value calculated in the foregoing manner and corresponding to each feature of the input image data to the voting process section 33.

The storage process section 37 sequentially stores (i) hash values calculated by the features calculation section 32 and corresponding to the respective feature points and (ii) indices (document IDs) each indicative of a document (input image data) to the hash table 103 provided in the memory 8 in such a manner that the hash values and the indices are related to each other (see FIG. 8(a)). In case where the hash values have already been stored, the document IDs are stored with them respectively corresponding to the hash values. Document IDs are serially assigned to respective documents without any duplication. Note that, in case where the number of documents stored in the hash table 103 is larger than a predetermined value (for example, 80% of the number of documents which can be stored), old document IDs may be searched and sequentially deleted. Further, the deleted document IDs may be reused as document IDs of new input image data. Further, in case where the calculated hash values are identical with each other (H1=H5 in FIG. 8(b)), these values may be collectively stored into the hash table 103.

Figure 9:
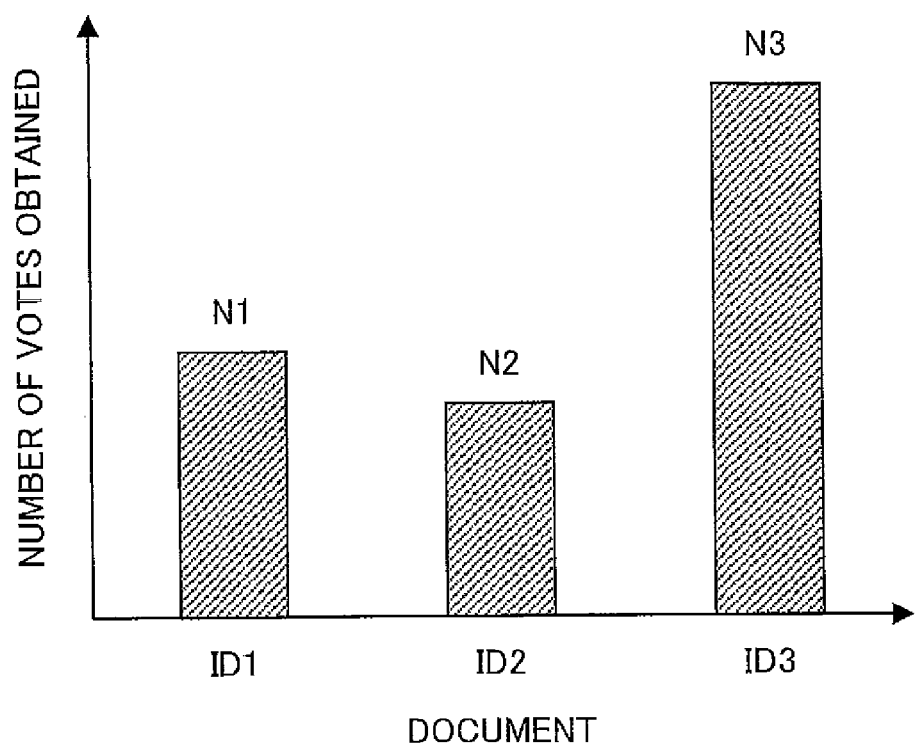
FIG. 9 is a graph showing an example of the number of votes for each reference image in a voting process section included in the document matching process section in FIG. 1.

The voting process section 33 compares the hash value calculated from the input image data and corresponding to each feature point with the hash value stored in the hash table 103 so as to vote for a reference image having the same hash value. In other words, there is counted the number of times the same hash value as a hash value of the reference image is calculated from the input image data for each reference image, and the counted number is stored in the memory 8. FIG. 9 is a graph illustrating an example of the number of votes for reference images ID1, ID2, and ID3.

The similarity determination process section 34 reads out a vote result of the voting process section 33 (an index of each reference image and the number of votes for each reference image: a similarity) from the memory 8, and extracts the maximum number of votes obtained and an index of a reference image with the maximum number of votes obtained.

Further, the similarity determination process section 34 compares the maximum number of votes obtained with a predetermined threshold value THa so as to determine whether there is any similarity or not (whether the input image data is identical with image data of the reference image or not), and sends a determination signal indicative of the determination result to the control section 7. That is, in case where the maximum number of votes obtained is not less than the predetermined threshold value THa, it is determined that "there is a similarity (the input image data is identical with image data of the reference image)", and in case where the maximum number of votes is less than the threshold value THa, it is determined that "there is no similarity (the input image data is not identical with image data of the reference image)."

Alternatively, it may be so arranged that: the similarity determination process section 34 divides the number of votes obtained for each reference image by a total number of votes (total number of feature points extracted from the input image data) and normalizes the result so as to calculate the similarity, thereby comparing the similarity with the predetermined threshold value THa (80% of the number of total votes for example) to determine the similarity.

Further, it may be so arranged that: the similarity determination process section 34 divides the number of votes obtained for each reference image by the number of times of storing a hash value (maximum number of times a hash value is stored) corresponding to a reference image whose hash value is most frequently stored and normalizes the result so as to calculate the similarity, thereby comparing the similarity with the predetermined threshold value THa (80% of the number of total votes for example) to determine the similarity. That is, in case where the calculated similarity is not less than a threshold value THa, it is determined that "there is a similarity", and in case where the calculated similarity is less than the threshold value THa, it is determined that "there is no similarity." Note that, in this case, the total number of hash values extracted from the input image data may be larger than the maximum number of times of storing a hash value (particularly, a case where the document and/or the reference image partially has a handwritten part), so that the calculated value of the similarity may exceed 100%.

Further, the threshold value THa in determining the similarity may be constant for each reference image or may be set for each reference image in accordance with importance or the like of the reference image. As to the importance of the reference image, for example, a paper currency, a valuable stock certificate, a top-secret document, a restricted document, and the like are regarded as having maximum importance, and a secret document is regarded as being less important than a paper current or the like. In this manner, the importance may be set by stages according to each reference image. In this case, a weighting coefficient according to importance of a reference image is stored in the memory 8 with the weighting coefficient corresponding to an index of the reference image, and the similarity determination process section 34 determines the similarity by using the threshold value THa corresponding to the reference image with the maximum number of votes obtained.

Further, it may be so arranged that: in determining the similarity, the threshold value THa is made constant and the number of votes for each reference image (the number of votes obtained for each reference image) is multiplied by a weighting coefficient of each reference image so as to determine the similarity. In this case, the weighting coefficient according to the importance of each reference image is stored in the memory 8 with the weighting coefficient corresponding to an index of each reference image, and the similarity determination process section 34 calculates a corrected number of obtained votes by multiplying the number of obtained votes of each reference image by the weighting coefficient of the reference image, thereby determining the similarity in accordance with the corrected number of obtained votes. For example, a maximum corrected number of obtained votes may be compared with the threshold value THa, or a value obtained by normalizing the maximum corrected number of obtained votes by the number of total votes may be compared with the threshold value THa, or a value obtained by normalizing the maximum corrected number of obtained votes by the maximum number of times of storage may be compared with the threshold value THa. Further, in this case, for example, the weighting coefficient is set to be more than 1 and to be larger as the importance of the reference image is higher.

Further, in the present embodiment, a single hash value is calculated for a single feature point (target feature point), but the present invention is not limited to this, and it may be so arranged that a plurality of hash values are calculated for a single feature point (target feature point). For example, it may be so arranged that: six points are extracted as peripheral feature points around the target feature point, and three points are extracted from five points for each of six combinations obtained by extracting five points from the six points, so as to calculate an invariant, thereby calculating a hash value. In this case, six hash values are calculated for a single feature point.

(1-3. Process of Digital Color Multi-Function Printer 13)

Figure 10:
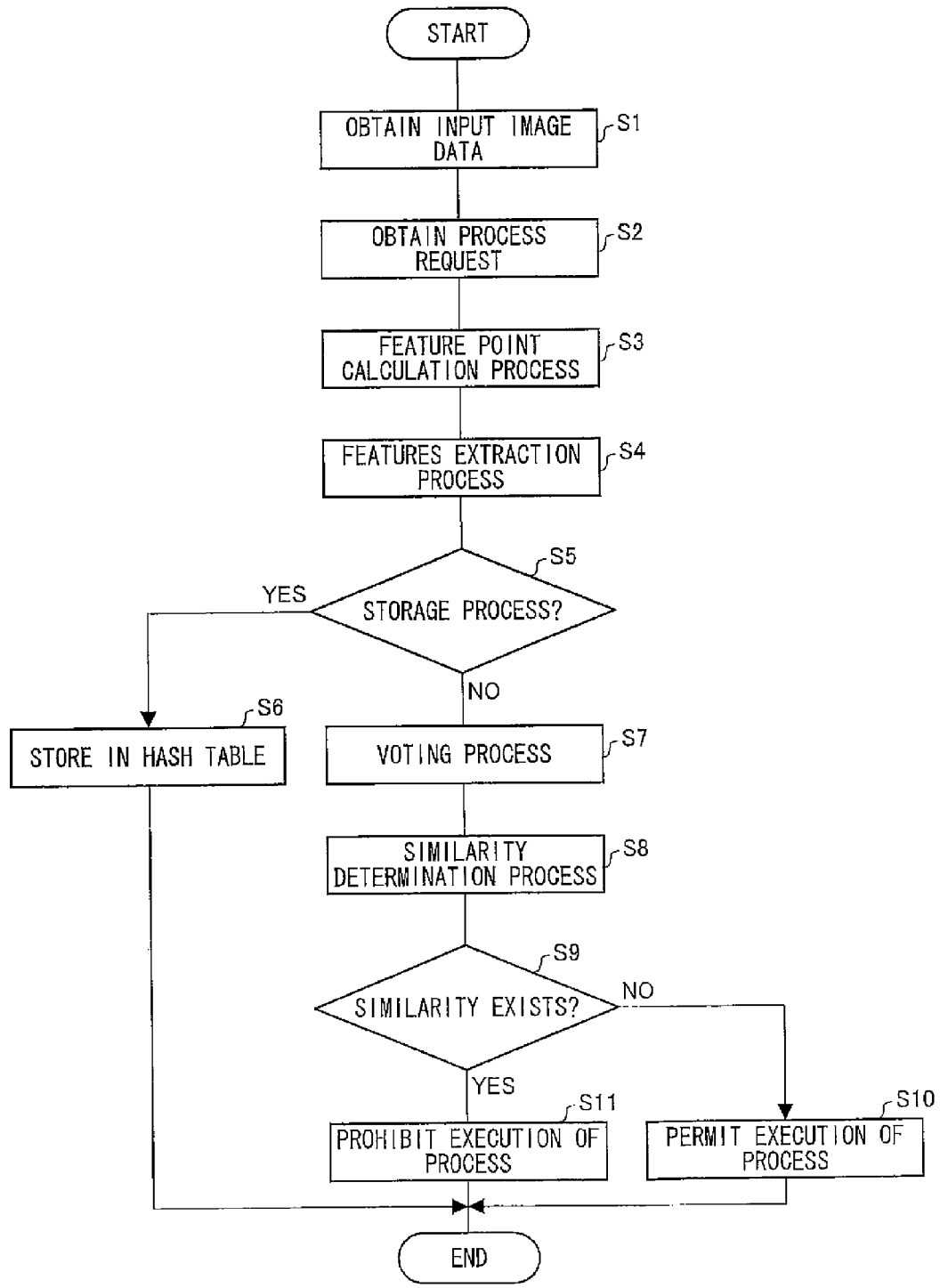
FIG. 10 is a flowchart illustrating a flow of a process in the document matching process section in FIG. 1.

The following explains a process in the digital multi-function printer 13 with reference to the flowchart in FIG. 10.

First, the control section 7 obtains input image data and a process request (instruction input) entered by a user from the operation panel 6 or the communication device 5 (S1 and S2). The control section 7 may obtain input image data by the color image input apparatus 2 reading a document image, or by the communication device 5 obtaining input image data transmitted from an external apparatus, or by reading input image data from storage media via a card reader (not shown) included in the digital color multi-function printer 1.

Next, the control section 7 causes the feature point calculation section 31 to perform a feature point calculation process (S3), and causes the features calculation section 32 to calculate features (S4).

Next, the control section 7 judges whether a process requested by the process request is a storage process or not (S5). When judging that the storage process is requested, the control section 7 causes the features calculated by the features calculation section 32 and a document ID (ID of a reference image) to be stored in the hash table 103 in such a manner that the features and the document ID are related to each other (S6), and finishes the process.

On the other hand, when judging that the storage process is not requested (similarity determination process is requested), the control section 7 causes the voting process section 33 to perform a voting process (S7), and causes the similarity determination process section 34 to perform a similarity determination process (S8).

When determining in S8 that a similarity exists, the control section 7 prohibits an image process (such as copying, printing, electronic distribution, facsimile transmission, filing, correction of image data, and editing) on the input image data (S11), and finishes the process. On the other hand, when judging that a similarity does not exist, the control section 7 permits the image process on the input image data (S12), and finishes the process. In the present embodiment, an explanation is made as to a case where the image process is permitted when a similarity exists and the image process is prohibited when a similarity does not exist. However, the present invention is not limited to this case. For example, a result of similarity determination may be notified to a predetermined notification destination. Further, the present invention may be arranged so that whether to store input image data or not, whether to superpose a predetermined sign etc. on an output image corresponding to the input image data or not, whether to perform user authentication or not, whether to display a result of similarity determination or not etc. are determined in accordance with the result of similarity determination.

(1-4. Arrangement and Process of Intersection Calculation Section 45)

Figure 11:
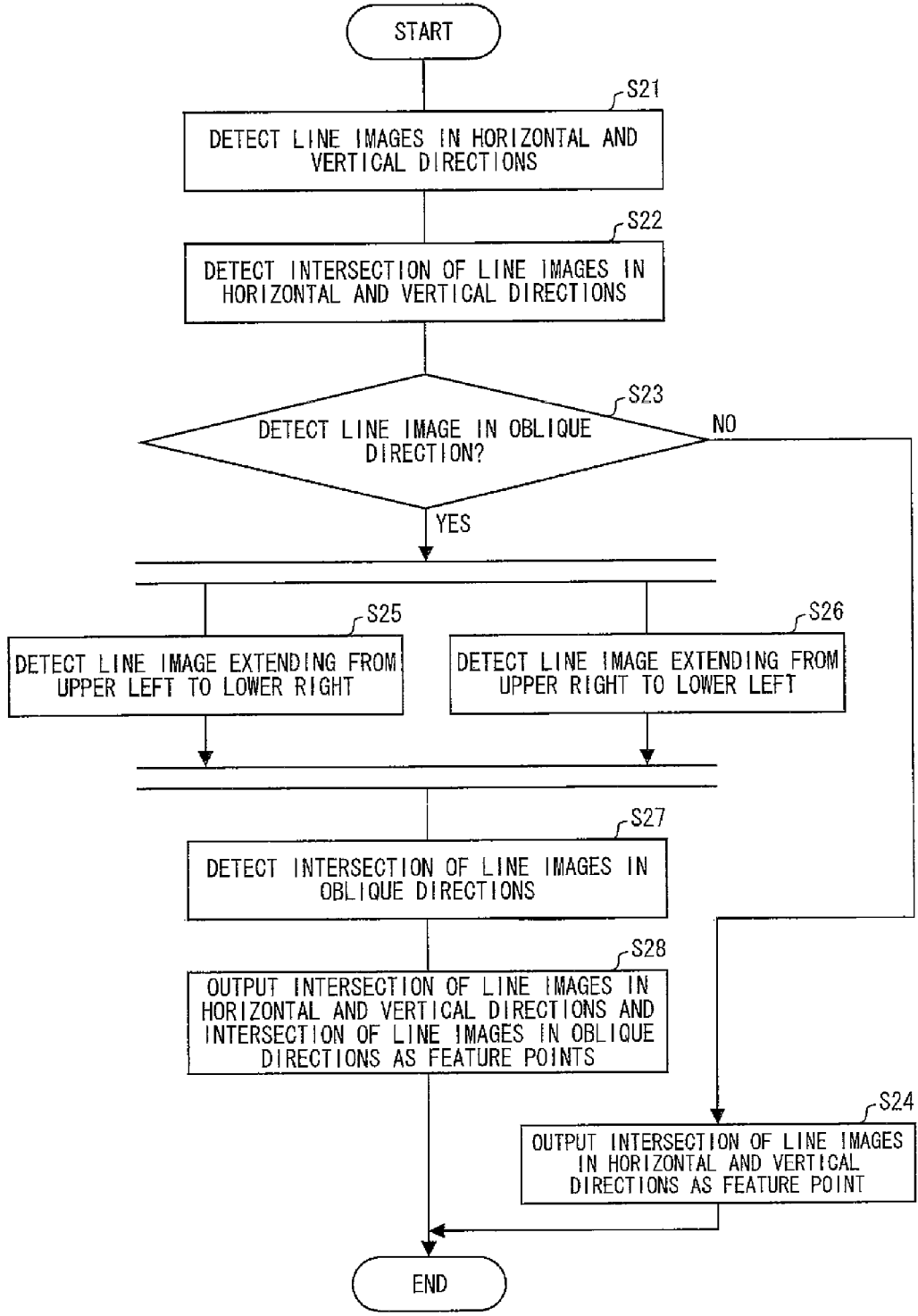
FIG. 11 is a flowchart illustrating a flow of a process in the intersection calculation section included in the document matching process section in FIG. 1.

The following explains an arrangement of the intersection calculation section 45 and a process of the intersection calculation section 45 in detail. First, an explanation is made as to an outline of the process of the intersection calculation section 45 with reference to a flow chart in FIG. 11. As illustrated in FIG. 11, the control section 7 causes the intersection calculation section 45 to extract a line image extending in a horizontal direction and a line image extending in a vertical direction on the basis of binarized image data (e.g. data represented by "1" (black pixel) and "0" (white pixel)) (S21), and causes the intersection calculation section 45 to extract an intersection of the line images extending in both directions (S22). A process for extracting the line images extending in the horizontal direction and the vertical direction, respectively, and a process for extracting the intersection of the line images are explained later.

Next, the control section 7 judges whether to extract, as a feature point, an intersection of line images extending in oblique directions (S23). The judgment may be such that when the number of feature points extracted in S22 is less than a predetermined value, an intersection of line images extending in oblique directions is extracted as a feature point. Alternatively, the judgment may be performed according to a mode selection instruction entered by a user from the operation panel 6 or an external device connected communicably. For example, in a case where the user wants to reduce a process time for detecting a line in an oblique direction or a workload on the process, the user can select a mode in which detection of lines in oblique directions is not performed. In a case where the user wants to further increase accuracy in a similarity determination process, the user can select a mode in which detection of lines in oblique directions is performed. Further, in a case where an input image includes ruled lines and many intersections of the ruled lines and the input image is not skewed, usage of intersections of line images in horizontal and vertical directions ensures sufficient accuracy in a similarity determination process, and therefore detection of line images in oblique directions does not have to be performed.

When judging in S23 that an intersection of line images extending in oblique directions is not to be extracted as a feature point, the control section 7 outputs, as a feature point, the intersection extracted in S22 to the features calculation section 32 (S24), and finishes the intersection calculation process.

On the other hand, when judging in S23 that the intersection of the line images extending in oblique directions is to be extracted as a feature point, the control section 7 causes the intersection calculation section 45 to extract line images extending in two oblique directions, respectively (a direction from upper left to lower right (right-slanting direction): a first oblique direction, and a direction from upper right to lower left (left-slanting direction): a second oblique direction) (S25 and S26), and causes the intersection calculation section 45 to extract an intersection of the line images extending in the two oblique directions, respectively (S27). The process in S25 and the process in S26 may be performed simultaneously or one of the processes may be performed before the other of the processes. The process for extracting line images extending in oblique directions and the process for extracting an intersection of the line images extending in oblique directions are explained later.

Subsequently, the control section 7 causes the intersection calculation section 45 to output, as feature points, the intersection extracted in S22 and the intersection extracted in S27 to the features calculation section 32 (S28), and finishes the intersection calculation process.

An explanation was made above as to a case where the control section 7 judges in S23 whether to extract, as a feature point, an intersection of line images extending in oblique directions. However, the present invention is not limited to this case. For example, calculation of an intersection of line images extending in horizontal and vertical directions, respectively, and calculation of an intersection of line images extending in two oblique directions, respectively, may be always performed. Alternatively, out of the two intersections, only a predetermined one may be calculated. Alternatively, calculation of the line images extending in oblique directions is performed first, and according to the result of the calculation etc., the control section 7 judges whether to calculate the intersection of the line images extending in horizontal and vertical directions, respectively. However, the process for detecting the line images in oblique directions requires a more complex algorithm and a longer process time than the process for detecting the line images in horizontal and vertical directions, and therefore it is preferable that detection of the line images in horizontal and vertical directions and calculation of an intersection of the line images are performed first, and if necessary, detection of the line images in oblique directions and calculation of an intersection of the line images are performed.

Figure 12:
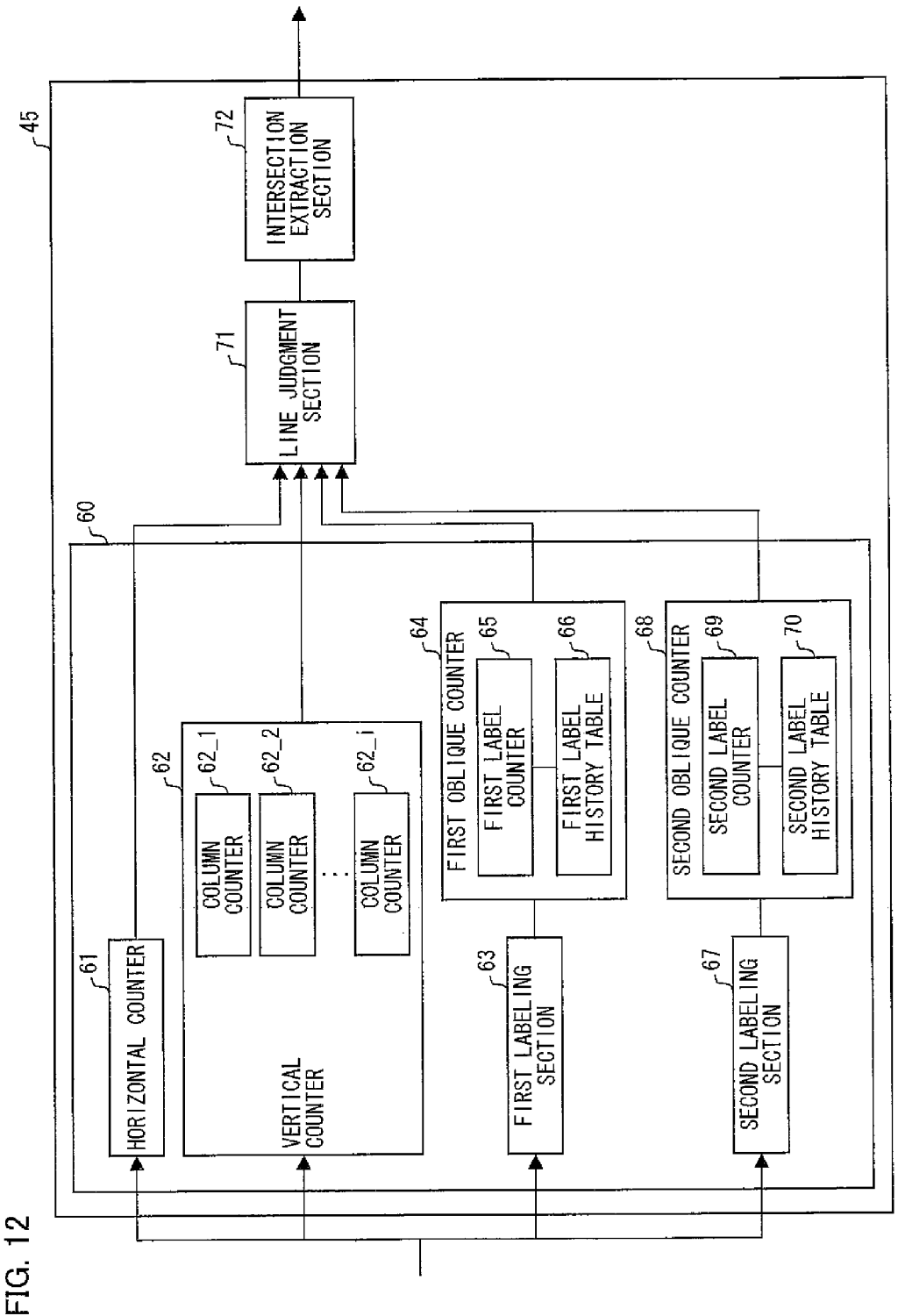
FIG. 12 is a block diagram schematically illustrating the intersection calculation section included in the document matching process section in FIG. 1.

The following further details the process for extracting line images and the process for extracting an intersection of the line images. FIG. 12 is a block diagram illustrating an arrangement of the intersection calculation section 45. As illustrated in FIG. 12, the intersection calculation section 45 includes: a counting section 60 including a horizontal counter 61, a vertical counter 62, a first labeling section 63, a first oblique counter 64, a second labeling section 67, and a second oblique counter 68; a line judgment section 71; and an intersection extraction section 72.

First, an explanation is made as to the process for extracting line images in horizontal and vertical directions and the process for extracting an intersection of the line images.

The horizontal counter 61 stores a count value of a runlength count in a horizontal direction with respect to binarized image data. Here, the runlength count means a process for counting how many pixels indicative of "1" exist successively in a predetermined direction.

To be more specific, the control section 7 scans the binarized image data from left to right (alternatively, from right to left) in a horizontal direction and judges whether a pixel is a black pixel ("1") or not. When a pixel is a black pixel, the control section 7 causes the horizontal counter 61 to increment a count value. When a pixel is not a black pixel, the control section 7 causes the horizontal counter 61 to reset a count value. Further, when the scanning reaches an end in a horizontal direction, the control section 7 causes the horizontal counter 61 to reset a count value, and performs a runlength count process with respect to a next line that is adjacent in a vertical direction. Further, when causing the horizontal counter 61 to reset a count value, the control section 7 causes the horizontal counter 61 to output a count value right before the reset and coordinates of a pixel scanned at the time of the reset (or coordinates of a pixel scanned right before the reset) to the line judgment section 71.

The vertical counter 62 stores a count value of a runlength count in a vertical direction with respect to the binarized image data.

In the present embodiment, the vertical counter 62 includes column counters 62_1 to 62_i in the number corresponding to the number i of pixels in a horizontal direction. The control section 7 scans the binarized image data from left to right (or right to left) in a horizontal direction and judges whether a pixel is a black pixel ("1") or not. When a pixel is a black pixel, the control section 7 causes the vertical counter 62 to increment a count value of a column counter corresponding to the position of the pixel in a horizontal direction (x direction). That is, the control section 7 causes each column counter to store a count value of a runlength count in a vertical direction with respect to each column (each x-coordinate) of the binarized image data. When a pixel is not a black pixel, the control section 7 causes a column counter corresponding to the position of the pixel in a horizontal direction to reset a count value. Further, when the scanning reaches an end in a horizontal direction, the control section 7 performs a runlength count process with respect to a next line that is adjacent in a vertical direction. Further, when causing a column counter to reset a count value, the control section 7 causes the vertical counter 62 to output a count value right before the reset and coordinates of a pixel scanned at the time of the reset (or coordinates of a pixel scanned right before the reset) to the line judgment section 71.

In a case where the count value from the horizontal counter 61 is m that is not less than a threshold value (e.g. 5), the line judgment section 71 detects pixels corresponding to count values 1 to m based on coordinates of a pixel scanned at the time of resetting the count value m, and judges that an image made of the pixels is a line image. Further, in a case where a count value from the vertical counter 62 is n that is not less than a threshold value (e.g. 5), the line judgment section 71 detects pixels corresponding to count values 1 to n based on coordinates of a pixel scanned at a time of resetting the count value n, and judges that an image made of the pixels is a line image. Further, when judging that the image made of the pixels is a line image, the line judgment section 71 outputs coordinates of the pixels included in the line image (or coordinates of a start pixel and an end pixel each with a pixel value "1") to the intersection extraction section 72.

The intersection extraction section 72 extracts an intersection of line images in horizontal and vertical directions in accordance with an input from the line judgment section 71, and outputs the extracted intersection as a feature point to the features calculation section 32. In a case where a plurality of adjacent pixels are extracted as feature points, the intersection extraction section 72 considers centric coordinates of the pixels, barycentric coordinates of the pixels, or coordinates of a predetermined position (e.g. upper left) in a region consisting of the pixels to be a feature point.

Figure 13:
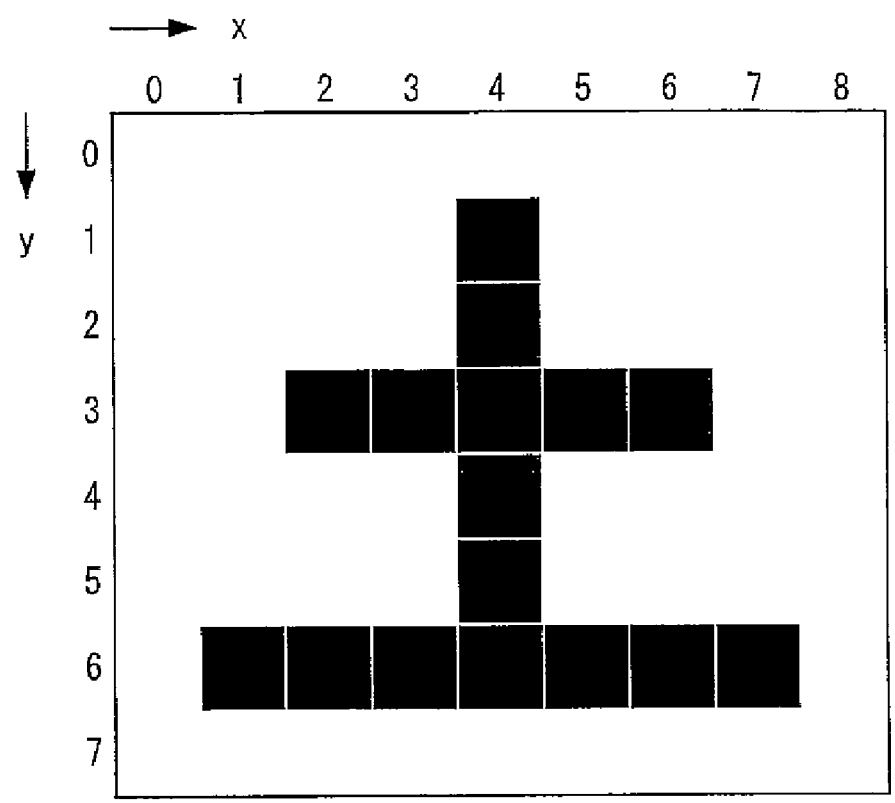
FIG. 13 is an explanatory drawing illustrating an example of input image data.
Figure 14:
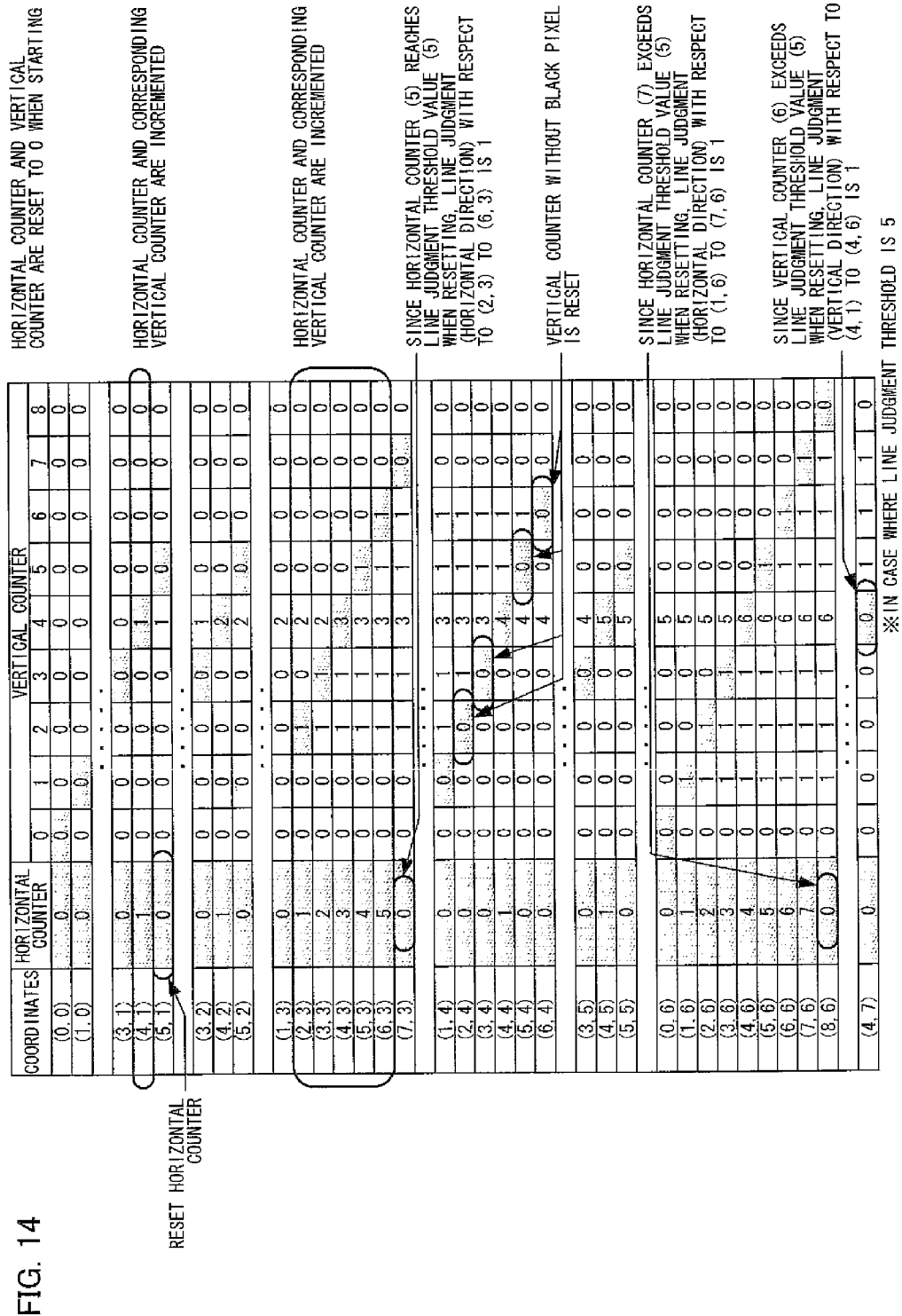
FIG. 14 is an explanatory drawing for explaining a process of detecting line images in horizontal and vertical directions from input image data in FIG. 13.

FIG. 13 is an explanatory drawing illustrating an example of image data input to the intersection calculation section 45. FIG. 14 is an explanatory drawing illustrating changes of count values of the horizontal counter 61 and the vertical counter 62 in a case where a line judgment process is performed with respect to the image data in FIG. 13.

First, at the beginning of the line judgment process, the horizontal counter 61 and the column counters 62_1 to 62_i included in the vertical counter 62 are reset to "0."

Thereafter, pixels are scanned from upper left pixel to lower right pixel (in the order of coordinates (0,0)→(1,0)→

(2,0)→ ... →(8,0)→(0,1)→(1,1)→ ... ), and it is judged whether the pixels are black pixels or not. Scanning direction is not limited to this and the scanning may be performed from upper right to lower left.

In FIG. 13, no black pixel exists on and before coordinates (3,1) and therefore the horizontal counter 61 and the column counters of the vertical counter 62 remain at the initial value "0." A black pixel exists on coordinates (4,1) and therefore the horizontal counter 61 and the vertical counter 62_4 (column counter corresponding to x-coordinate 4) increment. Since a black pixel does not exist on coordinates (5,1) that are next coordinates, the horizontal counter 61 is reset to "0", and the horizontal counter 61 is caused to output, to the line judgment section 71, a count value "1" right before the reset and the coordinates (4,1) at which the count value "1" is set. In this case, the count value of the horizontal counter 61 right before the reset is "1" that is smaller than a line judgment threshold value (5), so that the line judgment section 71 judges that no line image exists. At that time, since x-coordinate is 5, the vertical counter 62_4 is not reset. Further, since coordinates (5,1) is not a black pixel, a count value of the vertical counter 62_5 remains to be "0."

The process goes on in the similar manner. Since black pixels exist successively in a horizontal direction from coordinates (2,3) to (6,3), the horizontal counter 61 increments up to "5." Since a black pixel does not exist on coordinates (7,3) that are next coordinates, the horizontal counter 61 is reset to "0." The count value of the horizontal counter 61 right before the reset is "5" that is equal to the line judgment threshold value (5), and therefore the line judgment section 71 judges that an image made of pixels corresponding to count values "1" to "5" before the reset (pixels of coordinates (2,3) to (6,3)) is a line image extending in a horizontal direction.

Further, black pixels exist on the coordinates (2,3) to (6,3), so that the column counters 62_2 to 62_6 are incremented. However, since black pixels do not exist on coordinates (2,4), (3,4), (5,4), and (6,4), the column counters 62_2, 62_3, 62_5, and 62_6 are reset to "0." Since each of the count values of these column counters right before the reset is "1" that is smaller than the line judgment threshold value (5), the line judgment section 71 judges that the pixels corresponding to the count value "1" do not constitute a line image.

Thereafter, the process goes on in a similar manner. On coordinates (8,6), a count value of the horizontal counter 61 before the reset is "7" that is more than the line judgment value (5). Therefore, it is judged that pixels corresponding to count values "1" to "7" before the reset (coordinates (1,6) to (7,6)) constitute a line image in a horizontal direction.

Further, a count value of the column counter 62_4 right before the reset on coordinates (4,7) is "6" that is more than the line judgment threshold value (5). Therefore, it is judged that pixels corresponding to count values "1" to "6" before the reset (coordinates (4,1) to (4,6)) constitute a line image in a vertical direction.

Thereafter, the intersection extraction section 72 extracts, as an intersection, a pixel having been judged as a part of a line image both in horizontal and vertical directions, and outputs the extracted intersection as a feature point to the features calculation section 32. In a case where a plurality of adjacent pixels are extracted as intersections, the intersection extraction section 72 calculates centric coordinates of the pixels, barycentric coordinates of the pixels, or coordinates of a predetermined position (e.g. upper left) in a region made of the pixels, and outputs the calculated result as a feature point to the features calculation section 32.

Figure 15:
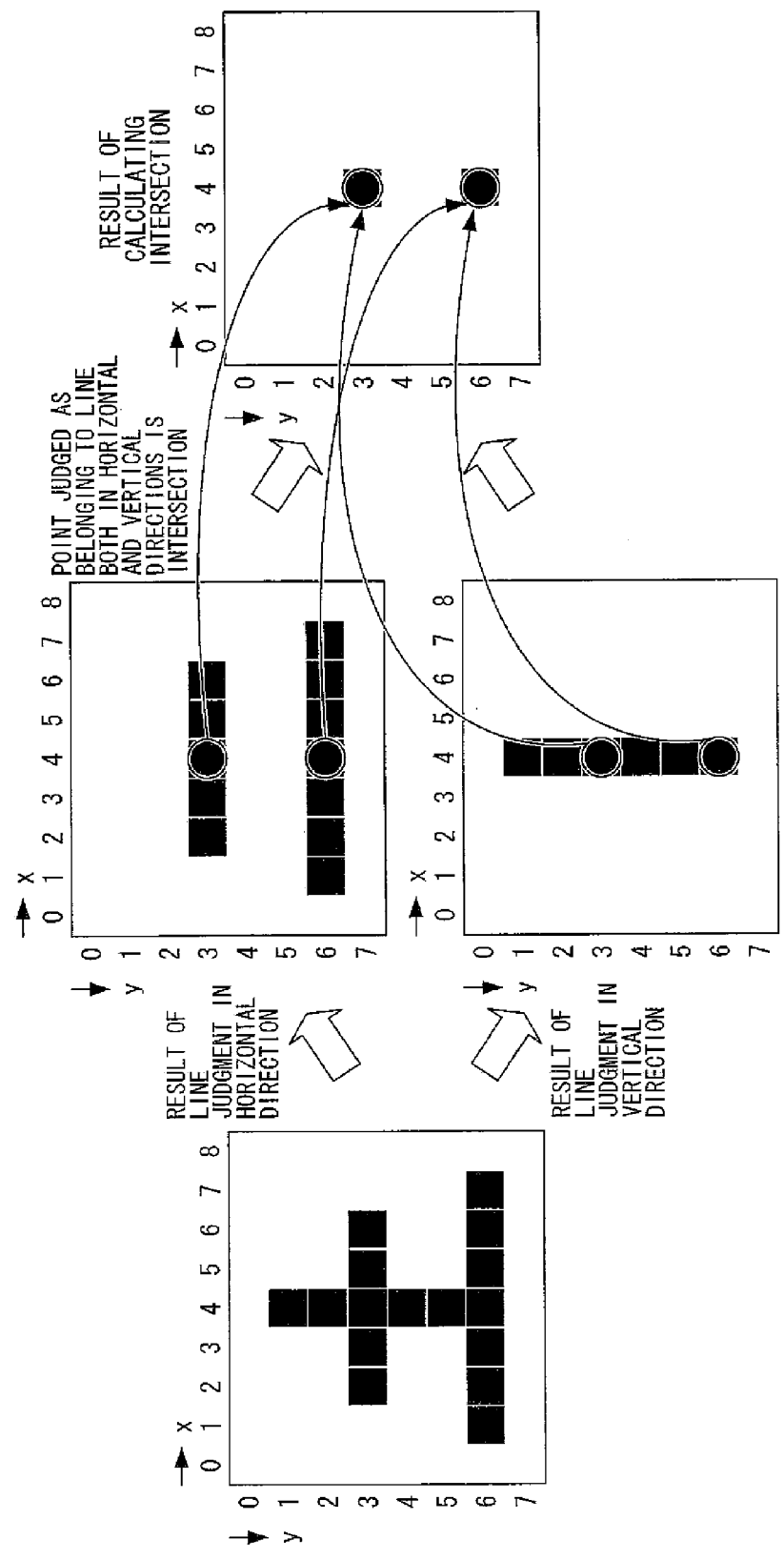
FIG. 15 is an explanatory drawing illustrating the results of detecting line images in horizontal and vertical directions from input image data in FIG. 13, and the result of calculating an intersection of the line images.

FIG. 15 is an explanatory drawing illustrating the results of extracting line images in horizontal and vertical directions from the image data in FIG. 13, and the result of extracting an intersection of the line images. As illustrated in FIG. 15, coordinates (4,3) and (4,6) of the image data in FIG. 13 are judged as being parts of line images both in horizontal and vertical directions, so that these coordinates are extracted as intersections.

The following explains a process for extracting line images in two oblique directions and a process for extracting an intersection of the line images, each process being performed in the intersection calculation section 45 illustrated in FIG. 12.

When the first labeling section 63 scans pixels from upper left to lower right in search of black pixels in the binarized image data, the first labeling section 63 labels each of the pixels in accordance with (i) whether a pixel is a black pixel or not and (ii) labels assigned to adjacent pixels (adjacent pixels on the left side and the upper side), and causes the result of labeling to be stored in a first label history table 66. When labeling, the first labeling section 63 judges what label has been assigned to an adjacent pixel, in accordance with information stored in the first label history table 66. Further, the first labeling section 63 causes coordinates of each pixel to which a label has been assigned (pixel whose label is other than "0") to be stored in a storage section (not shown) in such a manner that the coordinates of a pixel and a label assigned to the pixel are related to each other. How to assign a label will be detailed later.

The first oblique counter 64 includes a first label counter 65 and the first label history table 66.

A label assigned by the first labeling section 63 to each pixel is stored in the first label history table 66 with respect to each column (each x-coordinate). In the present embodiment, every time a label is assigned to a pixel, a label of a column corresponding to the pixel is updated. That is, in the first label history table 66, there are stored labels corresponding to (i) pixels which exist in a line adjacent to the upper side of a target pixel and which consist of pixels from a one adjacent to the upper side of the target pixel to a one at the right end of the line and (ii) pixels which exist in a line including the target pixel and which consist of pixels from a one at the left end of the line to a one adjacent to the left side of the target pixel, i.e. labels in the number of pixels included in one horizontal line. A label assigned to the column including a target pixel (label assigned to a pixel that is adjacent to the upper side of the target pixel) is updated to be a label assigned to the target pixel. Thus, it is possible to reduce a storage capacity required for the first label history table 66 without dropping accuracy in line judgment, compared with a case where labels assigned to all pixels are stored. Further, it is possible to easily and promptly extract labels of pixels that are adjacent to the left side and the upper side of the target pixel, respectively.

The first label counter 65 counts the number of assigning labels with respect to each label. When all pixels are scanned, the control section 7 causes the first label counter 65 to output each label and a count value for each label to the line judgment section 71.

When the second labeling section 67 scans pixels from upper right to lower left in search of black pixels in the binarized image data, the second labeling section 67 labels each of the pixels in accordance with (i) whether a pixel is a black pixel or not and (ii) labels assigned to adjacent pixels (adjacent pixels on the right side and the upper side), and causes the result of labeling to be stored in a second label history table 70. When labeling, the second labeling section 67 judges what label has been assigned to an adjacent pixel, in accordance with information stored in the second label history table 70. Further, the second labeling section 67 causes coordinates of each pixel to which a label has been assigned (pixel whose label is other than "0") to be stored in a storage section (not shown) in such a manner that the coordinates of a pixel and a label assigned to the pixel are related to each other. How to assign a label will be detailed later.

The second oblique counter 68 includes a second label counter 69 and the second label history table 70.

A label assigned by the second labeling section 67 to each pixel is stored in the second label history table 70 with respect to each column (each x-coordinate). In the present embodiment, every time a label is assigned to a pixel, a label of a column corresponding to the pixel is updated. Thus, it is possible to reduce a storage capacity required for the second label history table 70 without dropping accuracy in line judgment, compared with a case where labels assigned to all pixels are stored. Further, it is possible to easily and promptly extract labels of pixels that are adjacent to the right side and the upper side of the target pixel, respectively.

The second label counter 69 counts the number of assigning labels with respect to each label. When all pixels are scanned, the control section 7 causes the second label counter 69 to output each label and a count value for each label to the line judgment section 71.

When a count value input from the first oblique counter 64 is not less than a threshold value (e.g. 5), the line judgment section 71 judges that an image made of pixels to each of which a label corresponding to the count value is assigned is a line image. Similarly, when a count value input from the second oblique counter 68 is not less than a threshold value (e.g. 5), the line judgment section 71 judges that an image made of pixels to each of which a label corresponding to the count value is assigned is a line image. Further, when judging that the image is a line image, the line judgment section 71 reads out coordinates of each pixel constituting the line image and outputs the coordinates to the intersection extraction section 72.

The intersection extraction section 72 extracts an intersection of the line images in two adjacent directions in accordance with an input from the line judgment section 71, and outputs the extracted intersection as a feature point to the features calculation section 32. In a case where a plurality of adjacent pixels are extracted as intersections, the intersection extraction section 72 considers centric coordinates of the pixels, barycentric coordinates of the pixels, or coordinates of a predetermined position (e.g. upper left) in a region made of the pixels to be a feature point The following explains how the first labeling section 63 labels a pixel. The first labeling section 63 labels a pixel in accordance with the following rules.

Figure 16:
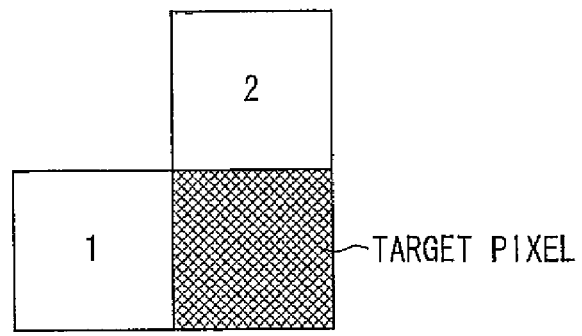
FIGS. 16(a) to 16(c) are explanatory drawings each illustrating how to assign labels to pixels when detecting a line image extending in an oblique direction from upper left to lower right.
Figure 16:
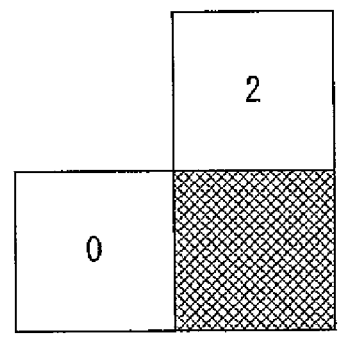
Figure 16:
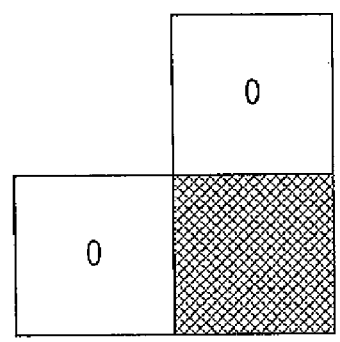

(1) In a case where a target pixel is a black pixel and a pixel adjacent to the left side of the target pixel is labeled (i.e. the pixel adjacent to the left side of the target pixel is not labeled as "0"), the target pixel is given the same label as that of the pixel adjacent to the left side of the target pixel. For example, as illustrated in FIG. 16(a), when the pixel adjacent to the left side of the target pixel is labeled as "1" and the pixel adjacent to the upper side of the target pixel is labeled as "2", the target pixel is labeled as "1."

(2) In a case where a target pixel is a black pixel and a pixel adjacent to the left side of the target pixel is not labeled (i.e. the pixel adjacent to the left side of the target is labeled as "0") and a pixel adjacent to the upper side of the target pixel is labeled, the target pixel is given the same label as that of the pixel adjacent to the upper side of the target pixel. For example, as illustrated in FIG. 16(b), when the pixel adjacent to the left side of the target pixel is labeled as "0" and the pixel adjacent to the upper side of the target pixel is labeled as "2", the target pixel is labeled as "2."

(3) In a case where a target pixel is a black pixel and both of pixels adjacent to the left side and the upper side of the target pixel are not labeled, the target pixel is given a new label. Therefore, as illustrated in FIG. 16(c), when both of pixels adjacent to the left side and the upper side of the target pixel are labeled as "0", the target pixel is given a new label that has not been given to other pixels in previous scanning (scanning from upper left to lower right).

(4) In a case where a target pixel is not a black pixel, the target pixel is labeled as "0."

Note that how the second labeling section 67 labels a pixel is the same as how the first labeling section 63 labels a pixel, except that each pixel is scanned from upper right to lower left and "the left side" in the aforementioned (1) to (4) is changed to "the right side."

Figure 17:
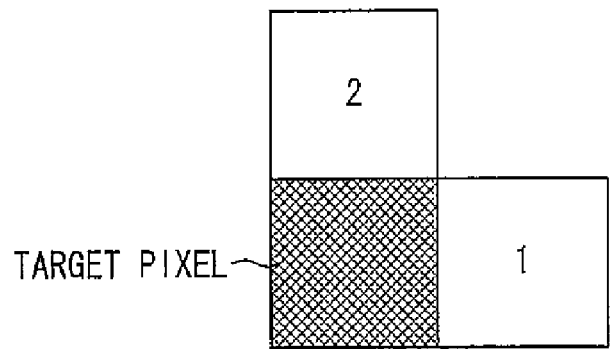
FIGS. 17(a) to 17(c) are explanatory drawings each illustrating how to assign labels to pixels when detecting a line image extending in an oblique direction from upper right to lower left.
Figure 17:
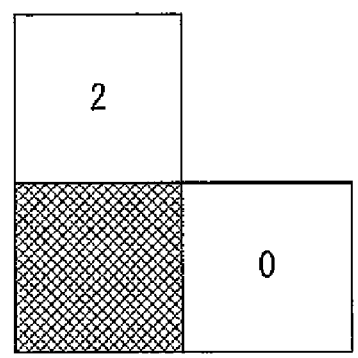
Figure 17:
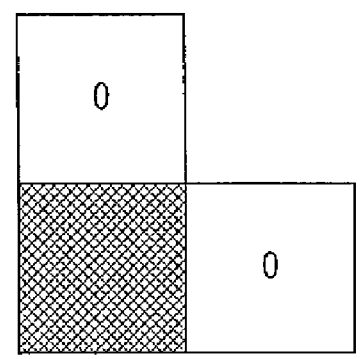

Therefore, in a case of scanning from upper right to lower left, when a pixel adjacent to the right side of a target pixel is labeled as "1" and a pixel adjacent to the upper side of the target pixel is labeled as "2" as illustrated in FIG. 17(a) for example, the target pixel is labeled as "1." When a pixel adjacent to the right side of the target pixel is labeled as "0" and a pixel adjacent to the upper side of the target pixel is labeled as "2" as illustrated in FIG. 17(b), the target pixel is labeled as "2." When both of pixels adjacent to the left side and the upper side of the target pixel are labeled as "0", the target pixel is given a new label that has not been given to other pixels in previous scanning (scanning from upper right to lower left).

Figure 18:
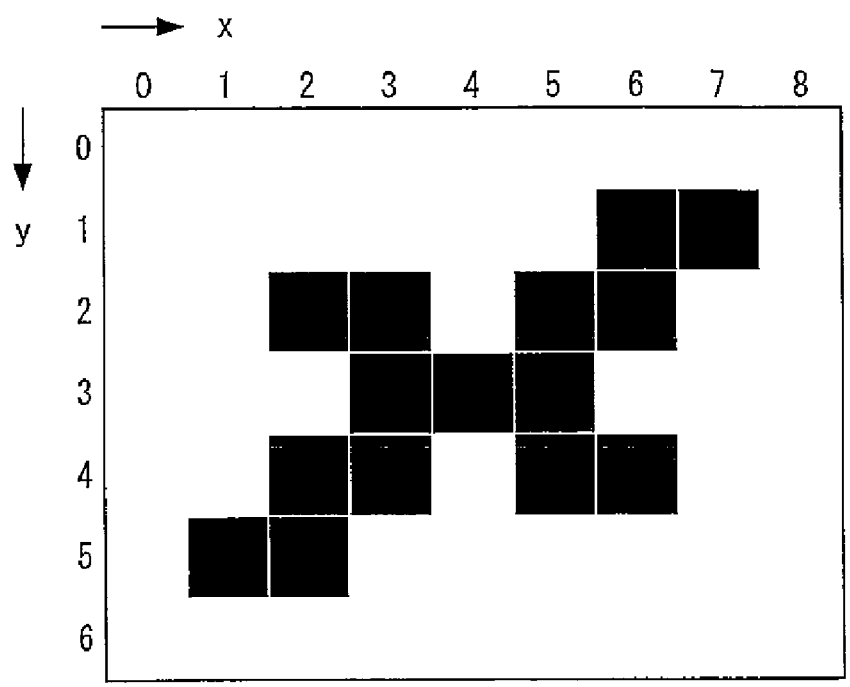
FIG. 18 is an explanatory drawing illustrating an example of input image data.
Figure 19:
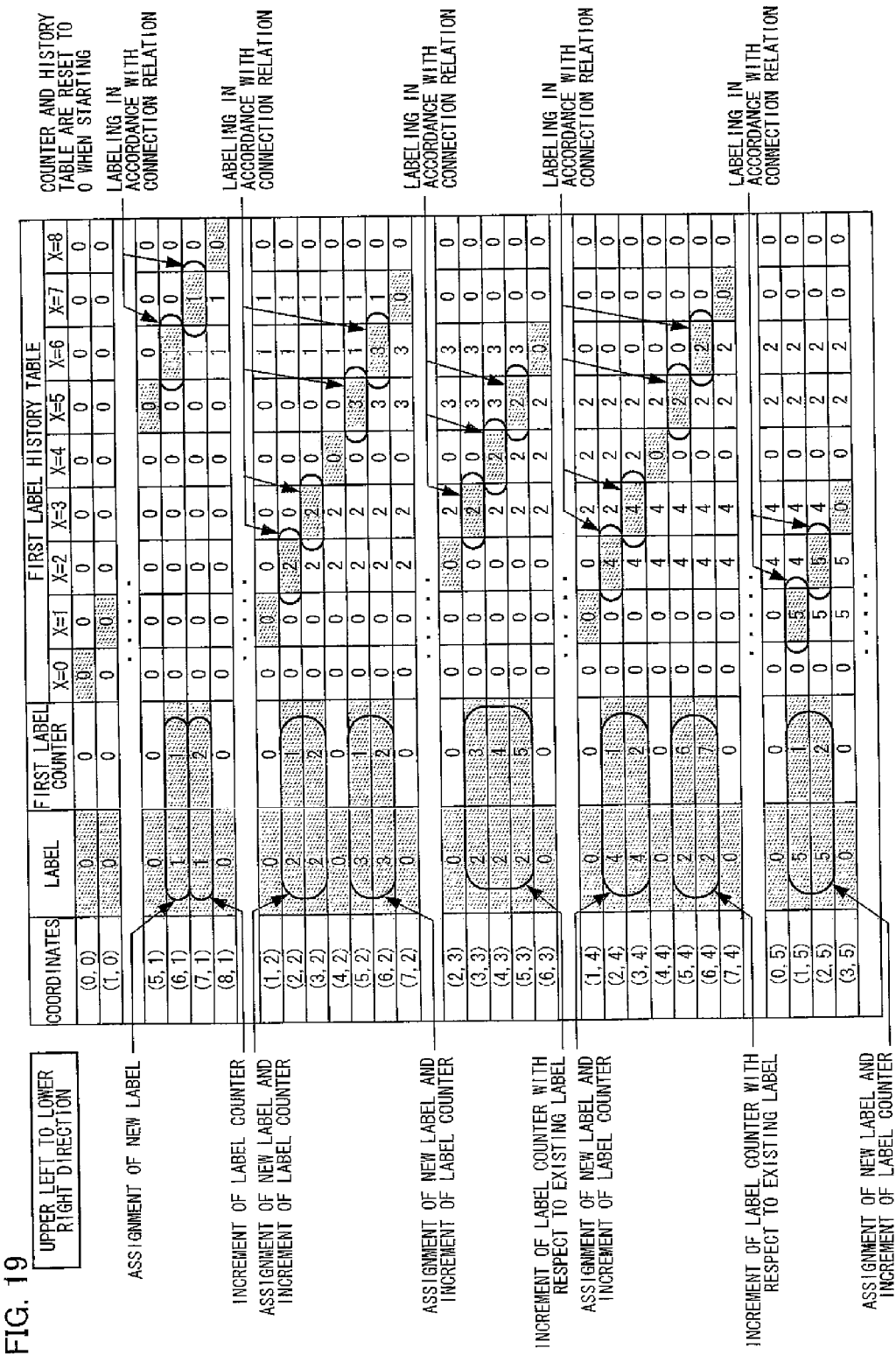
FIG. 19 is an explanatory drawing illustrating how to label pixels when detecting a line image extending from upper left to lower right from the input image data in FIG. 18.

The following further details a process for extracting line images in oblique directions and a process for extracting an intersection of the line images, using a process on image data in FIG. 18 as an example First, with reference to FIG. 19, an explanation is made as to how to label a pixel when scanning from upper left to lower right. FIG. 19 is an explanatory drawing illustrating a procedure of labeling a pixel when scanning from upper left to lower right.

First, when scanning starts, the first label counter 65 and the first label history table 66 are reset to "0." Thereafter, scanning is performed from upper left to lower right (in the order of coordinates $(0,0) \rightarrow (1,0) \rightarrow (2,0) \rightarrow \ldots \rightarrow (8,0) \rightarrow (0,1) \rightarrow (1,1) \rightarrow \ldots$).

A black pixel does not exist before coordinates (6,1), and therefore information stored in the first label counter 65 and the first label history table 66 is kept to be an initial value "0."

A black pixel exists on the coordinates (6,1), and therefore the pixel is labeled. Here, the pixel adjacent to the left side of the black pixel is labeled as "0" (a value at x=5 in the first label history table 66) and the pixel adjacent to the upper side of the black pixel is labeled as "0" (a pre-updated value at x=6 in the first label history table 66), and no pixels prior to the pixel on the coordinates (6,1) have been labeled. Therefore, the first labeling section 63 assigns a new label (label "1") to the pixel on the coordinates (6,1). Further, the coordinates (6,1) and the label "1" assigned to the pixel on the coordinates (6,1) are stored in a storage section (not shown) in such a manner that the coordinates (6,1) and the label "1" are related to each other. Further, a label counter corresponding to label "1" is caused to increment up to "1." Further, a label at x=6 in the first label history table 66 is updated to be "1."

A black pixel exists on the next coordinates (7,1), too, and therefore the pixel is labeled. Here, since the pixel adjacent to the left side of the black pixel is not labeled as "0" (a value at x=6 in the first label history table 66), the first labeling section 63 assigns, to the pixel on the coordinates (7,1), the same label as that of the pixel adjacent to the left side of the black pixel (label "1"). Further, the coordinates (7,1) and the label "1" assigned to the pixel on the coordinates (7,1) are stored in the storage section (not shown) in such a manner that the coordinates (7,1) and the label "1" are related to each other. Further, a label counter corresponding to label "1" is caused to increment up to "2." Further, a label at x=7 in the first label history table 66 is updated to be "1."

The process goes on in the similar manner. A pixel on coordinates (2,2) is given a new label (label "2"), the coordinates (2,2) and the label "2" given to the pixel on the coordinates (2,2) are stored in the storage section (not shown) in such a manner that the coordinates (2,2) and the label "2" are related to each other, a label counter corresponding to label "2" increments up to "1", and a label at x=2 in the first label history table 66 is updated to "2." Further, A pixel on coordinates (3,2) is given a new label (label "2"), the coordinates (3,2) and the label "2" given to the pixel on the coordinates (3,2) are stored in the storage section (not shown) in such a manner that the coordinates (3,2) and the label "2" are related to each other, a label counter corresponding to label "2" increments up to "2", and a label at x=3 in the first label history table 66 is updated to "2."

Further, a pixel on coordinates (5,2) is given a new label (label "3"), the coordinates (5,2) and the label "3" given to the pixel on the coordinates (5,2) are stored in the storage section (not shown) in such a manner that the coordinates (5,2) and the label "3" are related to each other, a label counter corresponding to label "3" increments up to "1", and a label at x=5 in the first label history table 66 is updated to "3." Further, a pixel on coordinates (6,2) is given a label "3", the coordinates (6,2) and the label "3" given to the pixel on the coordinates (6,2) are stored in the storage section (not shown) in such a manner that the coordinates (6,2) and the label "3" are related to each other, a label counter corresponding to label "3" increments up to "2", and a label at x=6 in the first label history table 66 is updated to "3."

Further, a pixel on coordinates (3,3) is a black pixel, a label given to a pixel adjacent to the left side of the black pixel (label at x=2 in the first label history table 66) is "0", and a label given to a pixel adjacent to the upper side of the black pixel (pre-updated label at x=3 in the first label history table 66) is "2." Consequently, the pixel on the coordinates (3,3) is given a label "2", the coordinates (3,3) and the label "2" given to the pixel on the coordinates (3,3) are stored in the storage section (not shown) in such a manner that the coordinates (3,3) and the label "2" are related to each other, a label counter corresponding to the label "2" increments up to "3", and the label at x=3 in the first label history table 66 is updated to "2."

Thereafter, scanning and labeling are performed up to the lower right pixel (coordinates (8,6)). When scanning and labeling have been completed up to the lower right pixel (coordinates (8,6)), the control section 7 causes the first oblique counter 64 to output each label and a count value of each label to the line judgment section 71.

Figure 20:
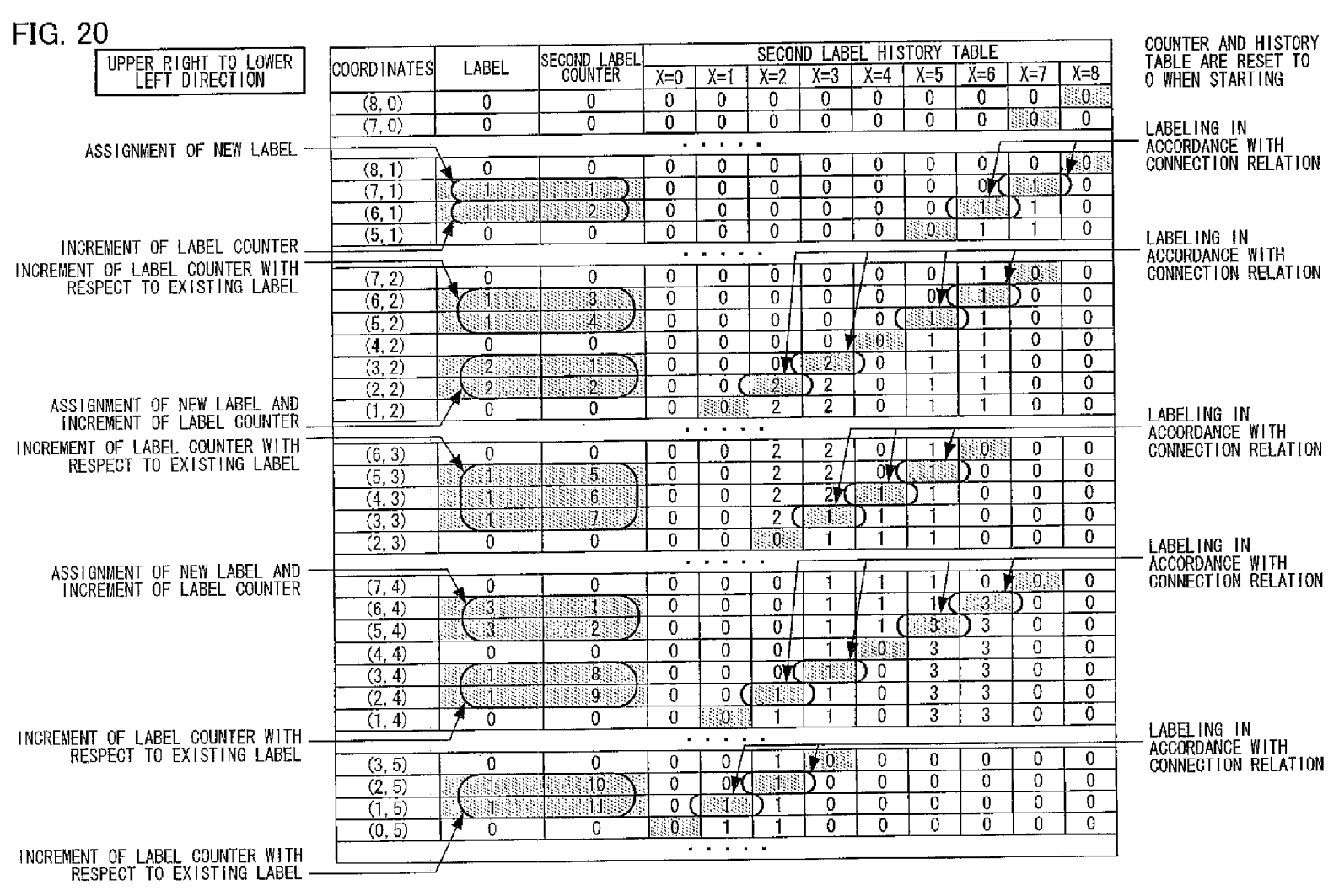

With reference to FIG. 20, the following explains how to label a pixel when scanning from upper right to lower left. FIG. 20 is an explanatory drawing illustrating a procedure of labeling a pixel when scanning from upper right to lower left.

First, when scanning starts, the second label counter 69 and the second label history table 70 are reset to "0." Thereafter, scanning is performed from upper right to lower left (in the order of coordinates (8,0)→(7,0)→(6,0)→ . . . →(0,0)→(8, 1)→(7,1)→ . . . ).

A black pixel does not exist before coordinates (7,1), and therefore information stored in the second label counter 69 and the second label history table 70 is kept to be an initial value "0."

A black pixel exists on coordinates (7,1) and therefore labeling is performed. Here, the pixel adjacent to the right side of the black pixel is labeled as "0" (label at x=8 in the second label history table 70) and the pixel adjacent to the upper side of the black pixel is labeled as "0" (pre-updated label at x=7 in the second label history table 70), and no pixels prior to the pixel on the coordinates (7,1) have been labeled. Therefore, the second labeling section 67 assigns a new label (label "1") to the pixel on the coordinates (7,1). Further, the control section 7 causes the coordinates (7,1) and label "1" given to the pixel on the coordinates (7,1) to be stored in the storage section (not shown) in such a manner that the coordinates (7,1) and the label "1" are related to each other. Further, the control section 7 causes a label counter corresponding to the label "1" to increment up to "1." Further, the control section 7 updates the label at x=7 in the second label history table 70 to "1."

Thereafter, each black pixel is labeled in accordance with: a label of a pixel adjacent to the right side of the black pixel; a label of a pixel adjacent to the upper side of the black pixel; and an already assigned label, and the label of a column including the black pixel in the second label history table 70 is updated. Further, every time a label is assigned to a black pixel, a label counter corresponding to the label increments. Further, with respect to each labeled pixel (each pixel to which a label other than "0" is assigned), the control section 7 causes coordinates of the pixel and the label assigned to the pixel to be stored in the storage section (not shown) in such a manner that the coordinates and the label are related to each other.

When scanning and labeling have been completed up to the lower left pixel (coordinates (0,6)), the control section 7 causes the second oblique counter 68 to output each label and the count value of each label to the line judgment section 71.

Figure 21:
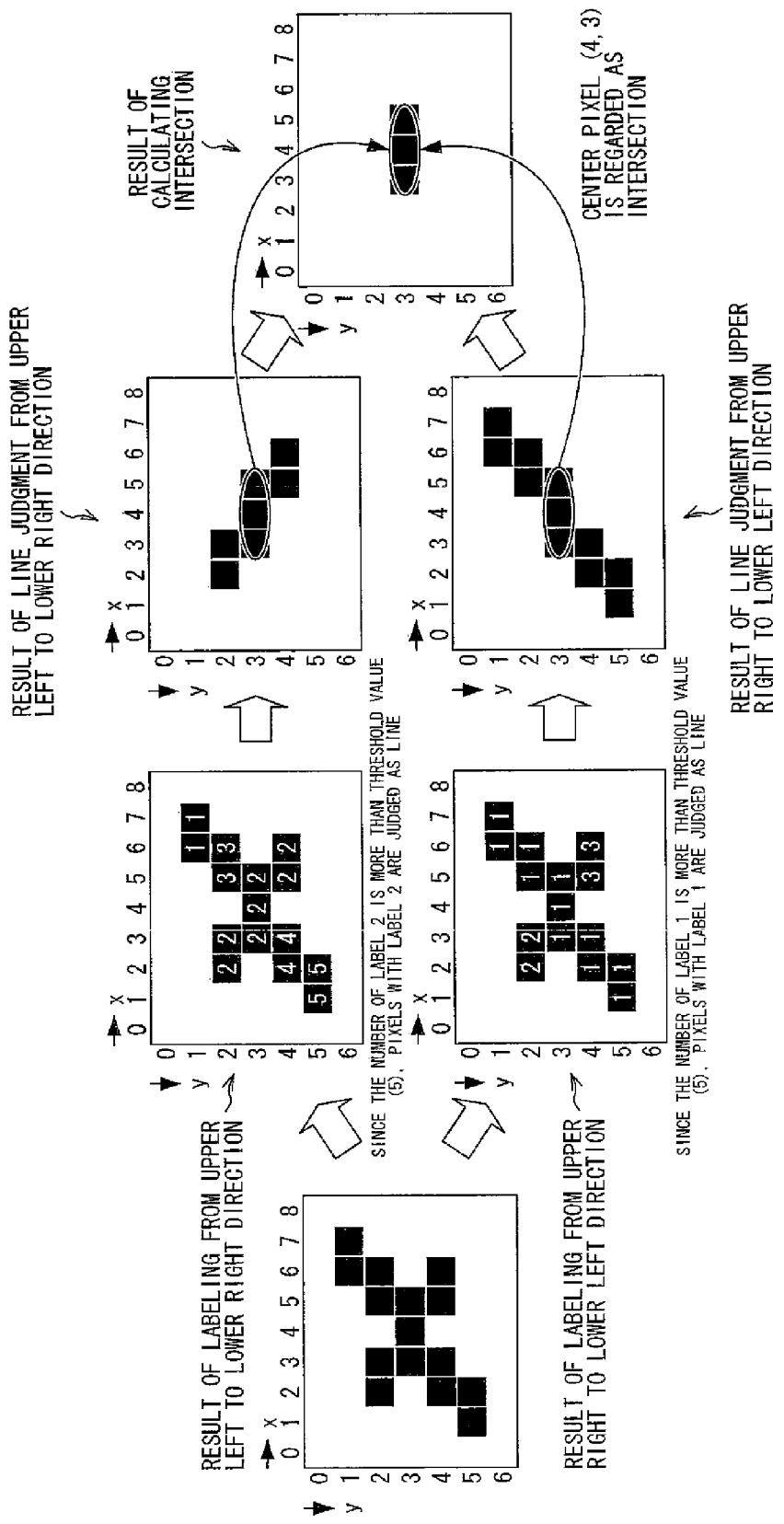
FIG. 21 is an explanatory drawing illustrating the results of detecting line images in oblique directions from the input image data in FIG. 18 and the result of calculating an intersection of the line images.

FIG. 21 is an explanatory drawing illustrating the result of extracting line images in two oblique directions from the image data in FIG. 18, and the result of extracting an intersection of the line images. As illustrated in FIG. 21, in a case of the image data in FIG. 18, when scanning pixels from upper left to lower right, five kinds of labels (labels "1" to "5") are assigned to the pixels. Further, the count value of labels "1", "3", "4", and "5" is "2", and the count value of label "2" is "7." Therefore, in this case, the line judgment section 71 judges that pixels corresponding to the label "2" whose count value is more than the threshold value "5" constitute a line image. When judging that the pixels constitute the line image, the line judgment section 71 reads out coordinates of the pixels constituting the line image and outputs the coordinates to the intersection extraction section 72.

As illustrated in FIG. 21, when scanning pixels from upper right to lower left, three kinds of labels (labels "1" to "3") are assigned to the pixels. Further, the count value of labels "2" and "3" is "2", and the count value of label "1" is "11." Therefore, in this case, the line judgment section 71 judges that pixels corresponding to the label "1" whose count value is more than the threshold value "5" constitute a line image. When judging that the pixels constitute the line image, the line judgment section 71 reads out coordinates of the pixels constituting the line image and outputs the coordinates to the intersection extraction section 72.

The intersection extraction section 72 calculates, as an intersection, coordinates (4,3) that are centric coordinates of coordinates (3,3), (4,3), and (5,3) of pixels that are judged to constitute line images in both scanning from upper left to lower right and scanning from upper right to lower left. Further, the intersection extraction section 72 outputs the calculated intersection as a feature point to the features calculation section 32.

As described above, in the document matching process section 13 of the digital color multi-function printer 1 of the present embodiment, the intersection calculation section 45 extracts line images (e.g. line parts in texts and ruled lines) from input image data, extracts an intersection of the line images, and regards the intersection as a feature point.

In this way, by regarding an intersection of line images as a feature point, it is possible to extract a large number of feature points from input image data even when the input image data is read out from a document with little texts. Consequently, it is possible to appropriately specify the input image data, thereby increasing accuracy in a similarity determination process (matching process).

Further, it is possible to calculate a feature point only by extracting line images and calculating an intersection of the line images. Therefore, it is possible to simplify algorithm for a feature point calculation process and to reduce a process time, compared with an arrangement in which texts, frames for texts, frames, lines indicative of frames etc. are extracted from input image data and a similarity determination process is performed with respect to plural kinds of extracted elements.

In the present embodiment, an explanation was made as to a case where pixels are scanned from upper left to lower right and from upper right to lower left and thus the pixels are labeled, and a line image is determined in accordance with the number of pixels to which the same label has been assigned. However, how to detect line images is not limited to this case.

Figure 22:
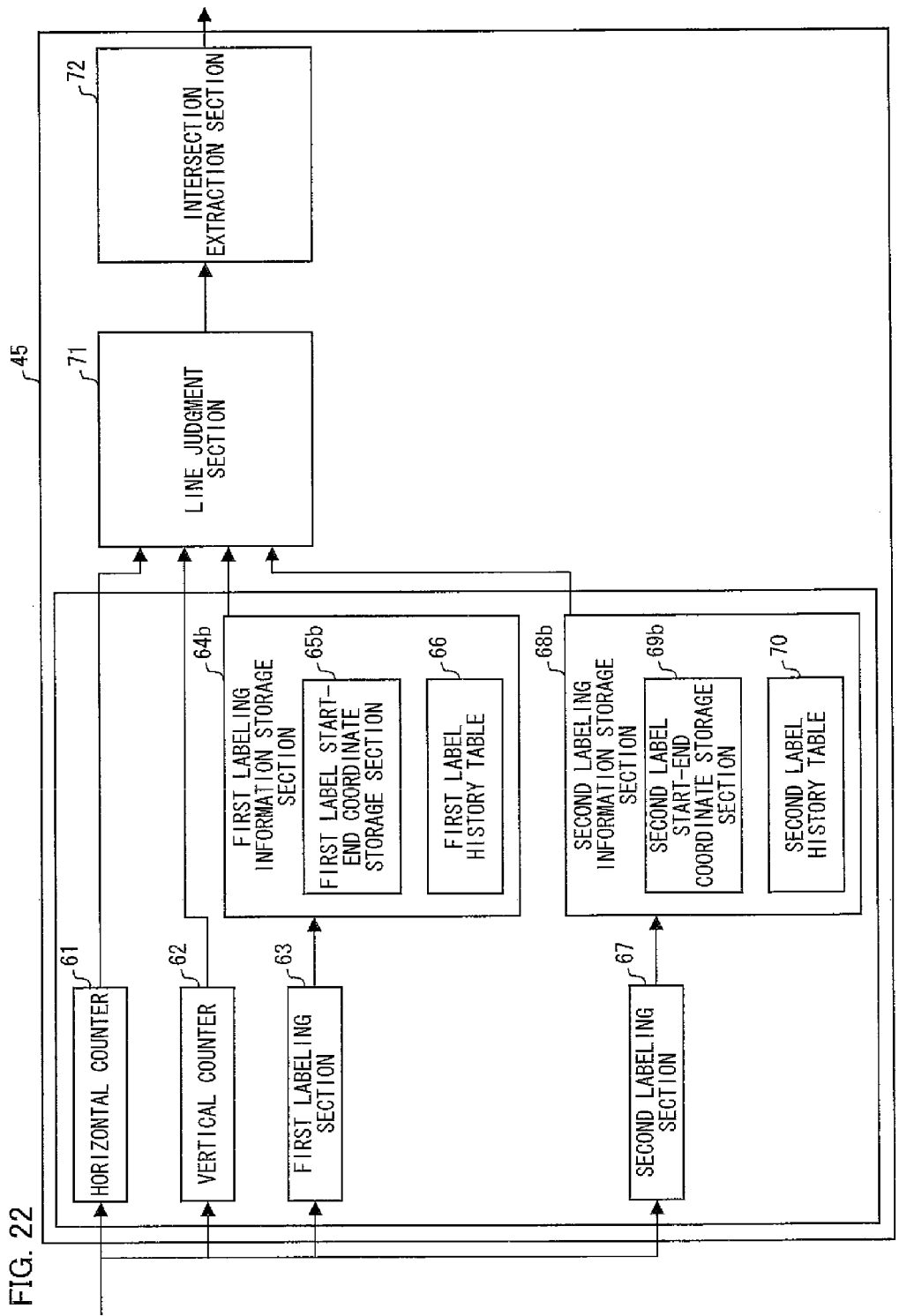
FIG. 22 is a block diagram illustrating a modification example of an intersection calculation section included in the document matching processing section in FIG. 1.

For example, the present embodiment may be arranged as follows: when scanning from upper left to lower right and from upper right to lower left, not only labeling of each pixel is performed as described above, but also start coordinates and end coordinates of each kind of labels are stored and a line image is detected using the start coordinates and the end coordinates of each label. FIG. 22 is a block diagram illustrating a structure of the intersection calculation section 45 with the above arrangement. The document matching process section 13 includes the intersection calculation section 45 in FIG. 22 instead of the intersection calculation section 45 in FIG. 12.

The intersection calculation section 45 in FIG. 22 includes a first labeling information storage section 64b instead of the first oblique counter 64 in the intersection calculation section 45 in FIG. 12, and includes a second labeling information storage section 68b instead of the second oblique counter 68.

The first labeling information storage section 64b includes a first label start-end coordinate storage section 65b and a first label history table 66. The first label start-end coordinate storage section 65b stores start coordinates and end coordinates of each kind of labels in accordance with the result of labeling each pixel by the first labeling section 63. The first labeling history table 66 has substantially the same function as the function explained with reference to FIG. 12.

The second labeling information storage section 68b includes a second label start-end coordinate storage section 69b and a second label history table 70. The second label start-end coordinate storage section 69b stores start coordinates and end coordinates of each kind of labels in accordance with the result of labeling each pixel by the second labeling section 67. The second label history table 70 has substantially the same function as the function explained with reference to FIG. 12.

The following explains a process for extracting line images and a process for extracting an intersection of the line images, carried out by the intersection calculation section 45 in FIG. 22.

The first labeling section 63 labels a pixel through the aforementioned labeling method. At that time, every time the first labeling section 63 labels a pixel, the first labeling section 63 causes the result of labeling a pixel to be stored in the first label history table 66 and updates start coordinates and end coordinates of the label that are stored in the first label start-end coordinate storage section 65b. Similarly, every time the second labeling section 67 labels a pixel, the second labeling section 67 causes the result of labeling a pixel to be stored in the second label history table 70 and updates start coordinates and end coordinates of the label that are stored in the second label start-end coordinate storage section 69b.

In labeling, minimum coordinates and maximum coordinates of each label are obtained both for x-coordinate and y-coordinate. Thus, four coordinates of a circumscribed rectangle of the label are obtained. When scanning from upper left to lower right, upper left of a circumscribed rectangle of an image made of pixels to which the same label is assigned is regarded as start coordinates and lower right of the circumscribed rectangle is regarded as end coordinates. When scanning from upper right to lower left, upper right of a circumscribed rectangle of an image made of pixels to which the same label is assigned is regarded as start coordinates and lower left of the circumscribed rectangle is regarded as end coordinates.

A procedure for updating the start coordinates and the end coordinates is as follows.

(1) When assigning a new label, both of start coordinates (xst, yst) and end coordinates (xend, yend) are current coordinates (xcrt, ycrt). (2) When updating an existing label, xst, yst, xend, and yend are updated in accordance with the following conditions (a)-(d) and (e)-(h).

In a case of scanning from upper left to lower right,
(a) When xcrt<xst, xst is updated.
(b) When ycrt<yst, yst is updated.
(c) When xcrt>xend, xend is updated.
(d) When ycrt>yend, yend is updated.
In a case of scanning from upper right to lower left,
(e) When xcrt>xst, xst is updated.
(f) When ycrt<yst, yst is updated.
(g) When xcrt<xend, xend is updated.
(h) When ycrt>yend, yend is updated.

Figure 23:
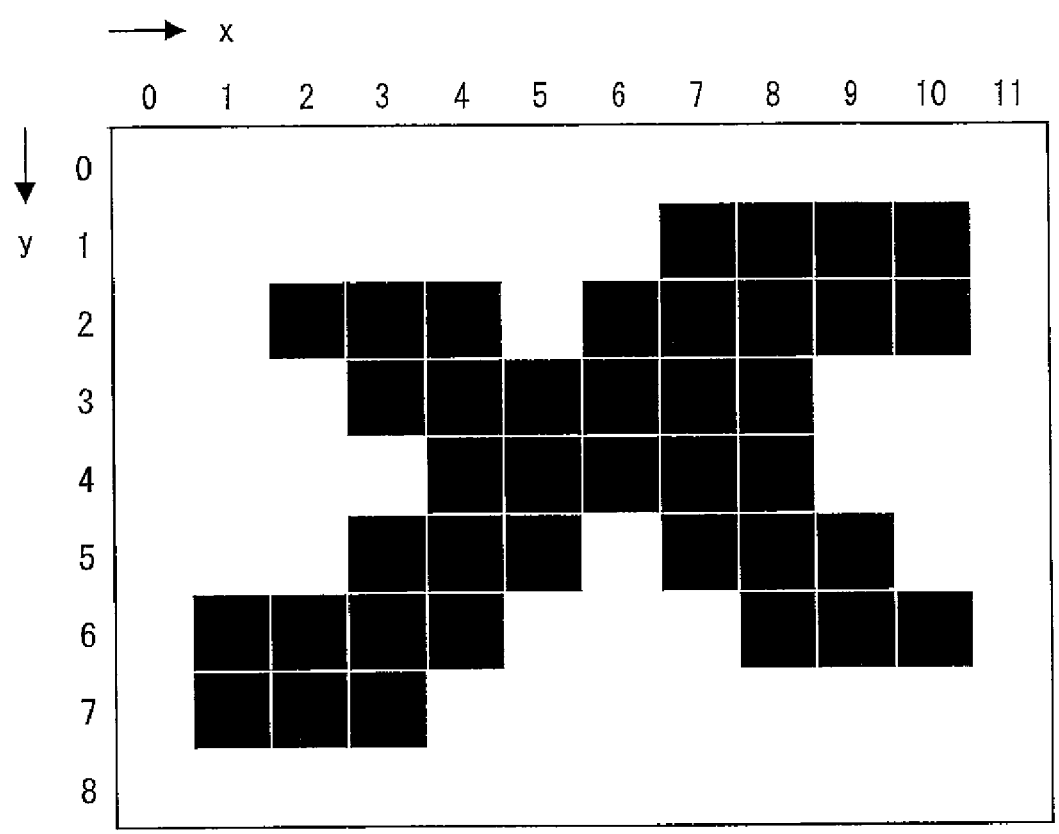
FIG. 23 is an explanatory drawing illustrating an example of input image data.

Next, using a process on image data in FIG. 23 as an example, the following further details a process for extracting line images in oblique directions and a process for extracting an intersection of the line images, which are carried out by the intersection calculation section 45 in FIG. 22.

Figure 24:
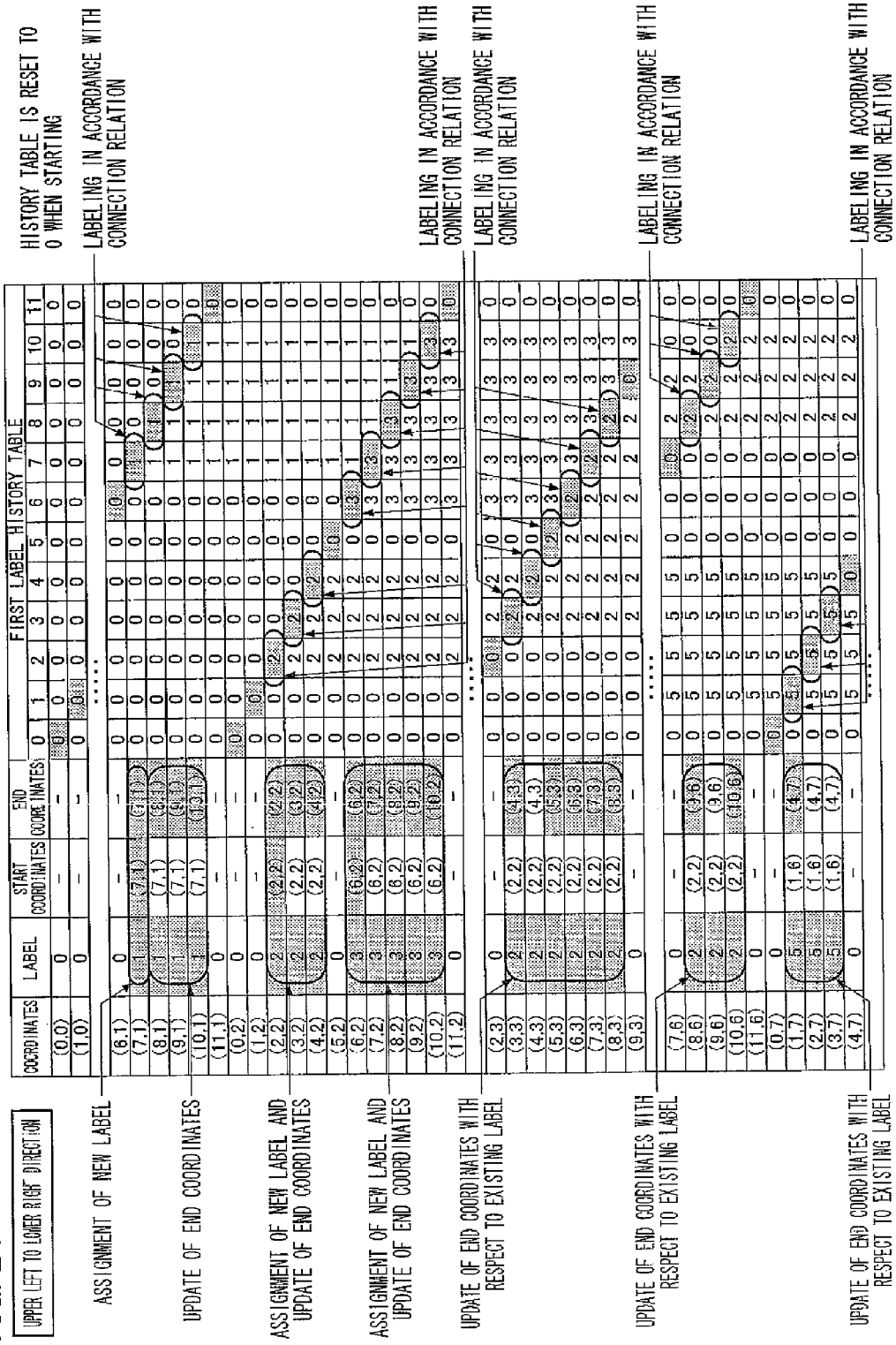
FIG. 24 is an explanatory drawing illustrating how to label pixels when detecting (with use of start/end coordinates of a line) a line image extending from upper left to lower right from the input image data in FIG. 23.

FIG. 24 is an explanatory drawing illustrating a procedure of labeling a pixel when scanning the image in FIG. 23 from upper left to lower right. With reference to FIG. 24, an explanation is made as to a process in scanning from upper left to lower right.

First, when scanning starts, the first label history table 66 is reset to "0." Thereafter, scanning is performed from upper left to lower right (in the order of coordinates (0,0)→(1,0)→(2, 0)→ . . . →(11,0)→(0,1)→(1,1)→ . . . ).

A black pixel does not exist before coordinates (7,1) and therefore all information stored in the first label history table 66 is kept to be an initial value "0."

A black pixel exists on the coordinates (7,1) and therefore labeling is performed. Here, a pixel adjacent to the left side of the black pixel is labeled as "0" (label at x=6 in the first label history table 66) and a pixel adjacent to the upper side of the black pixel is labeled as "0" (pre-updated label at x=7 in the first label history table 66), and no pixels prior to the black pixel have been labeled. Therefore, the first labeling section 63 assigns a new label (label "1") to the pixel on the coordinates (7,1). Further, the first labeling section 63 causes the coordinates (7,1) and the label "1" assigned to the pixel on the coordinates (7,1) to be stored in the storage section (not shown) in such a manner that the coordinates (7,1) and the label "1" are related to each other. Further, start coordinates of the label "1" are regarded as (7,1) and end coordinates of the label "1" are regarded as (7,1). That is, the coordinates are set so that xst=7, yst=1, xend=7, and yend=1. Further, a label at x=7 in the first label history table 66 is updated to "1."

A black pixel exists on the next coordinates (8,1) and therefore labeling is performed. Here, since the label of a pixel adjacent to the left side of the black pixel (label at x=7 in the first label history table 66) is not "0", the first labeling section 63 assigns, to the pixel on the coordinates (8,1), the same label as that of the label adjacent to the left side of the coordinates (8,1) (label "1"). Further, the first labeling section 63 causes the coordinates (8,1) and the label "1" assigned to the pixel on the coordinates (8,1) to be stored in the storage section (not shown) in such a manner that the coordinates (8,1) and the label "1" are related to each other. Further, since the condition (c) is satisfied, the end coordinates of the label "1" are updated to (8,1). That is, xend is updated to "8." Further, the label at x=8 in the first label history table 66 is updated to "1."

The similar process is performed with respect to coordinates (9,1) and (10,1). Thus, label "1" is assigned to the coordinates (9,1) and (10,1), and these coordinates and the label "1" are stored in the storage section (not shown) in such a manner that these coordinates and the label "1" are related to each other. Further, when labeling the pixel on the coordinates (10,1), the end coordinates of the label "1" is updated to (10,1) since the condition (c) is satisfied (the end coordinates are updated at the time of the coordinates (9,1), and then overwritten by information of the coordinates (10,1)). Further, labels at x=9 and 10 in the first labeling history table 66 are updated to "1."

The procedure goes on in the similar manner. A new label (label "2") is assigned to a pixel on coordinates (2,2), and the coordinates (2,2) and label "2" assigned to the pixel on the coordinates (2,2) are stored in the storage section (not shown) in such a manner that the coordinates (2,2) and the label "2" are related to each other. The start coordinates of the label "2" are regarded as (2,2) and the end coordinates of the label "2" are regarded as (2,2). The label at x=2 in the first label history table 66 is updated to "2."

Further, label "2" is assigned to a pixel on coordinates (3,2), and the coordinates (3,2) and label "2" assigned to the pixel on the coordinates (3,2) are stored in the storage section (not shown) in such a manner that the coordinates (3,2) and the label "2" are related to each other. Since the condition (c) is satisfied, the end coordinates of the label "2" are updated to (3,2). The label at x=3 in the first label history table 66 is updated to "2."

Similarly, label "2" is assigned to a pixel on coordinates (4,2), and the coordinates (4,2) and label "2" assigned to the pixel on the coordinates (4,2) are stored in the storage section (not shown) in such a manner that the coordinates (4,2) and the label "2" are related to each other. Since the condition (c) is satisfied, the end coordinates of the label "2" are updated to (4,2). The label at x=4 in the first label history table 66 is updated to "2."

A new label (label "3") is assigned to a pixel on coordinates (6,2), and the coordinates (6,2) and the label "3" assigned to the pixel on the coordinates (6,2) are stored in the storage section (not shown) in such a manner that the coordinates (6,2) and the label "3" are related to each other. The start coordinates of the label "3" are regarded as (6,2) and the end coordinates of the label "3" are regarded as (6,2). The label at x=6 in the first label history table 66 is updated to "3."

The similar process is performed with respect to coordinates (7,2) to (10,2). Thus, label "3" is assigned to these coordinates, and these coordinates and the label "3" are stored in the storage section (not shown) in such a manner that these coordinates and the label "3" are related to each other. Further, when processing the pixel on the coordinates (10,2), the end coordinates of the label "3" are updated to (10,2) (the end coordinates are updated at the time of the coordinates (7,2) to (9,2), and then overwritten by information of the coordinates (10,2)). Further, labels at x=7 to 10 in the first labeling history table 66 are updated to "3."

Further, a pixel on coordinates (3,3) is a black pixel, a label of a pixel adjacent to the left side of the black pixel (label at x=2 in the first label history table 66) is "0", and a label of a pixel adjacent to the upper side of the black pixel (pre-updated label at x=3 in the first label history table 66) is "2." Therefore, label "2" is assigned to the pixel on the coordinates (3,3), the coordinates (3,3) and the label "2" assigned to the pixel on the coordinates (3,3) are stored in the storage section (not shown) in such a manner that the coordinates (3,3) and the label "2" are related to each other, and the end coordinates of the label "2" are updated to (4,3) since the condition (d) is satisfied. Further, the label at x=3 in the first label history table 66 is updated to "2."

The same process is performed with respect to coordinates (4,3) to (8,3). A label "2" is assigned to the coordinates (4,3) to (8,3), and these coordinates and the label "2" assigned to these coordinates are stored in the storage section (not shown) in such a manner that these coordinates and the label "2" are related to each other. Further, since the condition (c) is satisfied, end coordinates of the label "2" are updated to (8,3) (the end coordinates are updated at the time of the coordinates (5,3) to (7,3), and then overwritten by information of the coordinates (8,3)). Further, labels at x=4 to 8 in the first label history table 66 are updated to "2."

Thereafter, scanning and labeling are performed in the similar manner up to the lower right pixel (coordinates (11, 8)). When scanning and labeling have been completed up to the lower right pixel (coordinates (11,8)), the control section 7 causes the first labeling information storage section 64*b* to output each label and start coordinates and end coordinates of each label to the line judgment section 71.

Figure 25:
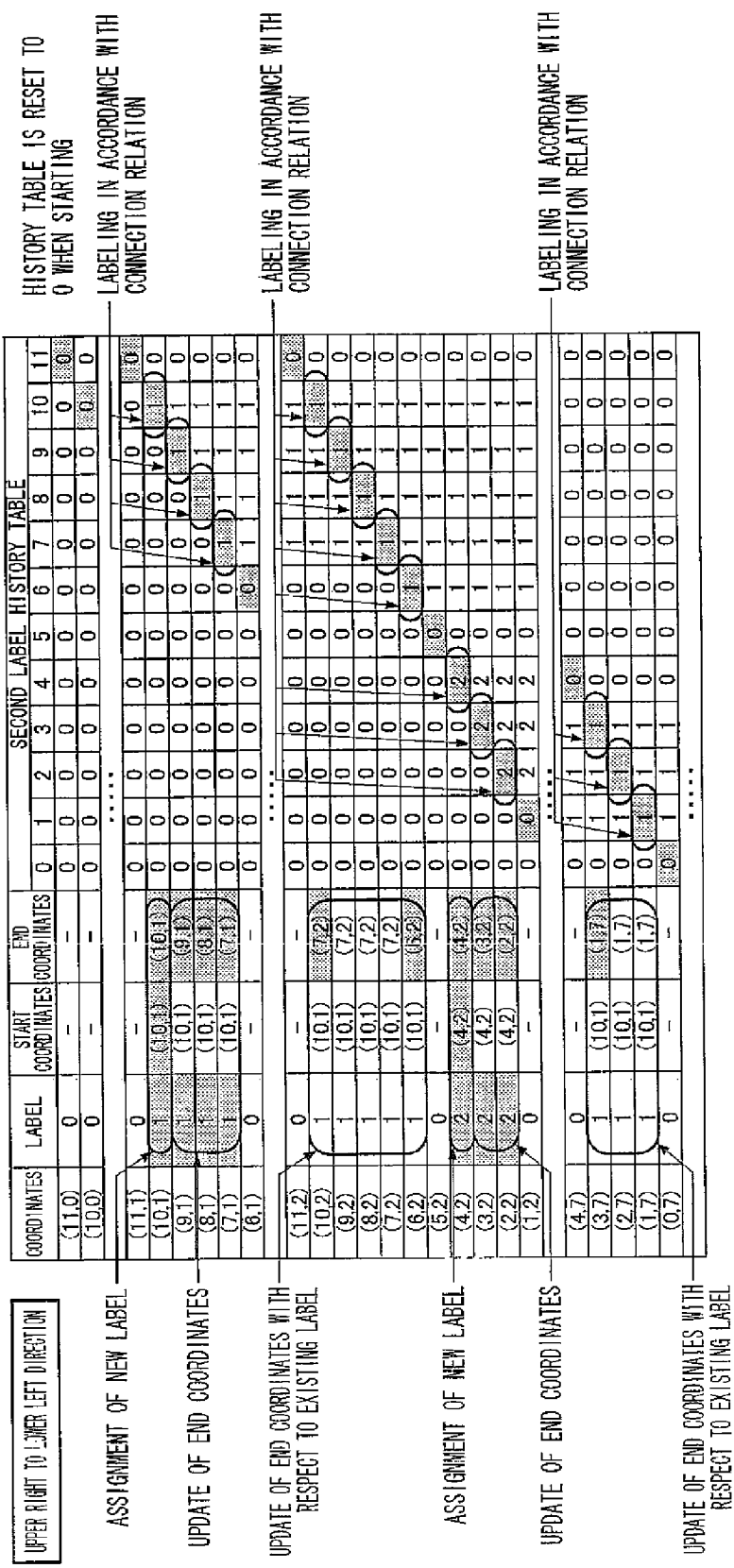
FIG. 25 is an explanatory drawing illustrating how to label pixels when detecting (with use of start/end coordinates of a line) a line image extending from upper right to lower left from the input image data in FIG. 23.

Next, with reference to FIG. 25, the following explains a labeling process when scanning from upper right to lower left. FIG. 25 is an explanatory drawing illustrating a procedure for labeling when scanning the image in FIG. 23 from upper right to lower left.

First, when the scanning starts, the second label history table 70 is reset to "0." Thereafter, scanning is performed from upper right to lower left (in the order of coordinates (11,0)→(10,0)→(9,0)→ . . . (0,0)→(11,1)→(10,1)→ . . . ).

A black pixel does not exist before a pixel on coordinates (10,1) and therefore all information stored in the second label history table 70 is kept to be an initial value "0."

A black pixel exists on the coordinates (10,1) and therefore labeling is performed. Here, a pixel adjacent to the right side of the black pixel is labeled as "0" (label at x=11 in the second label history table 70) and a pixel adjacent to the upper side of the black pixel is labeled as "0" (pre-updated label at x=10 in the second label history table 70) and no pixels prior to the black pixel have been labeled. Therefore, the second labeling section 67 assigns a new label (label "1") to the pixel on the coordinates (10,1). Further, the control section 7 causes the coordinates (10,1) and the label "1" assigned to the pixel on the coordinates (10,1) to be stored in the storage section (not shown) in such a manner that the coordinates (10,1) and the label "1" are related to each other. Further, the control section 7 considers start coordinates of the label "1" as (10,1) and considers end coordinates of the label "1" as (10,1). Further, a label at x=10 in the second label history table 70 is updated to "1."

Thereafter, a label is assigned to each black pixel in accordance with: the label of a pixel adjacent to the right side of the black pixel; a label of a pixel adjacent to the upper side of the black pixel; and an already assigned label, and a label of a column including the black pixel in the second label history table 70 is updated. Further, coordinates of a pixel having been labeled (pixel whose label is other than "0") and a label assigned to the pixel are stored in the storage section (not shown) in such a manner that the pixel and the label are related to each other.

When scanning and labeling have been completed up to the lower left pixel (coordinates (0,8)), the control section 7 causes the second labeling information storage section 68b to output each label and start/end coordinates of each label to the line judgment section 71.

Next, with reference to FIG. 46, an explanation is made as to a line judgment process in the line judgment section 71 and an intersection extraction process in the intersection extraction section 72. FIG. 46 is an explanatory drawing illustrating the image data in FIG. 23, the result of labeling the image data, the result of line judgment, and the result of extracting an intersection.

As illustrated in FIG. 46, in a case of the image data in FIG. 23, five kinds of labels (labels "1" to "5") are assigned to pixels when scanning from upper left to lower right.

The line judgment section 71 calculates a distance d between start coordinates $(x_{st}, y_{st})$ of each pixel and end coordinates $(x_{end}, y_{end})$ of each pixel in accordance with $d=\sqrt{((xst-xend)^2+(yst-yend)^2)}$. In the example in FIG. 46, the distance d for label "1" is "3", the distance d for label "2" is "8.94", the distance d for label "3" is "4", the distance d for label "4" is "2", and the distance d for label "5" is "3.16."

Further, the line judgment section 71 compares the calculated distance d for each label with a predetermined threshold value ("8" in the present embodiment), and judges that an image made of pixels corresponding to a label for which the distance d is not less than the threshold value is a line image. In the example in FIG. 46, an image made of pixels corresponding to label "2" is judged as a line image.

When judging that the image is a line image, the line judgment section 71 reads out coordinates of pixels constituting the line image from the storage section and outputs the coordinates to the intersection extraction section 72.

As illustrated in FIG. 46, four kinds of labels (labels "1" to "4") are applied to pixels when scanning from upper right to lower left. The distance d for label "1" is "10.82", the distance d for label "2" is "2", the distance d for label "3" is "2", and the distance d for label "4" is "2." Therefore, in this case, the line judgment section 71 judges that an image made of pixels corresponding to label "1" for which the distance d is not less than a threshold value "8" is a line image. When judging that the image is a line image, the line judgment section 71 reads out coordinates of pixels constituting the line image from the storage section and outputs the coordinates to the intersection extraction section 72.

The intersection extraction section 72 calculates, as an intersection of line images, centric coordinates of pixels that are judged as line images both in scanning from upper left to lower right and in scanning from upper right to lower left. The calculation of the centric coordinates may be performed by calculating average values of x-coordinates and average values of y-coordinates and rounding digits after the decimal point of the average values. In the example of FIG. 46, with the calculation, coordinates (3,3) to (8,3) and (4,4) to (8,4) are extracted as pixels having been judged as being parts of line images both in scanning from upper left to lower right and in scanning from upper right to lower left, and coordinates (6,3) that are centric coordinates of the pixels are calculated as an intersection of the line images.

FIG. 47 is an explanatory drawing illustrating a difference in the result of detecting line images in oblique directions between a case where the line images are detected using a label count value and a case where the line images are detected using a distance between start coordinates and end coordinates of the line images.

The upper side of FIG. 47 illustrates the result of detecting line images from the image in FIG. 23 using a label count value, and the result of detecting line images from the image in FIG. 23 using the distance between start coordinates and end coordinates of the line images. As illustrated in the upper right side in FIG. 47, the label count value of label 1 is 30 and the distance between the start coordinates and the end coordinates is 10.82.

On the other hand, the lower side of FIG. 47 illustrates (i) the result of detecting line images using a label count value and (ii) the result of detecting line images using a distance between start coordinates of a line image and end coordinates of the line image, from an image obtained by thinning line image parts in the image in FIG. 23 as a whole. As illustrated in the lower right of FIG. 47, a label count value of the label 1 is 20 and the distance between the start coordinates and the end coordinates is 10.82.

As described above, in a case where a line image is detected using a label count value, a label count value increases as a line is wider. Consequently, line images with the same length have different label count values depending on the widths of the line images. Therefore, in the example of FIG. 47, when the threshold value of the label count value is between 20 and 30 (e.g. 25), the result of detecting a line varies depending on the width of the line.

In contrast, in a case where a line image is detected using a distance between start coordinates and end coordinates of the line image, when line images have the same length, the line images have substantially the same distance between the start coordinates and the end coordinates even though the line images have different widths.

Therefore, in a case where judgment of a line image is required to be performed without depending on the width of the line image, it is preferable that the line image is detected using the distance between the start coordinates and the end coordinates of the line image.

In the above example, the intersection extraction section 72 calculates, as an intersection of line images, centric coordinates of pixels judged as being parts of line images in scanning both from upper left to lower right and from upper right to lower left. However, a method for extracting an intersection is not limited to this.

Figure 51:
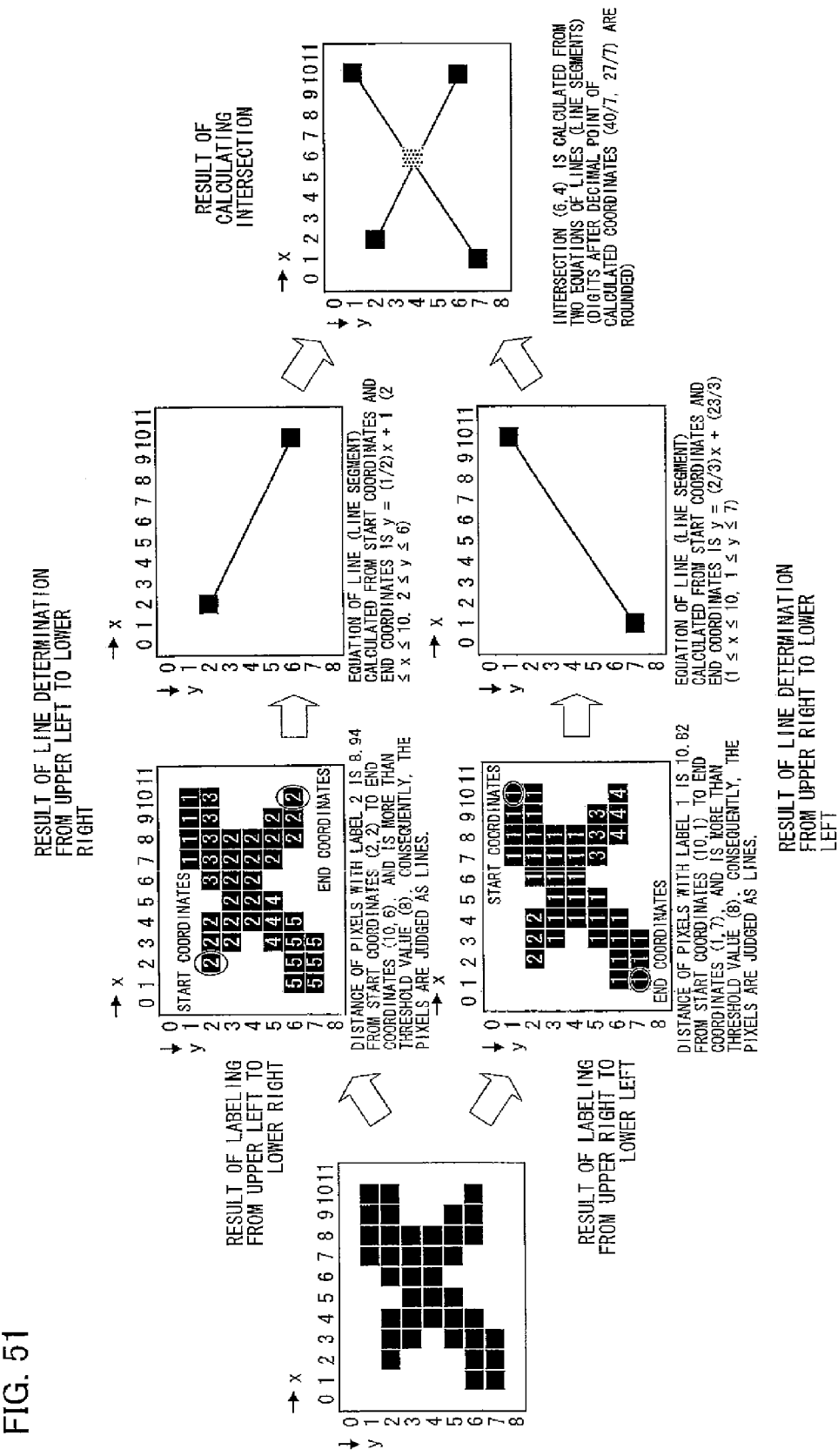
FIG. 51 is an explanatory drawing illustrating a case of using equations of lines (line segments) when calculating an intersection of the lines in FIG. 46.

For example, as illustrated in FIG. 51, an equation of a line (line segment) of a line image detected in scanning from upper left to lower right is calculated based on start coordinates and end coordinates of the line image. Similarly, an equation of a line (line segment) of a line image detected in scanning from upper right to lower left is calculated based on start coordinates and end coordinates of the line image. Coordinates of the intersection are calculated based on the equations of these two lines (line segments).

Specifically, as illustrated in FIG. 51, in the case of the image in FIG. 23, start coordinates and end coordinates of a pixel to which label 2 is assigned and which has been judged as being a part of a line when scanning from upper left to lower right are (2,2) and (10,6), respectively. Consequently, an equation of a line (line segment) between the two points is as follows.

$$y=x/2+1$$

where $2 \leq x \leq 10$ and $2 \leq y \leq 6$.

Further, start coordinates and end coordinates of a pixel to which label "1" is assigned and which has been judged as being a part of a line when scanning from upper right to lower left are (10,1) and (1,7), respectively. Consequently, an equation of a line (line segment) between the two points is as follows.

$$y=-2x/3+23/3$$

where $1 \leq x \leq 10$ and $1 \leq y \leq 7$.

The coordinates of the intersection are calculated to be $(40/7, 27/7) \approx (5.71, 3.86)$ in accordance with the equations of two lines (line segments). Rounding digits after the decimal point, the coordinates of the intersection are (6,4).

As with calculation of an intersection of line images in oblique directions, calculation of an intersection of line images in horizontal and vertical directions may be performed in such a manner that equations of lines of two line images are calculated, an intersection of the two lines is calculated in accordance with the equations, and coordinates corresponding to the calculated intersection are regarded as the intersection of the two line images.

Further, in the present embodiment, calculation of an intersection is performed with respect to each of pixels binarized by the binarization process section 44. However, the present invention is not limited to this.

For example, in a case where an area of a connected region of black pixels is not less than a predetermined value, or in a case where a width in a vertical direction and a width of a horizontal direction of the connected region of black pixels are not less than predetermined values, the intersection calculation process may be omitted with respect to the connected region. With this omission, when a region whose area is not less than a predetermined range is daubed with black, the region is detected as a local background (when the region is large) or an isolated point (when the region is small), thereby eliminating the region from the target of the intersection calculation process.

Further, the present invention may be arranged so that there is provided edge detection means for performing an edge detection process on input image data before the intersection calculation process, and the intersection calculation process is performed with respect to a pixel detected as an edge. In this case, even when a region whose area is not less than a predetermined range is daubed with black, it is possible to detect a few pixels as an edge from a peripheral part of the region, and to perform a line detection process and an intersection calculation process on the few pixels. Examples of the edge detection include: a method in which an absolute value of a difference in pixel values between a target pixel and a pixel adjacent to the target pixel is calculated, and when the calculated absolute value is not less than a predetermined threshold value, it is judged that an edge exists; and a method in which the result of a process by Sobel filter or Laplacian filter is subjected to a threshold value process so as to extract an edge.

In the present embodiment, an explanation was made as to a case where the present invention is applied to the digital color multi-function printer 1. However, the present invention is not limited to this case. For example, the present invention may be applied to a monochrome multi-function printer.

Alternatively, the present invention may be applied to a single-function apparatus such as a facsimile communication apparatus, a copier, and an image reading apparatus.

Figure 26:
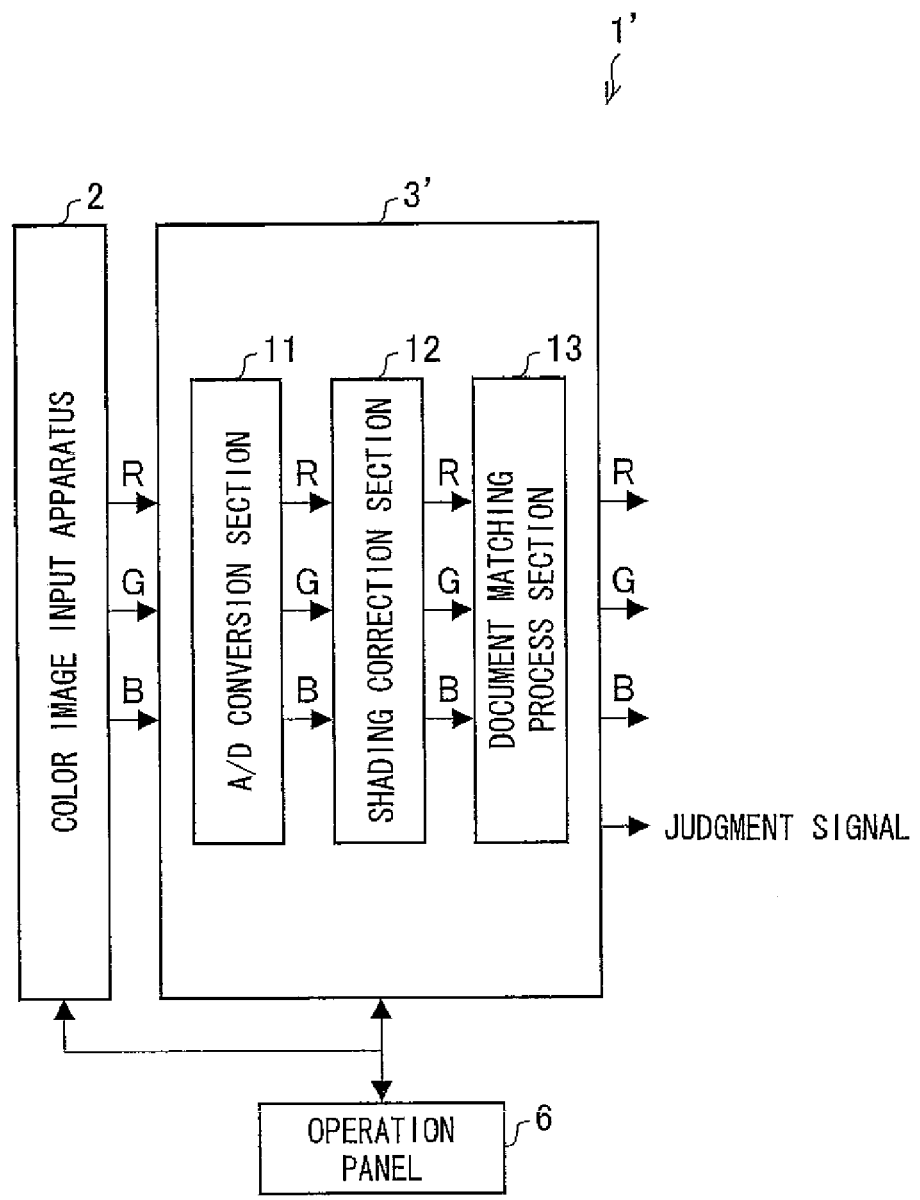
FIG. 26 is a block diagram illustrating a modification example of an image processing apparatus in accordance with an embodiment of the present invention.

FIG. 26 is a block diagram illustrating an example of an arrangement in which the present invention is applied to a flat bed scanner (image reading apparatus, image processing apparatus) 1'.

As illustrated in FIG. 26, the flat bed scanner 1' includes a color image input apparatus 2 and a color image processing apparatus 3'. The color image processing apparatus 3' includes an A/D conversion section 11, a shading correction section 12, a document matching process section 13, a control section 7 (not shown in FIG. 26), and a memory 8 (not shown in FIG. 26). The color image input apparatus 2 is connected with the color image processing apparatus 3', and the color image input apparatus 2 and the color image processing apparatus 3' constitute the image reading apparatus 1' as a whole. Functions of the A/D conversion section 11, the shading correction section 12, the document matching process section 13, the control section 7, and the memory 8 included in the color image processing apparatus 3' are substantially the same as those of the members in the digital color multi-function printer 1 as described above and therefore explanations thereof are omitted here.

Figure 27:
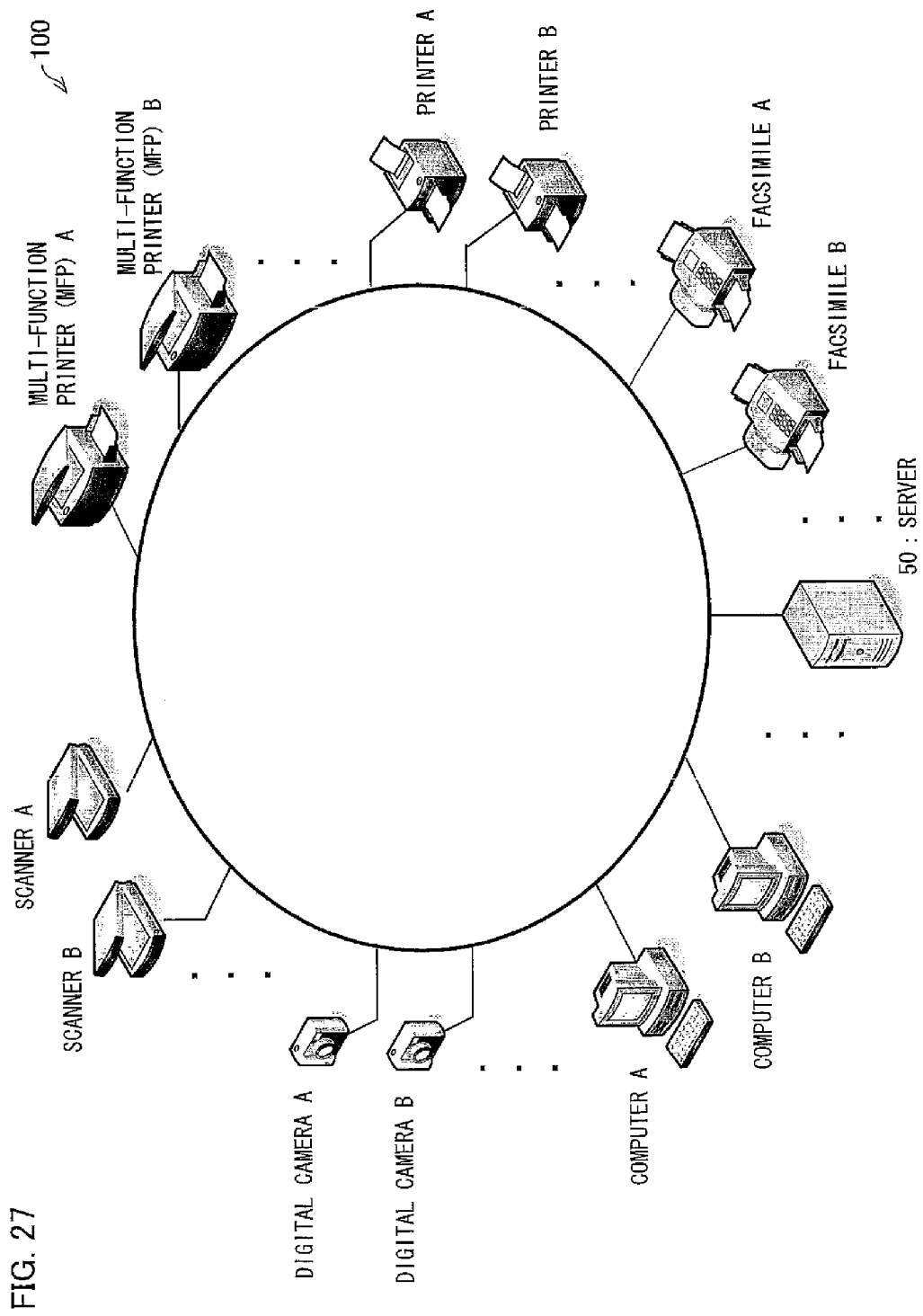
FIG. 27 is an explanatory drawing illustrating an arrangement of an image processing system in accordance with an embodiment of the present invention.

The function of the document matching process section 13 may be realized by an image processing system including the image processing apparatus and a server communicably connected with the image processing apparatus. FIG. 27 is an explanatory drawing illustrating an arrangement of an image processing system 100 that includes an image processing apparatus (multi-function printers (MFPs) A, B, . . . ; printers A, B, . . . , facsimiles A, B, . . . ; computers A, B, . . . ; digital cameras A, B, . . . , scanners A, B, . . . ) and a server 50 communicably connected with the image processing apparatus. The arrangement of the image processing system 100 is not limited to this. For example, the image processing system 100 may include the server 50 and at least one of a multi-function printer, a printer (image forming apparatus), a facsimile, a computer, a digital camera (image reading apparatus), and a scanner (image reading apparatus).

The scanner includes a scanner platen, an optical scanning section, CCD (charge coupled device) etc. The scanner scans a document image on the scanner platen with use of the optical scanning section, thereby reading the document image and generating image data. The digital camera includes an image-capture lens, a CCD (image input device) etc. The digital camera captures a document image, a person image, a landscape image etc. and generates image data. The scanner and the digital camera may have a function for performing a predetermined image process (such as various correction processes) in order to reproduce an image suitably. The printer prints on a sheet (recording paper) an image according to image data generated by the computer, the scanner, and the digital camera. The facsimile performs a process such as a binary process, a resolution conversion process, and a rotation process on image data supplied from the image input apparatus to obtain image data encoded into a predetermined format and sends the image data to the other end, or the facsimile receives image data from the other end, decodes the image data, performs a rotation process, a resolution conversion process, and a halftone process on the image data in accordance with performance of an image output apparatus, and outputs the image data as an image per page. The multi-function printer includes at least two functions out of a scanner function, a facsimile transmission function, and a printing function (copy function, printer function). The computer edits image data read by the scanner and the digital camera, or generates a document with use of application software.

In the image processing system 100, sections of the document matching process section 13 are divided into the server 50 and the image processing apparatus connected with the server 50 via a network. The image processing apparatus and the server 50 cooperate to realize the function of the document matching process section 13.

Figure 28:
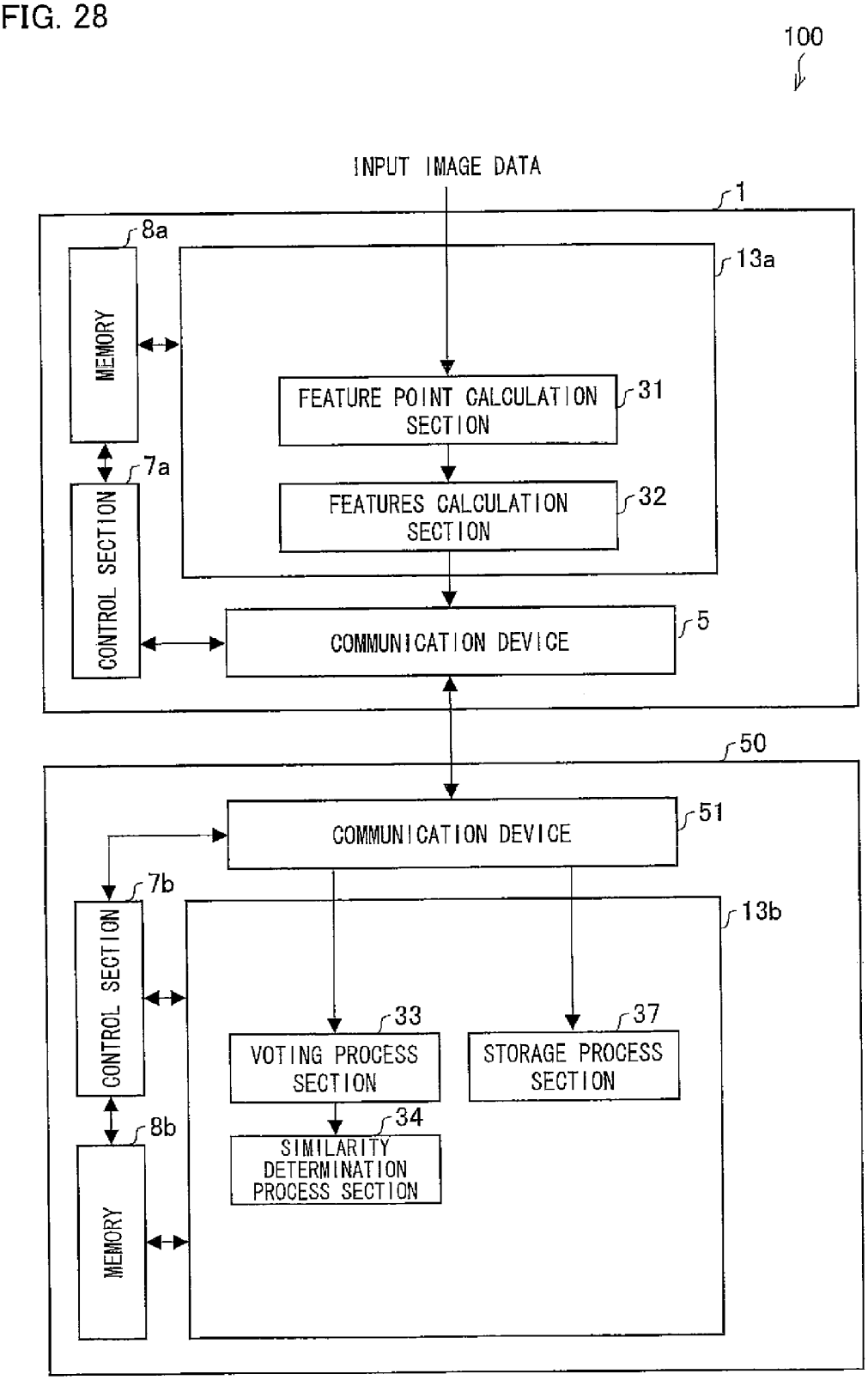
FIG. 28 is a block diagram illustrating an example of an arrangement of an image processing system in accordance with an embodiment of the present invention.

FIG. 28 is a block diagram illustrating an example of an arrangement in which the function of the document matching process section 13 is divided into the server 50 and the digital color multi-function printer 1.

As illustrated in FIG. 28, the color image processing apparatus 3 of the digital color multi-function printer 1 includes: a document matching process section 13a including a feature point calculation section 31 and a features calculation section 32; a control section 7a for controlling the operation of the document matching process section 13a; a memory 8a in which information necessary for the process of the document matching process section 13a is stored; and a communication device 5 for communicating with an external device. The server 50 includes: a communication device 51 for communicating with an external device; a document matching process section 13b including a voting process section 33, a similarity determination process section 34, and a storage process section 37; a control section 7b for controlling the document matching process section 13b; and a memory 8b in which information necessary for the process of the document matching process section 13b is stored. In a case where transmission/reception of data is required between functional blocks of the digital color multi-function printer 1 and functional blocks of the server 50, the control sections 7a and 7b control the communication devices 5 and 51, respectively, so that transmission/reception of data is performed suitably. Other functions are the same as those already explained above.

Figure 29:
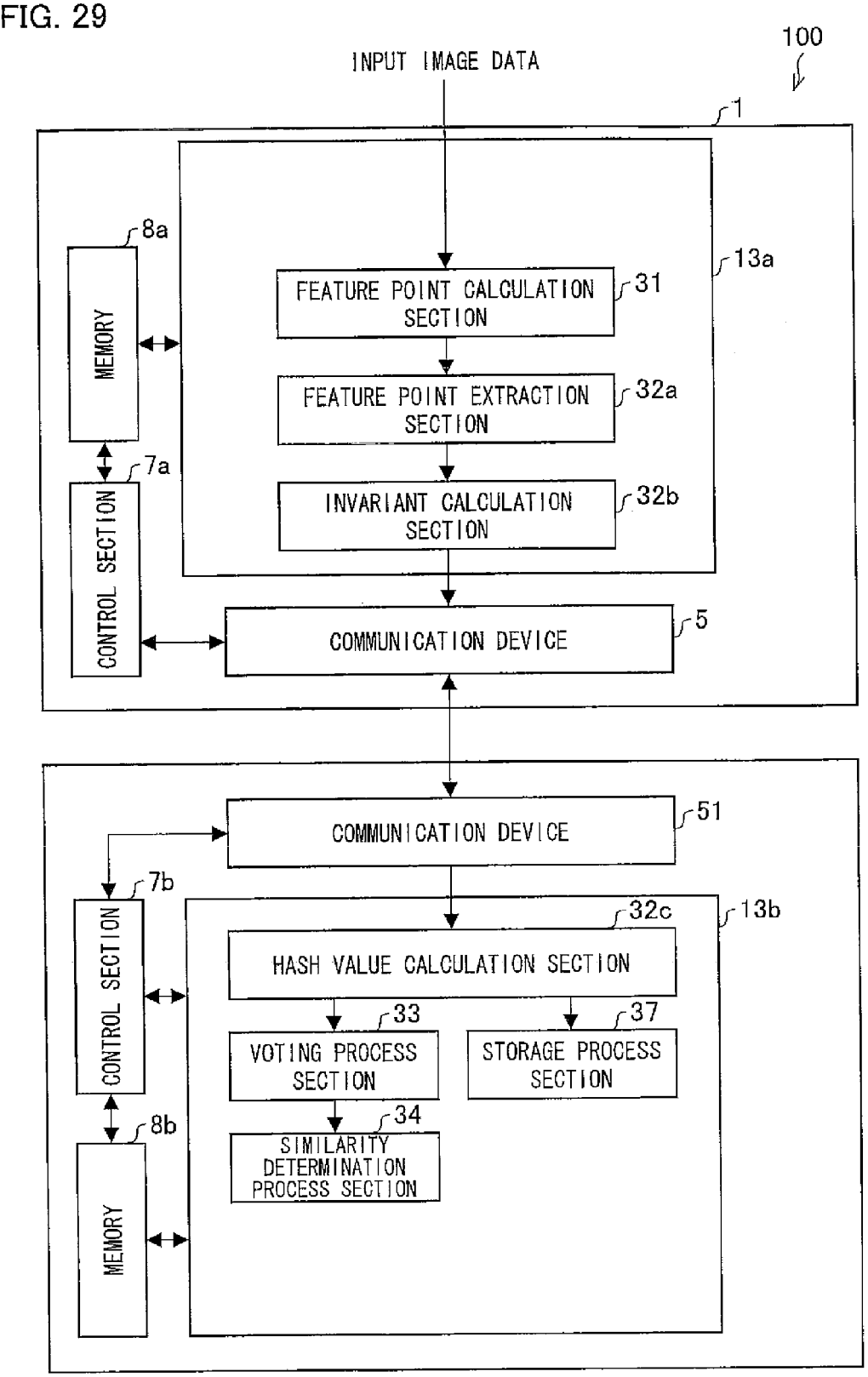
FIG. 29 is a block diagram illustrating another example of an arrangement of an image processing system in accordance with an embodiment of the present invention.

In the example of FIG. 28, all members of the features calculation section 32 (feature point extracting section 32a, invariant calculation section 32b, and hash value calculation section 32c) are included in the digital color multi-function printer 1. Alternatively, the present invention may be arranged so that, as illustrated in FIG. 29, the feature point extracting section 32a and the invariant calculation section 32b are provided in the digital color multi-function printer 1 whereas the hash value calculation section 32c is provided in the server 50.

Alternatively, the present invention may be arranged so that members of the features calculation section 32 are provided in the server 50, data indicative of a feature point calculated by the feature point calculation section 31 is transmitted from the digital color multi-function printer 1 to the server 50, and the features calculation section 32 provided in the server 50 calculates a hash value based on the hash table 103 stored in the memory 8b and the received data indicative of the feature point. Alternatively, the present invention may be arranged so that members of the feature point calculation section 31 and the features calculation section 32 are provided in the server 50, input image data is transmitted from the digital color multi-function printer 1 to the server 50, and the feature point calculation section 31 and the features calculation section 32 provided in the server 50 calculate a hash value based on the input image data received from the server 50 and the hash table 103 stored in the memory 8b.

An explanation was made above as to a case where a similarity determination process is performed. In a case where a storage process is performed, the storage process section 37 included in the server 50 causes (i) document ID received from the digital color multi-function printer 1 and (ii) a hash value received from the digital color multi-function printer 1 (or hash value calculated by the hash value calculation section 32c included in the server 50) to be stored in a hash table provided in the memory 8b. Whether to perform the similarity determination process or the storage process may be designated by a user of the digital color multi-function printer 1 from the operation panel 6 so that a signal indicative of the designated process is transmitted to the server 50. Alternatively, the server 50 performs the storage process with respect to an input image determined as having no similarity as a result of the similarity determination process.

In a case where the hash value calculation section 32c is included in the server 50, the present invention may be arranged so that a hash value is calculated through a method different from the method used in calculating hash values stored in the hash table (i.e. using other hash function), and the hash table 103 is updated using the calculated hash value. With the arrangement, it is possible to store in the hash table a suitable hash value obtained by referring to features (invariant) according to the kind etc. of a document image (i.e. it is possible to update the hash table 103), and the voting process can be performed with use of the updated hash value. This allows increasing matching accuracy (accuracy in similarity determination).

Embodiment 2

The following explains another embodiment of the present invention. For convenience of explanation, members having the same functions as those in Embodiment 1 are given the same reference numerals and explanations thereof are omitted here.

Figure 32:
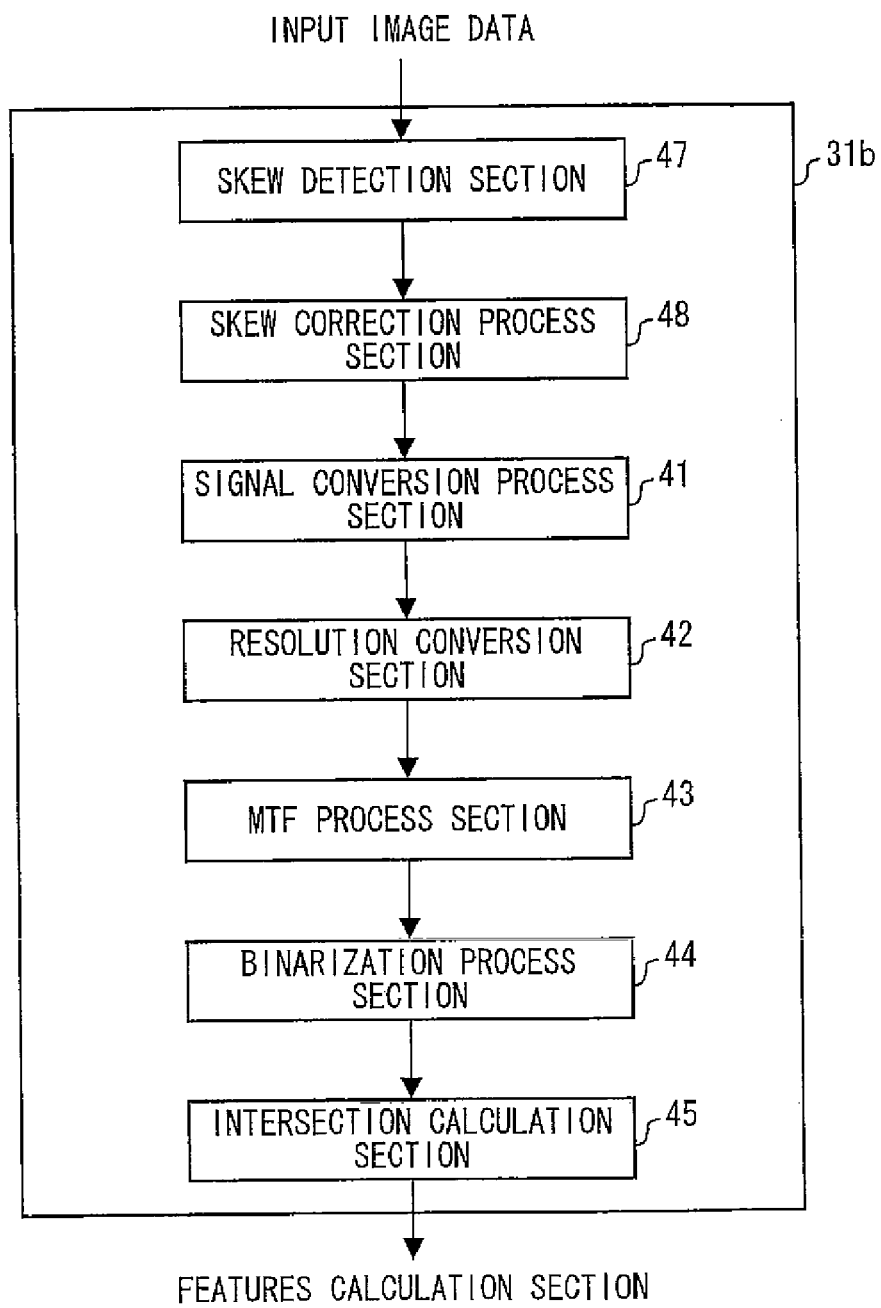
FIG. 32 is a block diagram illustrating a modification example of a feature point calculation section included in the document matching process section in FIG. 1.

FIG. 32 is a block diagram schematically illustrating an arrangement of the feature point calculation section 31b included in the digital color multi-function printer 1 of the present embodiment. The digital color multi-function printer 1 of the present embodiment includes the feature point calculation section 31b instead of the feature point calculation section 31 in Embodiment 1. The arrangement of the digital color multi-function printer 1 of the present embodiment is the same as that of the digital color multi-function printer 1 of Embodiment 1 except for the arrangement of the feature point calculation section.

As illustrated in FIG. 32, the feature point calculation section 31b includes not only the arrangement of the feature point calculation section 31 of Embodiment 1 but also a skew detection section 47 and a skew correction process section 48 at a stage previous to the signal conversion process section 41.

The skew detection section 47 detects a skew of an input image (skew of a document image in vertical and horizontal directions with respect to input image data including the document image). A method for detecting the skew is not particularly limited and may be one of conventional and publicly known methods.

Figure 33:
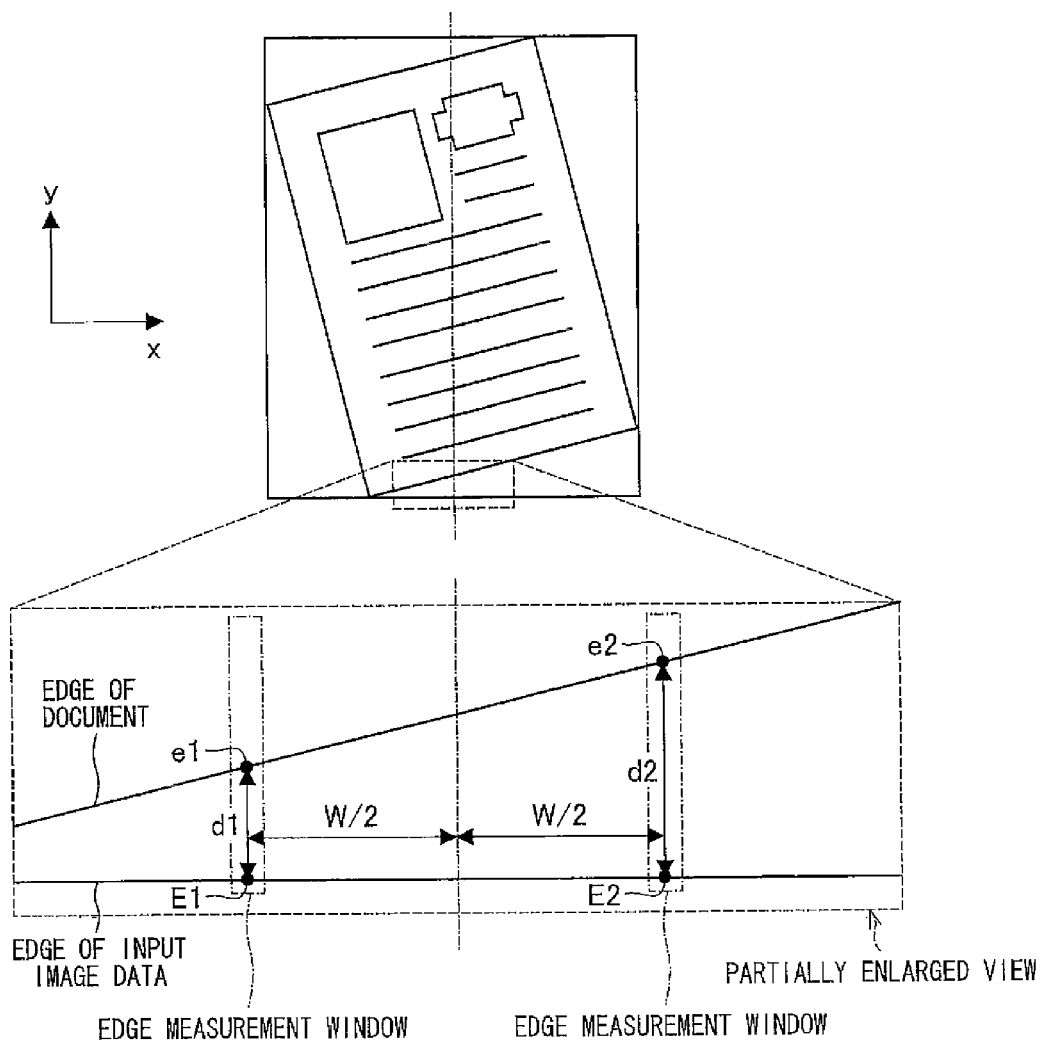
FIG. 33 is an explanatory drawing for explaining an example of an edge detection process carried out by a skew detection section in the feature point calculation section in FIG. 32.

For example, as illustrated in FIG. 33, at two points that are away from the center of input image data in the x direction (center of a scanned region in the x direction) toward both ends in the x direction by w/2, edges e1 and e2 of a document and edges E1 and E2 of input image data are detected. In accordance with a distance d1 from the edge e1 to the edge E1 in the y direction, a distance d2 from the edge e2 to the edge E2 in the y direction, and a distance w from the edge e1 to the edge e2 in the x direction, $\tan\theta=(d2-d1)/w$ is calculated. Thus, the angle of skew $\theta$ is calculated. The method for calculating the angle $\theta$ is not particularly limited. For example, the angle θ can be easily calculated with use of a tangent-angle table as illustrated in FIG. 34.

Figure 35:
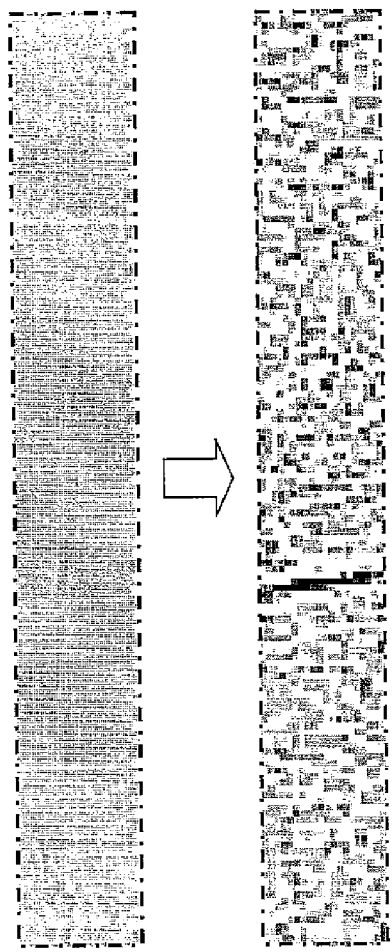
FIG. 35 is an explanatory drawing illustrating an example of an edge detection process carried out by the skew detection section in the feature point calculation section in FIG. 32.
Figure 36:
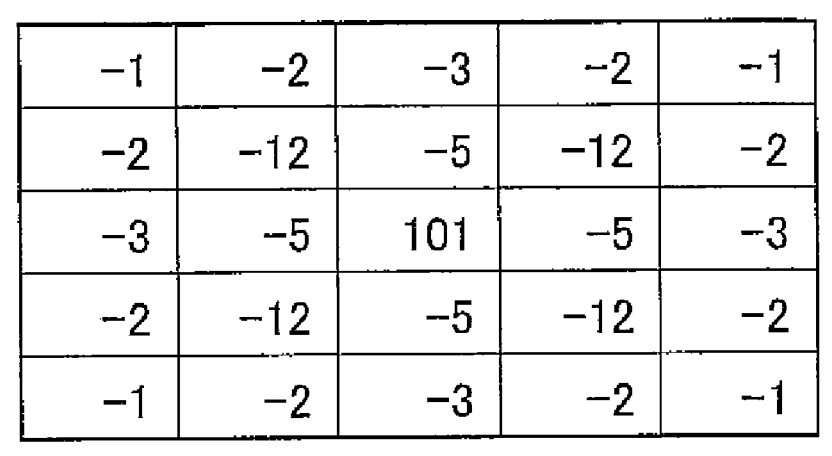
Figure 37:
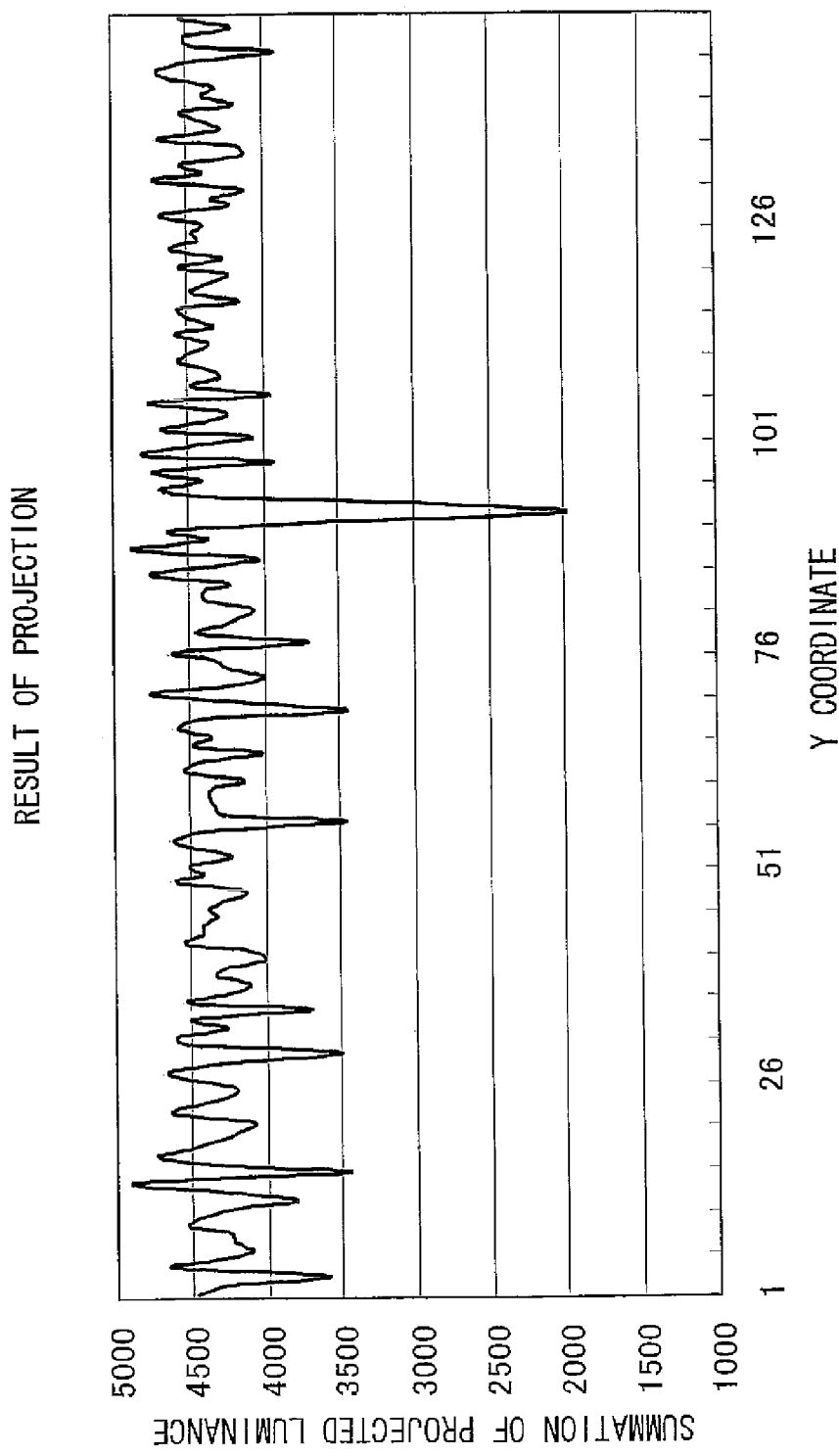
FIG. 37 is an explanatory drawing illustrating an example of the edge detection process carried out by the edge detection section in the feature point calculation section in FIG. 32.

An example of a method for extracting an edge of a document is a method for projecting a luminance value in an edge measurement window as illustrated in FIG. 33. Specifically, as illustrated in FIG. 35, input image data in the edge measurement window with a predetermined size (here, 20 pixels in the x direction and 150 pixels in the y direction) is subjected to an edge enhancement filter process (edge enhancement process) so as to obtain an edge-enhanced image. FIG. 36 illustrates an example of an edge detecting filter. In order to detect an edge in the vertical direction (y direction), the edge-enhanced image is subjected to a projection process for calculating the sum of pixel values in the horizontal direction (x direction), and a position with a peak in the vertical direction (e.g. minimum value) is selected. The projection process is performed in order to reduce the influence of noises. FIG. 37 is a graph illustrating the result of the projection.

The skew correction process section 48 corrects the skew of the document with respect to the input image data including the document, in accordance with the angle θ detected by the skew detection section 47. The method for the skew correction process is not particularly limited. For example, the method may be an affine transformation process with use of a rotation matrix.

In general, coordinates (x', y') obtained by rotating coordinates (x, y) by θ is represented by the rotation matrix equation as presented below.

$$\begin{pmatrix} x' \\ y' \end{pmatrix} = \begin{pmatrix} \cos\theta & -\sin\theta \\ \sin\theta & \cos\theta \end{pmatrix} \begin{pmatrix} x \\ y \end{pmatrix}$$

In a case of outputting a pixel value of an image, decimal values (xs, ys) corresponding to integral values (x', y') are calculated and interpolated with use of bi-linear etc. The decimal values (xs, ys) are calculated in accordance with the following matrix equation that is an inverse transform equation of the above rotation matrix equation.

$$\begin{pmatrix} xs \\ ys \end{pmatrix} = \begin{pmatrix} \cos\theta & \sin\theta \\ -\sin\theta & \cos\theta \end{pmatrix} \begin{pmatrix} x' \\ y' \end{pmatrix}$$

As illustrated in FIG. 38, in an x-y coordinate system, coordinates of four pixels surrounding (xs, ys) are represented by $(x_i, y_j)$, $(x_{i+1}, y_j)$, $(x_i, y_{j+1})$, and $(x_{i+1}, y_{j+1})$ (i and j are integers not less than 1). Here, $x_i \leq xs \leq x_{i+1}$ and $y_j \leq ys \leq y_{j+1}$. When values of the four pixels $(x_i, y_j)$, $(x_{i+1}, y_j)$, $(x_i, y_{j+1})$, and $(x_{i+1}, y_{j+1})$ are set to Z1, Z2, Z3, and Z4, respectively, and a ratio of the distance between $x_i$ and xs in the x direction to the distance between xs and $x_{i+1}$ in the x direction is set to u: 1−u, and a ratio of the distance between $y_j$ and ys in the y direction to the distance between ys and $y_{j+1}$ in the y direction is set to v: 1−v, a coordinate value Z after interpolation by bi-linear is represented by $Z_{(x', y')} = Z_{(xs, ys)} = (1-v)\{(1-u)Z_1 + u \cdot Z_2\} + v\{(1-u)Z_3 + u \cdot Z_4\}$. A method for calculating a trigonometric ratio is not particularly limited. The trigonometric ratio may be calculated with use of a table as with the example of FIG. 34.

Figure 39:
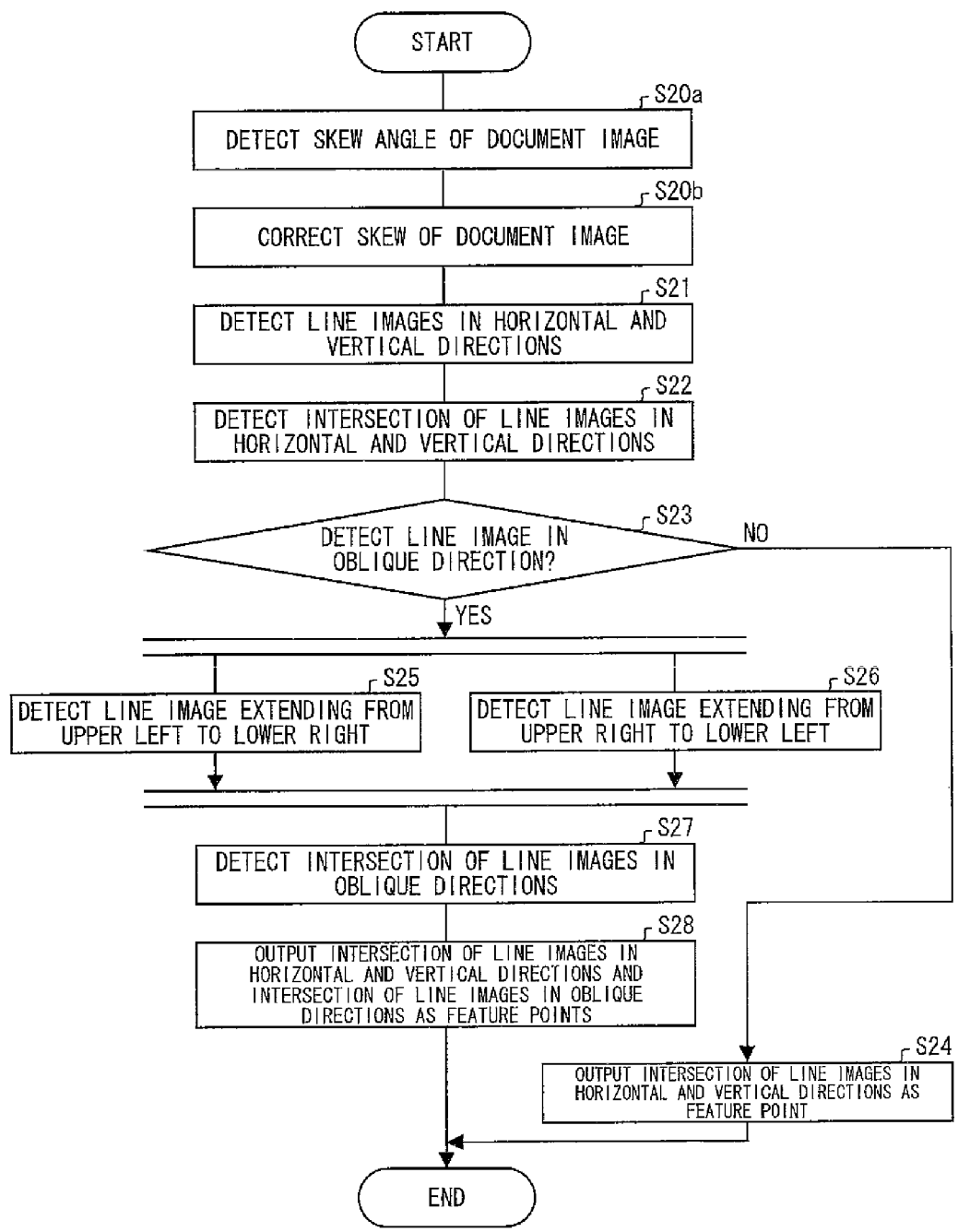
FIG. 39 is a flow chart illustrating a flow of a process carried out by the feature point calculation section in FIG. 32.

FIG. 39 is a flow chart illustrating a flow of a feature point calculation process carried out by the digital color multi-function printer 1 of the present embodiment.

As illustrated in FIG. 39, when image data is input from the shading correction section 12 to the feature point calculation section 31b, the skew detection section 47 detects a skew (skew angle) of an input image (S20a), and the skew correction process section 48 corrects the skew (skew angle) in accordance with the result of detection by the skew detection section 47 (S20b). Thereafter, the signal conversion process section 41 performs an achromatizing process, the resolution conversion section 42 performs a resolution conversion process, the MTF process section 43 performs an MTF process, and the binarization process section 44 performs a binarization process (each of the processes is not shown), and then the intersection calculation section 45 performs a process for detecting an intersection (feature point) through a method similar to that in FIG. 11 (S21-S28).

As described above, the digital color multi-function printer 1 of the present embodiment includes the skew detection section 47 and the skew correction process section 48, so that an intersection (feature point) is extracted after a skew of an input image is corrected. Consequently, in a case where a document image included in input image data is skewed with respect to the input image data (e.g. a case where a document is read while being skewed with respect to a predetermined positioning angle of a reading position of an image reading apparatus), it is possible to extract a feature point with high accuracy, just like a case where the document image is not skewed. Therefore, by calculating a similarity of images in accordance with features calculated based on the feature point thus extracted, it is possible to determine a similarity between an input image and a reference image with high accuracy.

Embodiment 3

The following explains further another embodiment of the present invention. For convenience of explanation, members having the same functions as those in Embodiments 1 and 2 are given the same reference numerals and explanations thereof are omitted here.

Figure 40:
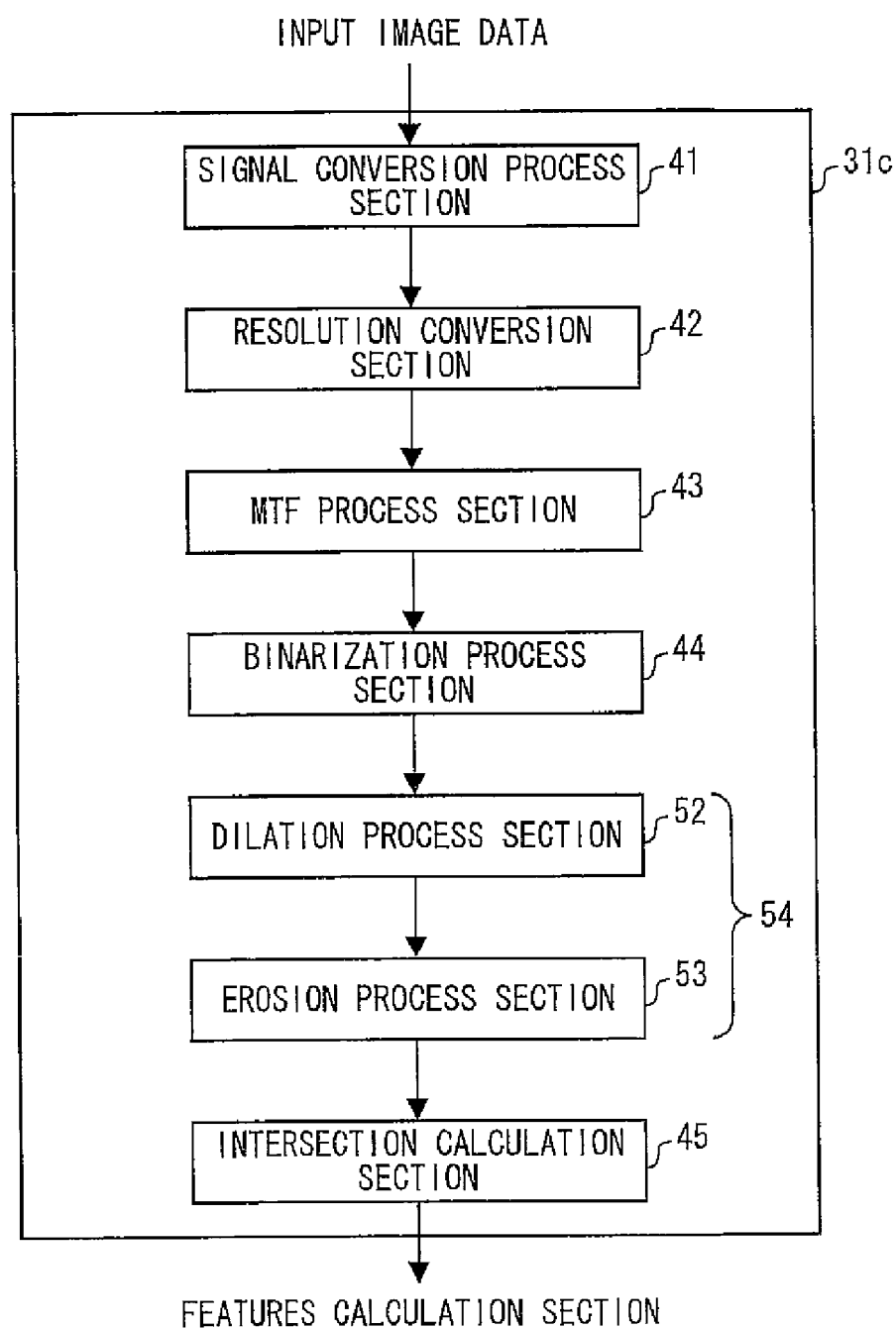
FIG. 40 is a block diagram illustrating a modification example of a feature point calculation section included in the document matching process section in FIG. 1.

FIG. 40 is a block diagram schematically illustrating an arrangement of a feature point calculation section 31c included in the digital color multi-function printer 1 of the present embodiment. The digital color multi-function printer 1 of the present embodiment includes the feature point calculation section 31c instead of the feature point calculation section 31 in Embodiment 1. The arrangement of the digital color multi-function printer 1 of the present embodiment is substantially the same as that of the digital color multi-function printer 1 except for the arrangement of the feature point calculation section.

As illustrated in FIG. 40, the feature point calculation section 31c includes not only the arrangement of the feature point calculation section 31 in Embodiment 1 but also a lack correction section 54 including a dilation process section 52 and an erosion process section 53.

The dilation process section 52 counts the number of black pixels included in a target pixel and peripheral pixels of the target pixel, and regards a target pixel whose count value is not less than a threshold value (first threshold value) as a black pixel and regards a target pixel whose count value is less than the threshold value as a white pixel (hereinafter referred to as a dilation process). The threshold value is not particularly limited. In the present embodiment, the threshold value is 1.

FIG. 41(a) is an explanatory drawing illustrating an example of image data before being subjected to the dilation process. FIG. 41(b) is an explanatory drawing illustrating image data obtained by subjecting the image data in FIG. 41(a) to the dilation process with the threshold value being 1.

The erosion process section 53 counts the number of white pixels included in a target pixel and peripheral pixels of the target pixel in image data having been subjected to the dilation process, and regards a target pixel whose count value is not less than a threshold value (second threshold value) as a white pixel and regards a target pixel whose count value is less than the threshold value as a black pixel (hereinafter referred to as an erosion process). The threshold value is not particularly limited. In the present embodiment, the threshold value is 1.

Figure 42:
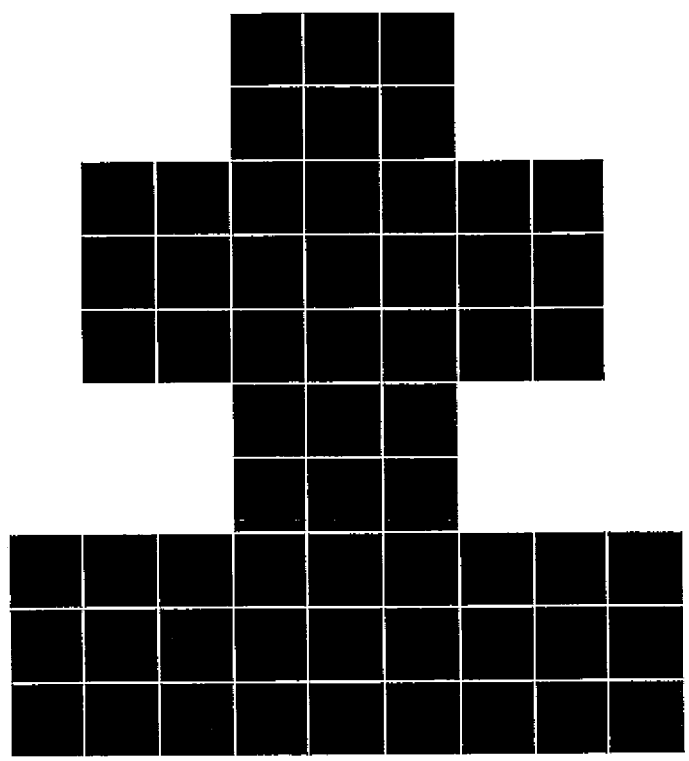
FIGS. 42(a) and 42(b) are explanatory drawings illustrating an erosion process carried out by an erosion process section in the feature point calculation section in FIG. 40.
Figure 42:
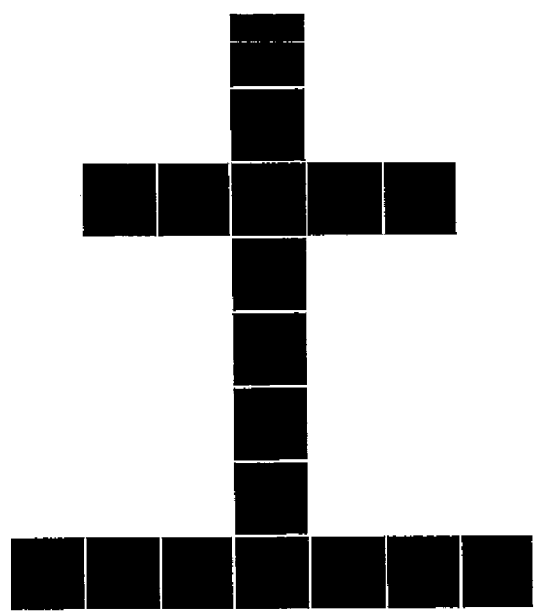

FIG. 42(*a*) is an explanatory drawing illustrating an example of image data before being subjected to the erosion process (image data the same as that in FIG. 41(*b*)). FIG. 42(*b*) is an explanatory drawing illustrating image data obtained by subjecting the image data in FIG. 42(*a*) to the erosion process with use of the threshold value being 1.

Figure 43:
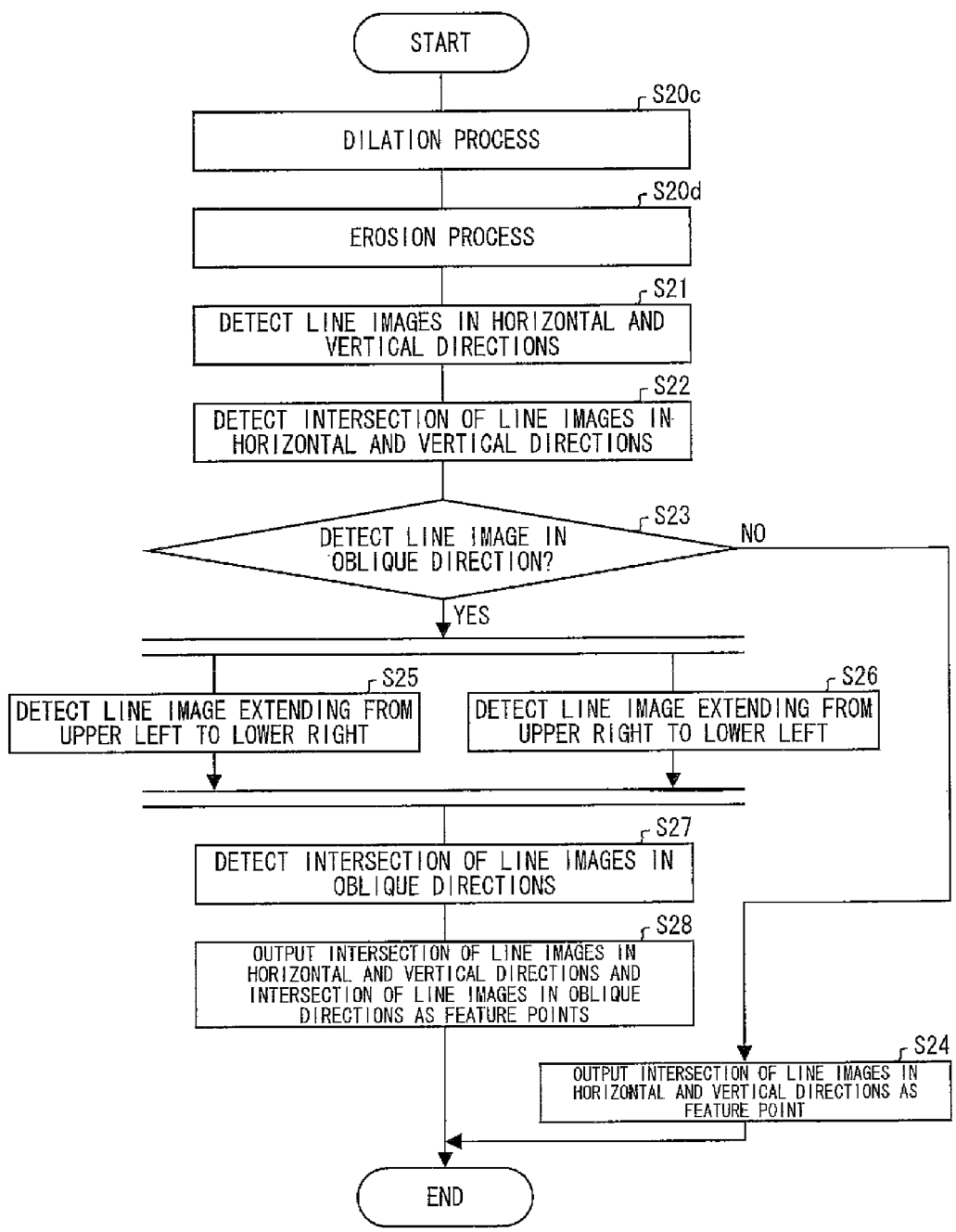
FIG. 43 is a flow chart illustrating a flow of a process carried out by the feature point calculation section in FIG. 40.

FIG. 43 is a flow chart illustrating a flow of a feature point calculation process carried out by the digital color multi-function printer 1 of the present embodiment.

As illustrated in FIG. 43, when image data is input from the shading correction section 12 to the feature point calculation section 31*c*, the signal conversion process section 41 performs an achromatizing process, the resolution conversion section 42 performs a resolution conversion process, the MTF process section 43 performs an MTF process, and the binarization process section 44 performs a binarization process (each of the processes is not shown), and then the dilation process section 52 performs the dilation process with respect to input image data (S20*c*), and the erosion process section 53 performs the erosion process with respect to the image data having been subjected to the dilation process (S20*d*). Thereafter, the intersection calculation section 45 performs a process for detecting an intersection (feature point) through a method similar to that in FIG. 11 (S21-S28).

As described above, in the present embodiment, the dilation process section 52 counts the number of black pixels included in a target pixel and peripheral pixels of the target pixel, and regards a target pixel whose count value is not less than a threshold value as a black pixel. Further, the erosion process section 53 counts the number of white pixels included in a target pixel and peripheral pixels of the target pixel in image data having been subjected to the dilation process, and regards a target pixel whose count value is not less than a threshold value as a white pixel.

Consequently, even when a gap (lack of image data) exists on a line part of input image data, it is possible to detect a line after the gap is corrected. Therefore, it is possible to prevent a line from being detected to be shorter than the original due to the gap (lack of image data), and to detect a feature point of the input image data with high accuracy.

Figure 44:
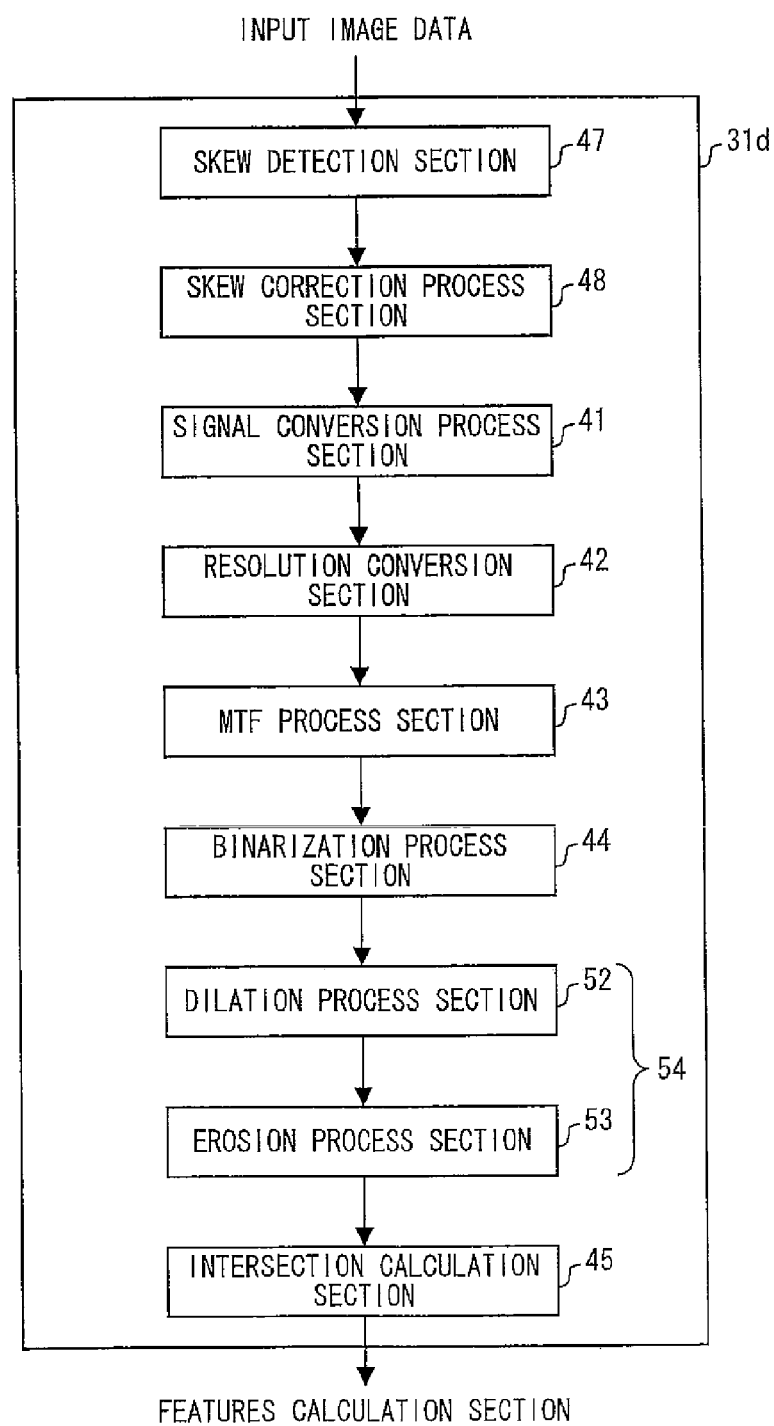
FIG. 44 is a block diagram illustrating a modification example of a feature point calculation section included in the document matching process section in FIG. 1.
Figure 45:
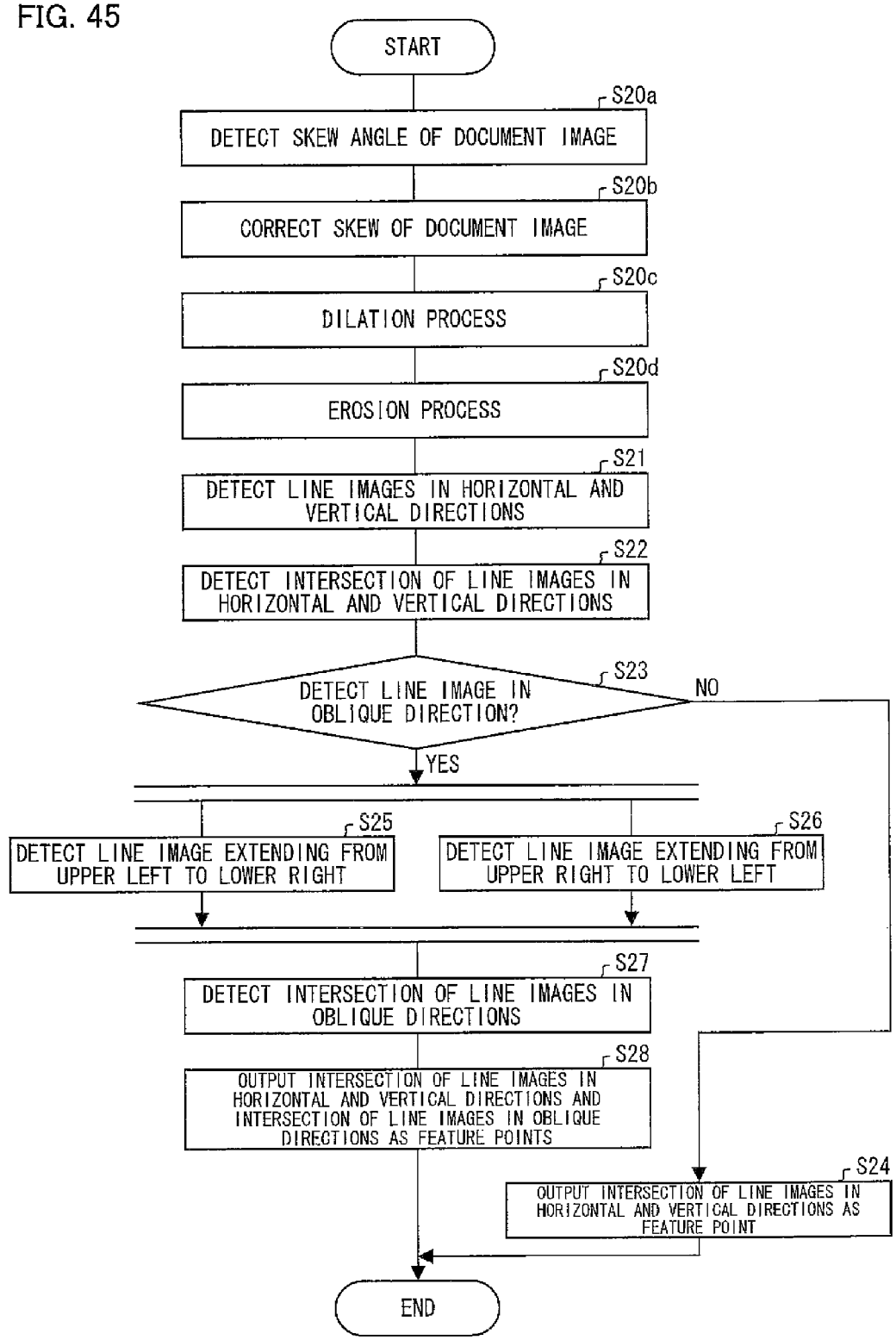
FIG. 45 is a flow chart illustrating a flow of a process carried out by the feature point calculation section in FIG. 44.

In the present embodiment, an explanation was made as to a case where the multi-function printer 1 includes not only the arrangement of the feature point calculation section 31 in Embodiment 1 but also the dilation process section 52 and the erosion process section 53. However, the present invention is not limited to this case. For example, as illustrated in FIG. 44, the multi-function printer 1 may include a feature point calculation section 31*d* obtained by providing the feature point calculation section 31*b* in Embodiment 2 with the dilation process section 52 and the erosion process section 53. In this case, as illustrated in FIG. 45, when image data is input from the shading correction section 12 to the feature point calculation section 31*d*, the skew detection section 47 detects a skew (skew angle) of an input image (S20*a*), and the skew correction process section 48 corrects the skew (skew angle) in accordance with the result of detection by the skew detection section 47 (S20*b*). Thereafter, the signal conversion process section 41 performs an achromatizing process, the resolution conversion section 42 performs a resolution conversion process, the MTF process section 43 performs an MTF process, and the binarization process section 44 performs a binarization process (each of the processes is not shown), and then the dilation process section 52 performs the dilation process with respect to input image data (S20*c*) and the erosion process section 53 performs the erosion process with respect to the image data having been subjected to the erosion process (S20*d*). Thereafter, the intersection calculation section 45 performs a process for detecting an intersection (feature point) through a method similar to that in FIG. 11 (S21-S28).

Embodiment 4

The following explains further another embodiment of the present invention. For convenience of explanation, members having the same functions as those in the foregoing embodiments are given the same reference numerals and explanations thereof are omitted here.

The digital color multi-function printer 1 of the present embodiment is substantially the same as the digital color multi-function printer 1 of Embodiment 1 except that the first labeling section 63 and the second labeling section 67 label in manners different from those in Embodiment 1.

In Embodiment 1, the first labeling section 63 scans pixels from upper left to lower right, and labels a target pixel in accordance with whether the target pixel is a black pixel or not and the result of labeling pixels adjacent to the left side and the upper side of the target pixel. Further, the second labeling section 67 scans pixels from upper right to lower left, and labels a target pixel in accordance with whether the target pixel is a black pixel or not and the result of labeling pixels adjacent to the right side and the upper side of the target pixel.

In contrast thereto, in the present embodiment, the first labeling section 63 scans pixels from upper left to lower right, and labels a target pixel in accordance with whether the target pixel is a black pixel or not and the result of labeling pixels adjacent to the left side, the upper side, and the upper left side of the target pixel. Further, the second labeling section 67 scans pixels from upper right to lower left, and labels a target pixel in accordance with whether the target pixel is a black pixel or not and the result of labeling pixels adjacent to the right side, the upper side, and the upper right side of the target pixel.

Further, in the first label history table 66, there are stored labels corresponding to (i) pixels which exist in a line adjacent to the upper side of a target pixel and which consist of pixels from a one adjacent to the upper left side of the target pixel to a one at the right end of the line and (ii) pixels which exist in a line including the target pixel and which consist of pixels from a one at the left end of the line to a one adjacent to the left side of the target pixel, i.e. labels in the number of pixels included in one horizontal line plus one pixel. Every time a target pixel is labeled, the result of labeling a pixel adjacent to the upper left side of the target pixel is deleted and the result of labeling the target pixel is stored in the first label history table 66. Consequently, it is possible to reduce a storage capacity necessary for the first label history table 66 without dropping accuracy in line judgment, compared with a case of storing labels assigned to all pixels. Further, it is possible to easily and promptly extract labels assigned to pixels adjacent to the left side, the upper side, and the upper left side of a target pixel.

Similarly, in the second label history table 70, there are stored labels corresponding to (i) pixels which exist in a line adjacent to the upper side of a target pixel and which consist of pixels from a one adjacent to the upper right side of the target pixel to a one at the left end of the line and (ii) pixels which exist in a line including the target pixel and which consist of pixels from a one at the right end of the line to a one adjacent to the right side of the target pixel, i.e. labels in the number of pixels included in one horizontal line plus one pixel. Every time a target pixel is labeled, the result of labeling a pixel adjacent to the upper right side of the target pixel is deleted and the result of labeling the target pixel is stored in the second label history table 70. Consequently, it is possible to reduce a storage capacity necessary for the second label history table 70 without dropping accuracy in line judgment, compared with a case of storing labels assigned to all pixels. Further, it is possible to easily and promptly extract labels assigned to pixels adjacent to the right side, the upper side, and the upper right side of a target pixel.

Figure 48:
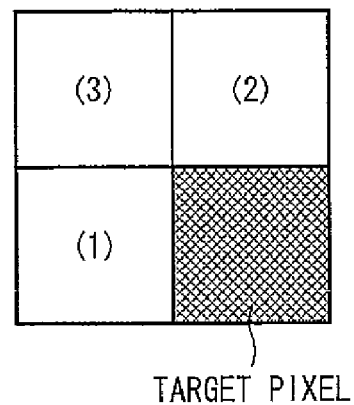
FIG. 48 is an explanatory drawing illustrating an example of how to assign labels to pixels when an intersection calculation section included in the document matching process section in FIG. 1 detects a line image extending in an oblique direction.

Next, with reference to a drawing, the following further details how the first labeling section 63 labels a pixel. FIG. 48 is an explanatory drawing illustrating the order of referring to adjacent pixels when the first labeling section 63 labels a target pixel.

As illustrated in FIG. 48, the first labeling section 63 scans image data from upper left to lower right (a process for scanning a line from left end to right end is serially performed from a line at upper end to a line at lower end), and labeling is performed in accordance with the following rules (a) to (e).

(a) In a case where a target pixel is a black pixel and a pixel adjacent to the left side of the target pixel is labeled (i.e. the pixel adjacent to the left side of the target pixel is not labeled as "0"), the target pixel is given the same label as that of the pixel adjacent to the left side of the target pixel.

(b) In a case where a target pixel is a black pixel and a pixel adjacent to the left side of the target pixel is not labeled (i.e. the pixel adjacent to the left side of the target pixel is labeled as "0") and a pixel adjacent to the upper side of the target pixel is labeled, the target pixel is given the same label as that of the pixel adjacent to the upper side of the target pixel.

(c) In a case where a target pixel is a black pixel and both of pixels adjacent to the left side and the upper side of the target pixel are not labeled (pixels adjacent to the left side and the upper side of the target pixel are labeled as "0"), and a pixel adjacent to the upper left side of the target pixel is labeled, the target pixel is given the same label as that of the pixel adjacent to the upper left side of the target pixel.

(d) In a case where a target pixel is a black pixel and pixels adjacent to the left side, the upper side, and the upper left side of the target pixel are not labeled, the target pixel is given a new label.

(e) In a case where a target pixel is not a black pixel, the target pixel is labeled as "0."

Figure 49:
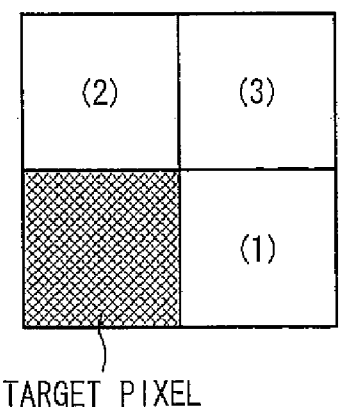
FIG. 49 is an explanatory drawing illustrating an example of how to assign labels to pixels when an intersection calculation section included in the document matching process section in FIG. 1 detects a line image extending in an oblique direction.

Note that how the second labeling section 67 labels a pixel is the same as how the first labeling section 63 labels a pixel, except that each pixel is scanned from upper right to lower left, and "the left side" and "the upper left side" mentioned in the aforementioned (a) to (e) are changed to "the right side" and "the upper right side", respectively. FIG. 49 is an explanatory drawing illustrating the order of referring to adjacent pixels when the second labeling section 67 labels a target pixel.

As described above, in the present embodiment, when the first labeling section 63 labels a pixel, not only the results of labeling pixels adjacent to the left side and the upper side of a target pixel but also the result of labeling a pixel adjacent to the upper left side of the target pixel are considered. Further, when the second labeling section 67 labels a pixel, not only the results of labeling pixels adjacent to the right side and the upper side of a target pixel but also the result of labeling a pixel adjacent to the upper right side of the target pixel are considered.

Consequently, even when a line in an oblique direction is misaligned due to fluctuation caused by error etc. in reading an image, it is possible to prevent a problem that different labels are assigned to originally the same line and the line cannot be detected as a line. Thus, it is possible to increase accuracy in detecting a line.

Figure 50:
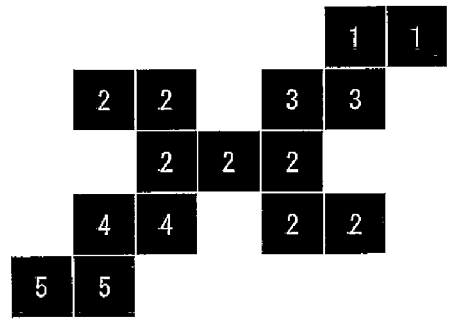
FIG. 50(a) is an explanatory drawing illustrating the result of labeling, through the labeling method in Embodiment 1, an image obtained by appropriately reading the image in FIG. 18.
FIG. 50(b) is an explanatory drawing illustrating the result of labeling, through the labeling method in Embodiment 1, an image obtained by reading the image in FIG. 18 with an error.
FIG. 50(c) is an explanatory drawing illustrating the result of labeling, through the labeling method in Embodiment 4, an image obtained by reading the image in FIG. 18 with an error.
Figure 50:
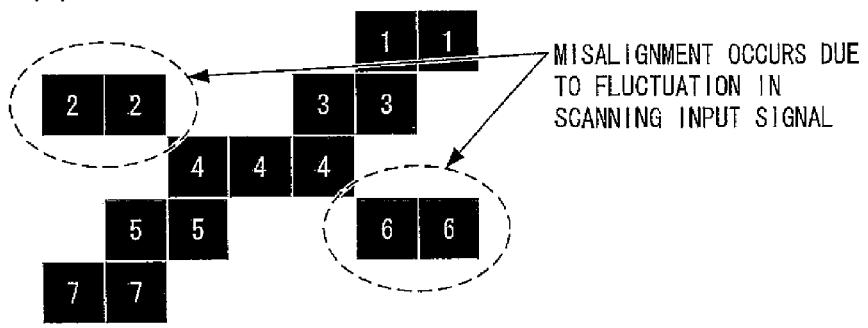
Figure 50:
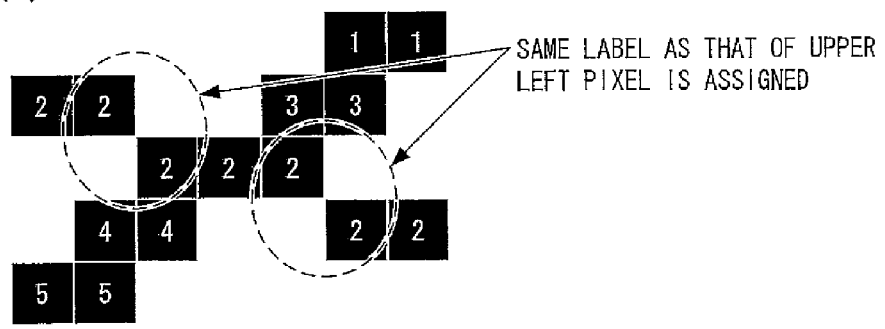

The following further details this effect with reference to FIGS. 50(*a*) to 50(*c*). FIG. 50(*a*) is an explanatory drawing illustrating the result of labeling the image in FIG. 18 through the labeling method in Embodiment 1 when the image is appropriately read by the color image input apparatus 2. FIG. 50(*b*) is an explanatory drawing illustrating the result of labeling, through the labeling method in Embodiment 1, an image obtained by the color image input apparatus 2 reading the image in FIG. 18 with an error. FIG. 50(*c*) is an explanatory drawing illustrating the result of labeling, through the labeling method in the present embodiment, an image obtained by the color image input apparatus 2 reading the image in FIG. 18 with an error.

In the example in FIG. 50(*b*), a line image from upper left to lower right is misaligned due to reading error. When the image with such misalignment is subjected to the labeling method in Embodiment 1, originally the same line is given different labels depending on positions of the line, and consequently the line is not detected as a line.

In contrast thereto, as illustrated in FIG. 50(*c*), with the labeling method of the present embodiment, even when a line is misaligned due to reading error, by taking the result of labeling a pixel adjacent to the upper left side into consideration, it is possible to assign the same label to the originally same line, so that the line is detected as a line. Consequently, even when reading error occurs, it is possible to detect a line with high accuracy.

The labeling method (line detection method) of the present embodiment is applicable to any one of the aforementioned embodiments.

Each section (each block) constituting the document matching process section and the control section included in the digital color multi-function printer 1 and/or the server 50 may be realized by software by using a processor such as a CPU. Namely, the digital color multi-function printer 1 and/or the server 50 include: a CPU (central processing unit) for executing a program for realizing each function; a ROM (read only memory) that stores the program; a RAM (random access memory) that develops the program; a storage device (storage medium) such as a memory in which the program and various data are stored; and the like. The object of the present invention can be realized in such a manner that the digital color multi-function printer 1 and/or the server 50 are provided with a computer-readable storage medium for storing program codes (such as executable program, intermediate code program, and source program) of programs of the digital color multi-function printer 1 and/or the server 50 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the digital color multi-function printer 1 and/or the server 50 may be arranged so as to be connectable to a communication network so that the program code is supplied to the digital color multi-function printer 1 and/or the server 50 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

Furthermore, each block of the digital color multi-function printer 1 and/or the server 50 may be realized by hardware logic. Each block of the digital color multi-function printer 1 and/or the server 50 may be a combination of hardware carrying out some of the processes and the computing means controlling the hardware and executing program code for the other processes.

The computer system of the present invention may be composed of: an image input apparatus such as a flat bed scanner, a film scanner, and a digital camera; a computer loaded with a predetermined program to execute processes such as the similarity calculation process and the similarity determination process; an image display apparatus, such as a CRT display and a liquid crystal display, for displaying a result of the process by the computer; and an image forming apparatus, such as a printer, for outputting a result of the process by the computer on a paper etc. Furthermore, a network card or a modem may be provided as communication means to be connected with a server etc. via a network.

Explanations were made in the foregoing embodiments as to a case where a line image is detected by judging whether each pixel is a white pixel or a black pixel in accordance with input image data having been subjected to a binary process by the binarization process section 44. Alternatively, a line image is detected by judging whether a pixel value of each pixel in multi-value image data is a predetermined value or not.

The present invention is not limited to the description of the embodiments above, but may be altered by a skilled person within the scope of the claims. An embodiment based on a proper combination of technical means disclosed in different embodiments is encompassed in the technical scope of the present invention.

As described above, the image processing apparatus of the present invention is an image processing apparatus including: a feature point calculation section for calculating feature points included in input image data; and a features calculation section for calculating features of the input image data in accordance with relative positions of the feature points calculated by the feature point calculation section, the feature point calculation section including: a line detection section for detecting, from the input image data, a line image extending in a first direction and a line image extending in a second direction that is different from the first direction; and an intersection calculation section for calculating, as a feature point, an intersection of the line image extending in the first direction and the line image extending in the second direction.

Further, the image processing method of the present invention is an image processing method for calculating feature points of input image data and calculating features of the input image data in accordance with relative positions of the calculated feature points, the method comprising the steps of: detecting, from the input image data, a line image extending in a first direction and a line image extending in a second direction that is different from the first direction; and calculating, as a feature point, an intersection of the line image extending in the first direction and the line image extending in the second direction.

Further, the image processing system of the present invention is an image processing system, including: an image processing apparatus; and a server communicably connected with the image processing apparatus, a feature point calculation section for calculating feature points of input image data and a features calculation section for calculating features of the input image data in accordance with relative positions of the feature points calculated by the feature point calculation section are included in the image processing apparatus or the server, or divided into the image processing apparatus and the server, the feature point calculation section including a line detection section for detecting a line image extending in a first direction and a line image extending in a second direction that is different from the first direction, and an intersection calculation section for calculating, as a feature point, an intersection of the line image extending in the first direction and the line image extending in the second direction.

With the image processing apparatus, the image processing method, and the image processing system, a line image extending in a first direction and a line image extending in a second direction that is different from the first direction are detected from input image data, and an intersection of the line image extending in the first direction and the line image extending in the second direction is calculated as a feature point. Thus, by regarding the intersection of the line images as a feature point, it is possible to extract a large number of feature points even in a case of input image data read out from a document with little texts, allowing appropriately specifying input image data. Further, only extraction of line images and calculation of an intersection of the line images are required, so that it is possible to simplify an algorithm and to shorten a process time, compared with a case of calculating feature points from input image data in accordance with plural kinds of elements such as texts, frames for test strings, frames, and lines indicative of frames.

The input image data may be obtained by reading a document image, or may be obtained via communications with other device communicably connected with an image processing apparatus, or may be obtained by reading image data stored in a variety of storage media, or may be obtained by superposing, on a predetermined format, information entered by a user.

Further, the first direction may be a horizontal direction in input image data and the second direction may be a vertical direction in the input image data.

Since most of ruled lines included in input image data include lines extending in horizontal and vertical directions, the above arrangement allows appropriately extracting, as a feature point, an intersection of ruled lines included in the input image data.

The image processing apparatus of the present invention may be arranged so that the line detection section includes a first count section for counting the number of pixels with a predetermined pixel value or more, which exist successively in a horizontal direction, and a second count section for counting the number of pixels with a predetermined pixel value or more, which exist successively in a vertical direction, when the number of pixels counted by the first count section is a threshold value or more, the line detection section detects an image made of the pixels which exist successively in the horizontal direction as the line image extending in the first direction, and when the number of pixels counted by the second count section is a threshold value or more, the line detection section detects an image made of the pixels which exist successively in the vertical direction as the line image extending in the second direction.

With the arrangement, it is possible to easily detect a line image extending in a horizontal direction and a line image extending in a vertical direction and to regard an intersection of the line images as a feature point.

The image processing apparatus of the present invention may be arranged so that the first direction is a first oblique direction that is oblique to lower right with respect to a horizontal direction of the input image data, and the second direction is a second oblique direction that is oblique to lower left with respect to the horizontal direction of the input image data.

With the arrangement, by regarding an intersection of a line image extending in the first oblique direction and a line image extending in the second oblique direction as a feature point, it is possible to calculate, as a feature point, an intersection of lines included in texts, symbols etc.

The image processing apparatus of the present invention may be arranged so that the input image data is indicative of pixel values of a plurality of pixels arranged in a matrix manner, the line detection section includes: a first labeling section for performing a first labeling process in which a process of shifting a target pixel one by one from left to right in each of a plurality of lines each made of a plurality of pixels in a horizontal direction is serially performed from an upper line to a lower line, and one of plural kinds of first labels is assigned to each target pixel in accordance with a relation between a pixel value of the target pixel and pixel values of peripheral pixels of the target pixel; a first label count section for counting the number of pixels to which a first label is assigned by the first labeling section with respect to each kind of the first labels; a second labeling section for performing a second labeling process in which a process of shifting a target pixel one by one from right to left in each of a plurality of lines each made of a plurality of pixels in a horizontal direction is serially performed from an upper line to a lower line, and one of a plural kinds of first labels is assigned to each target pixel in accordance with a relation between a pixel value of the target pixel and pixel values of peripheral pixels of the target pixel; and a second label count section for counting the number of pixels to which a second label is assigned by the second labeling section with respect to each kind of the second labels, (1) when a pixel value of a target pixel is less than a predetermined value, the first labeling section does not assign a first label to the target pixel, (2) when a pixel value of the target pixel is not less than the predetermined value and a first label is assigned to a pixel adjacent to a left side of the target pixel, the first labeling section assigns, to the target pixel, a first label of a same kind as that of the pixel adjacent to the left side of the target pixel, (3) when a pixel value of the target pixel is not less than the predetermined value and a first label is not assigned to a pixel adjacent to the left side of the target pixel and a first label is assigned to a pixel adjacent to an upper side of the target pixel, the first labeling section assigns, to the target pixel, a first label of a same kind as that of the pixel adjacent to the upper side of the target pixel, and (4) when a pixel value of the target pixel is not less than the predetermined value and a first label is not assigned to the pixels adjacent to the left side and the upper side of the target pixel, the first labeling section assigns, to the target pixel, a first label of a kind having not been assigned to other pixels, (a) when a pixel value of a target pixel is less than a predetermined value, the second labeling section does not assign a second label to the target pixel, (b) when a pixel value of the target pixel is not less than the predetermined value and a second label is assigned to a pixel adjacent to a right side of the target pixel, the second labeling section assigns, to the target pixel, a second label of a same kind as that of the pixel adjacent to the right side of the target pixel, (c) when a pixel value of the target pixel is not less than the predetermined value and a second label is not assigned to a pixel adjacent to the right side of the target pixel and a second label is assigned to a pixel adjacent to an upper side of the target pixel, the second labeling section assigns, to the target pixel, a second label of a same kind as that of the pixel adjacent to the upper side of the target pixel, and (d) when a pixel value of the target pixel is not less than the predetermined value and a second label is not assigned to the pixels adjacent to the right side and the upper side of the target pixel, the second labeling section assigns, to the target pixel, a second label of a kind having not been assigned to other pixels, the line detection section detects, as a line image extending in a first direction, an image made of pixels to each of which a first label of a same kind has been assigned and the number of which counted by the first label count section is not less than the threshold value, and the line detection section detects, as a line image extending in a second direction, an image made of pixels to each of which a second label of a same kind has been assigned and the number of which counted by the second label count section is not less than the threshold value.

With the arrangement, it is possible to calculate, as a feature point, an intersection of a line image extending in a first oblique direction and a line image extending in a second oblique direction.

The image processing apparatus of the present invention may be arranged so that the input image data is indicative of pixel values of a plurality of pixels arranged in a matrix manner, the line detection section includes: a first labeling section for performing a first labeling process in which a process of shifting a target pixel one by one from left to right in each of a plurality of lines each made of a plurality of pixels in a horizontal direction is serially performed from an upper line to a lower line, and one of plural kinds of first labels is assigned to each target pixel in accordance with a relation between a pixel value of the target pixel and pixel values of peripheral pixels of the target pixel; a first label start-end coordinate storage section in which start coordinates and end coordinates of a region made of pixels to each of which a first label is assigned by the first labeling section are stored with respect to each kind of first labels; a second labeling section for performing a second labeling process in which a process of shifting a target pixel one by one from right to left in each of a plurality of lines each made of a plurality of pixels in a horizontal direction is serially performed from an upper line to a lower line, and one of a plural kinds of second labels is assigned to each target pixel in accordance with a relation between a pixel value of the target pixel and pixel values of peripheral pixels of the target pixel; and a second label start-end coordinate storage section in which start coordinates and end coordinates of a region made of pixels to each of which a second label is assigned by the second labeling section are stored with respect to each kind of second labels; (1) when a pixel value of a target pixel is less than a predetermined value, the first labeling section does not assign a first label to the target pixel, (2) when a pixel value of the target pixel is not less than the predetermined value and a first label is assigned to a pixel adjacent to a left side of the target pixel, the first labeling section assigns, to the target pixel, a first label of a same kind as that of the pixel adjacent to the left side of the target pixel, (3) when a pixel value of the target pixel is not less than the predetermined value and a first label is not assigned to a pixel adjacent to the left side of the target pixel and a first label is assigned to a pixel adjacent to an upper side of the target pixel, the first labeling section assigns, to the target pixel, a first label of a same kind as that of the pixel adjacent to the upper side of the target pixel, and (4) when a pixel value of the target pixel is not less than the predetermined value and a first label is not assigned to the pixels adjacent to the left side and the upper side of the target pixel, the first labeling section assigns, to the target pixel, a first label of a kind having not been assigned to other pixels, (a) when a pixel value of a target pixel is less than a predetermined value, the second labeling section does not assign a second label to the target pixel, (b) when a pixel value of the target pixel is not less than the predetermined value and a second label is assigned to a pixel adjacent to a right side of the target pixel, the second labeling section assigns, to the target pixel, a second label of a same kind as that of the pixel adjacent to the right side of the target pixel, (c) when a pixel value of the target pixel is not less than the predetermined value and a second label is not assigned to a pixel adjacent to the right side of the target pixel and a second label is assigned to a pixel adjacent to an upper side of the target pixel, the second labeling section assigns, to the target pixel, a second label of a same kind as that of the pixel adjacent to the upper side of the target pixel, and (d) when a pixel value of the target pixel is not less than the predetermined value and a second label is not assigned to the pixels adjacent to the right side and the upper side of the target pixel, the second labeling section assigns, to the target pixel, a second label of a kind having not been assigned to other pixels, the line detecting section detecting, as a line image extending in a first direction, an image made of pixels to which a first label of a same kind is assigned and whose distance between the start coordinates and the end coordinates of the first label that are stored in the first label start-end coordinate storage section is not less than a threshold value, and the line detecting section detecting, as a line image extending in a second direction, an image made of pixels to which a second label of a same kind is assigned and whose distance between the start coordinates and the end coordinates of the second label that are stored in the second label start-end coordinate storage section is not less than a threshold value.

With the arrangement, it is possible to calculate, as a feature point, an intersection of a line image extending in a first oblique direction and a line image extending in a second oblique direction. Further, by detecting a line image in accordance with a distance between start coordinates and end coordinates of a line image, it is possible to detect a line image depending not on the width of an image to be detected but on the length of the image to be detected.

The image processing apparatus of the present invention may be arranged so that the input image data is indicative of pixel values of a plurality of pixels arranged in a matrix manner, the line detection section includes: a first labeling section for performing a first labeling process in which a process of shifting a target pixel one by one from left to right in each of a plurality of lines each made of a plurality of pixels in a horizontal direction is serially performed from an upper line to a lower line, and one of plural kinds of first labels is assigned to each target pixel in accordance with a relation between a pixel value of the target pixel and pixel values of peripheral pixels of the target pixel; a first label count section for counting the number of pixels to which a first label is assigned by the first labeling section with respect to each kind of the first labels; a second labeling section for performing a second labeling process in which a process of shifting a target pixel one by one from right to left in each of a plurality of lines each made of a plurality of pixels in a horizontal direction is serially performed from an upper line to a lower line, and one of a plural kinds of first labels is assigned to each target pixel in accordance with a relation between a pixel value of the target pixel and pixel values of peripheral pixels of the target pixel; and a second label count section for counting the number of pixels to which a second label is assigned by the second labeling section with respect to each kind of the second labels, (1) when a pixel value of a target pixel is less than a predetermined value, the first labeling section does not assign a first label to the target pixel, (2) when a pixel value of the target pixel is not less than the predetermined value and a first label is assigned to a pixel adjacent to a left side of the target pixel, the first labeling section assigns, to the target pixel, a first label of a same kind as that of the pixel adjacent to the left side of the target pixel, (3) when a pixel value of the target pixel is not less than the predetermined value and a first label is not assigned to a pixel adjacent to the left side of the target pixel and a first label is assigned to a pixel adjacent to an upper side of the target pixel, the first labeling section assigns, to the target pixel, a first label of a same kind as that of the pixel adjacent to the upper side of the target pixel, (4) when a pixel value of the target pixel is not less than the predetermined value and a first label is not assigned to the pixels adjacent to the left side and the upper side of the target pixel and a first label is assigned to a pixel adjacent to an upper left side of the target pixel, the first labeling section assigns, to the target pixel, a first label of a same kind as that of the pixel adjacent to the upper left side of the target pixel, and (5) when a pixel value of the target pixel is not less than the predetermined value and a first label is not assigned to the pixels adjacent to the left side, the upper side, and the upper left side of the target pixels, the first labeling section assigns, to the target pixel, a first label of a kind having not been assigned to other pixels, (a) when a pixel value of a target pixel is less than a predetermined value, the second labeling section does not assign a second label to the target pixel, (b) when a pixel value of the target pixel is not less than the predetermined value and a second label is assigned to a pixel adjacent to a right side of the target pixel, the second labeling section assigns, to the target pixel, a second label of a same kind as that of the pixel adjacent to the right side of the target pixel, (c) when a pixel value of the target pixel is not less than the predetermined value and a second label is not assigned to a pixel adjacent to the right side of the target pixel and a second label is assigned to a pixel adjacent to an upper side of the target pixel, the second labeling section assigns, to the target pixel, a second label of a same kind as that of the pixel adjacent to the upper side of the target pixel, (d) when a pixel value of the target pixel is not less than the predetermined value and a second label is not assigned to the pixels adjacent to the right side and the upper side of the target pixel and a second label is assigned to a pixel adjacent to an upper right side of the target pixel, the second labeling section assigns, to the target pixel, a second label of a same kind as that of the pixel adjacent to the upper right side of the target pixel, and (e) when a pixel value of the target pixel is not less than the predetermined value and a second label is not assigned to the pixels adjacent to the right side, the upper side, and the upper right side of the target pixels, the first labeling section assigns, to the target pixel, a second label of a kind having not been assigned to other pixels, the line detection section detects, as a line image extending in a first direction, an image made of pixels to each of which a first label of a same kind has been assigned and the number of which counted by the first label count section is not less than the threshold value, and the line detection section detects, as a line image extending in a second direction, an image made of pixels to each of which a second label of a same kind has been assigned and the number of which counted by the second label count section is not less than the threshold value.

With the arrangement, when the first labeling section labels a target pixel, not only the result of labeling pixels adjacent to the left side and the upper side of the target pixel, but also the result of labeling a pixel adjacent to the upper left side of the target pixel are considered. Further, when the second labeling section labels a target pixel, not only the result of labeling pixels adjacent to the right side and the upper side of the target pixel, but also the result of labeling a pixel adjacent to the upper right side of the target pixel are considered. Consequently, even when a line is misaligned in an oblique direction due to fluctuation caused by error in reading an image etc., it is possible to prevent a problem that different labels are assigned to originally the same line and the line cannot be detected as a line. Thus, it is possible to increase accuracy in detecting a line.

Further, the image processing apparatus of the present invention may be arranged so that the input image data is indicative of pixel values of a plurality of pixels arranged in a matrix manner, the line detection section includes: a first labeling section for performing a first labeling process in which a process of shifting a target pixel one by one from left to right in each of a plurality of lines each made of a plurality of pixels in a horizontal direction is serially performed from an upper line to a lower line, and one of plural kinds of first labels is assigned to each target pixel in accordance with a relation between a pixel value of the target pixel and pixel values of peripheral pixels of the target pixel; a first label start-end coordinate storage section in which start coordinates and end coordinates of pixels to each of which a first label is assigned by the first labeling section are stored with respect to each kind of first labels; a second labeling section for performing a second labeling process in which a process of shifting a target pixel one by one from right to left in each of a plurality of lines each made of a plurality of pixels in a horizontal direction is serially performed from an upper line to a lower line, and one of a plural kinds of second labels is assigned to each target pixel in accordance with a relation between a pixel value of the target pixel and pixel values of peripheral pixels of the target pixel; and a second label start-end coordinate storage section in which start coordinates and end coordinates of pixels to each of which a second label is assigned by the second labeling section are stored with respect to each kind of second labels; (1) when a pixel value of a target pixel is less than a predetermined value, the first labeling section does not assign a first label to the target pixel, (2) when a pixel value of the target pixel is not less than the predetermined value and a first label is assigned to a pixel adjacent to a left side of the target pixel, the first labeling section assigns, to the target pixel, a first label of a same kind as that of the pixel adjacent to the left side of the target pixel, (3) when a pixel value of the target pixel is not less than the predetermined value and a first label is not assigned to a pixel adjacent to the left side of the target pixel and a first label is assigned to a pixel adjacent to an upper side of the target pixel, the first labeling section assigns, to the target pixel, a first label of a same kind as that of the pixel adjacent to the upper side of the target pixel, (4) when a pixel value of the target pixel is not less than the predetermined value and a first label is not assigned to the pixels adjacent to the left side and the upper side of the target pixel and a first label is assigned to a pixel adjacent to an upper left side of the target pixel, the first labeling section assigns, to the target pixel, a first label of a same kind as that of the pixel adjacent to the upper left side of the target pixel, and (5) when a pixel value of the target pixel is not less than the predetermined value and a first label is not assigned to the pixels adjacent to the left side, the upper side, and the upper left side of the target pixels, the first labeling section assigns, to the target pixel, a first label of a kind having not been assigned to other pixels, (a) when a pixel value of a target pixel is less than a predetermined value, the second labeling section does not assign a second label to the target pixel, (b) when a pixel value of the target pixel is not less than the predetermined value and a second label is assigned to a pixel adjacent to a right side of the target pixel, the second labeling section assigns, to the target pixel, a second label of a same kind as that of the pixel adjacent to the right side of the target pixel, (c) when a pixel value of the target pixel is not less than the predetermined value and a second label is not assigned to a pixel adjacent to the right side of the target pixel and a second label is assigned to a pixel adjacent to an upper side of the target pixel, the second labeling section assigns, to the target pixel, a second label of a same kind as that of the pixel adjacent to the upper side of the target pixel, (d) when a pixel value of the target pixel is not less than the predetermined value and a second label is not assigned to the pixels adjacent to the right side and the upper side of the target pixel and a second label is assigned to a pixel adjacent to an upper right side of the target pixel, the second labeling section assigns, to the target pixel, a second label of a same kind as that of the pixel adjacent to the upper right side of the target pixel, and (e) when a pixel value of the target pixel is not less than the predetermined value and a second label is not assigned to the pixels adjacent to the right side, the upper side, and the upper right side of the target pixels, the first labeling section assigns, to the target pixel, a second label of a kind having not been assigned to other pixels, the line detecting section detecting, as a line image extending in a first direction, an image made of pixels to which a first label of a same kind is assigned and whose distance between the start coordinates and the end coordinates of the first label that are stored in the first label start-end coordinate storage section is not less than a threshold value, and the line detecting section detecting, as a line image extending in a second direction, an image made of pixels to which a second label of a same kind is assigned and whose distance between the start coordinates and the end coordinates of the second label that are stored in the second label start-end coordinate storage section is not less than a threshold value.

With the arrangement, when the first labeling section labels a target pixel, not only the result of labeling pixels adjacent to the left side and the upper side of the target pixel, but also the result of labeling a pixel adjacent to the upper left side of the target pixel are considered. Further, when the second labeling section labels a target pixel, not only the result of labeling pixels adjacent to the right side and the upper side of the target pixel, but also the result of labeling a pixel adjacent to the upper right side of the target pixel are considered. Consequently, even when a line is misaligned in an oblique direction due to fluctuation caused by error in reading an image etc., it is possible to prevent a problem that different labels are assigned to originally the same line and the line cannot be detected as a line. Thus, it is possible to increase accuracy in detecting a line. Further, by detecting a line image in accordance with a distance between start coordinates and end coordinates of a line image, it is possible to detect a line image depending not on the width of an image to be detected but on the length of the image to be detected.

Further, the image processing apparatus of the present invention may be arranged so that the line detection section detects a line image extending in a horizontal direction and a line image extending in a vertical direction, and the intersection calculation section calculates, as the feature point, not only the intersection of the line image extending in the first direction and the line image extending in the second direction but also an intersection of the line image extending in the horizontal direction and the line image extending in the vertical direction.

With the arrangement, not only the intersection of the line image extending in the first direction and the line image extending in the second direction but also the intersection of the line image extending in the horizontal direction and the line image extending in the vertical direction are calculated as feature points. Consequently, a larger number of feature points can be calculated, which allows more appropriately specify input image data. Further, since most of ruled lines included input image data include lines extending in horizontal and vertical directions, it is possible to appropriately extract an intersection of ruled lines included in the input image data as feature points.

The image processing apparatus of the present invention may be arranged so that the line detection section performs a process of detecting line images extending in a horizontal direction and a vertical direction before performing a process of detecting line images extending in the first direction and the second direction, and in a case where the number of intersections of line images extending in horizontal and vertical directions is not less than a predetermined value, the intersection calculation section does not detect the line images extending in the first direction and the second direction.

With the arrangement, in a case where the number of intersections of line images extending in horizontal and vertical directions is not less than a predetermined value, detection of the line images extending in the first and second directions is not performed. Thus, it is possible to reduce a workload on detection of the line images in the first and second directions and a process time necessary for the detection. Further, by setting the predetermined value to be a value that allows appropriately specifying input image data with use of feature points that are intersections of line images extending in the horizontal and vertical directions, it is possible to appropriately specify input image data without calculating, as a feature point, an intersection of line images extending in first and second directions.

Further, the image processing apparatus of the present invention may be arranged so that the intersection calculation section includes an instruction input section from which a user inputs an instruction, and in accordance with the instruction, it is judged whether to perform a process of detecting the line images extending in the first direction and the second direction.

With the arrangement, a user can select whether to detect line images extending in the first and second directions. Consequently, for example, the user can select whether to detect the line images extending in the first and second directions, according to which of an increase in accuracy in specifying input image data and shortening of a time for calculating a feature point is more emphasized.

Further, the image processing apparatus of the present invention may be arranged so that in a case where an intersection of the line image extending in the first direction and the line image extending in the second direction is made of a plurality of pixels, the intersection calculation section calculates, as the feature point, centric coordinates, barycentric coordinates, or coordinates of a predetermined position in a region consisting of the pixels. Examples of the predetermined position include: coordinates of a pixel whose coordinate value in the first direction is minimum or maximum and whose coordinate value in the second direction is minimum or maximum in the region consisting of the pixels; and coordinates corresponding to an average of the coordinate value in the first direction and an average of the coordinate value in the second direction.

With the arrangement, even when an intersection of line images extending in the first and second directions consists of a plurality of adjacent pixels, it is possible to appropriately specify coordinates of a feature point.

The image processing apparatus of the present invention may be arranged so that the intersection calculation section calculates an equation of a line corresponding to a line image extending in the first direction and an equation of a line corresponding to a line image extending in the second direction, calculates an intersection of the lines in accordance with the equations, and calculates, as the feature point, coordinates corresponding to the calculated intersection.

With the arrangement, it is possible to uniquely calculate an intersection of line images in accordance with equations obtained from start coordinates and end coordinates of the line images. Consequently, it is unnecessary to examine a pixel included both in a line image extending in the first direction and a line image extending in the second direction. This simplifies calculation of an intersection and shortens a time for calculating the intersection.

Further, the image processing apparatus of the present invention may be arranged so as to further include: a storage section in which identification information for identifying a reference image is stored in such a manner that the identification information is related to features of the reference image; and a similarity determination section for determining a similarity between an input image and the reference image in accordance with the features of the input image data calculated by the features calculation section and the features of the reference image stored in the storage section.

With the arrangement, the features obtained from the input image data are compared with the features of the reference image stored in the storage section, so that it is possible to determine a similarity between the input image and the reference image. Further, the similarity determination using the feature points allows determining a similarity between the input image and the reference image with high accuracy.

Further, the image processing apparatus of the present invention may be arranged so as to further include: a skew detection section for detecting a skew angle of a document image included in the input image data; and a skew correction section for correcting a skew of the document image in accordance with the skew angle detected by the skew detection section, input image data having been subjected to the skew correction being input to the intersection calculation section.

With the arrangement, even when the document image included in the input image data is skewed (e.g. when image data is read while being skewed with respect to a predetermined position angle of a reading position of an image reading apparatus), it is possible to correct the skew. Consequently, it is possible to calculate a feature point without being influenced by the skew. This allows calculating a feature point with high accuracy.

Further, the image processing apparatus of the present invention may be arranged so as to further include: a dilation process section for performing a dilation process in which the number of a black pixel included in a target pixel and peripheral pixels of the target pixel in the input image data is counted, and a target pixel whose count value is not less than a first threshold value is regarded as a black pixel and a target pixel whose count value is less than the first threshold value is regarded as a white pixel; and an erosion process section for performing an erosion process in which the number of a white pixel included in a target pixel and peripheral pixels of the target pixel in the input image data subjected to the dilation process is counted, and a target pixel whose count value is not less than a second threshold value is regarded as a white pixel and a target pixel whose count value is less than the second threshold value is regarded as a black pixel, the input image data subjected to the erosion process being input to the intersection calculation section.

With the arrangement, even when a gap (lack of image data) due to reading error, transmission/reception error etc. exists in a line portion in the input image data, it is possible to correct the gap through the dilation process and the erosion process before detecting a line. Consequently, it is possible to prevent a line from being detected as shorter than the original due to the gap (lack of image data). This allows detecting a feature point of input image data with high accuracy.

The image forming apparatus of the present invention includes any one of the image processing apparatuses and an image output section for forming an image corresponding to input image data on a recording material.

With the image forming apparatus, by regarding an intersection of line images as a feature point, it is possible to extract a large number of feature points from input image data read out from a document with little texts for example. Consequently, it is possible to appropriately specify input image data. Further, only extraction of line images and calculation of an intersection of the line images are required, so that it is possible to simplify an algorithm for calculation of feature points and to shorten a process time for the calculation, compared with a case of calculating feature points from input image data in accordance with plural kinds of elements such as texts, frames for test strings, frames, and lines indicative of frames.

Further, the image processing apparatus may be realized by a computer. At that time, an image processing program for causing a computer to realize the image processing apparatus by causing the computer to function as the feature point calculation section, and a computer-readable storage medium for storing the program, are also included in the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:
1. An image processing apparatus, comprising:
   a feature point calculator configured to calculate feature points included in input image data; and
   a features calculator configured to calculate features of the input image data in accordance with relative positions of the feature points calculated by the feature point calculator,
   the feature point calculator including:
   a line detector configured to detect, from the input image data, a line image extending in a first direction and a line image extending in a second direction that is different from the first direction, wherein the first direction is a first oblique direction that is oblique to lower right with respect to a horizontal direction of the input image data, and the second direction is a second oblique direction that is oblique to lower left with respect to the horizontal direction of the input image data, and wherein further the line detector is configured to detect a line image extending in a horizontal direction and a line image extending in a vertical direction; and
   an intersection calculator configured to calculate, as a feature point, an intersection of the line image extending in the first direction and the line image extending in the second direction, and also configured to detect an intersection of the line image extending in the horizontal direction and the line image extending in the vertical direction.
2. The image processing apparatus as set forth in claim 1, wherein
   the input image data is indicative of pixel values of a plurality of pixels arranged in a matrix manner,
   the line detector further includes:
      a first labeling labeler configured to perform a first labeling process in which a process of shifting a target pixel one by one from left to right in each of a plurality of lines each made of a plurality of pixels in a horizontal direction is serially performed from an upper line to a lower line, and one of plural kinds of first labels is assigned to each target pixel in accordance with a relation between a pixel value of the target pixel and pixel values of peripheral pixels of the target pixel;
      a first label counter configured to count the number of pixels to which a first label is assigned by the first labeler with respect to each kind of the first labels;
      a second labeling labeler configured to perform a second labeling process in which a process of shifting a target pixel one by one from right to left in each of a plurality of lines each made of a plurality of pixels in a horizontal direction is serially performed from an upper line to a lower line, and one of a plural kinds of first labels is assigned to each target pixel in accordance with a relation between a pixel value of the target pixel and pixel values of peripheral pixels of the target pixel; and
      a second label counter configured to count the number of pixels to which a second label is assigned by the second labeler with respect to each kind of the second labels, and
   (1) when a pixel value of a target pixel is less than a predetermined value, the first labeler is not configured to assign a first label to the target pixel, (2) when a pixel value of the target pixel is not less than the predetermined value and a first label is assigned to a pixel adjacent to a left side of the target pixel, the first labeler is configured to assign, to the target pixel, a first label of a same kind as that of the pixel adjacent to the left side of the target pixel, (3) when a pixel value of the target pixel is not less than the predetermined value and a first label is not assigned to a pixel adjacent to the left side of the target pixel and a first label is assigned to a pixel adjacent to an upper side of the target pixel, the first labeler is configured to assign, to the target pixel, a first label of a same kind as that of the pixel adjacent to the upper side of the target pixel, and (4) when a pixel value of the target pixel is not less than the predetermined value and a first label is not assigned to the pixels adjacent to the left side and the upper side of the target pixel, the first labeler is configured to assign, to the target pixel, a first label of a kind having not been assigned to other pixels, (a) when a pixel value of a target pixel is less than a predetermined value, the second labeler is not configured to assign a second label to the target pixel, (b) when a pixel value of the target pixel is not less than the predetermined value and a second label is assigned to a pixel adjacent to a right side of the target pixel, the second labeler is configured to assign, to the target pixel, a second label of a same kind as that of the pixel adjacent to the right side of the target pixel, (c) when a pixel value of the target pixel is not less than the predetermined value and a second label is not assigned to a pixel adjacent to the right side of the target pixel and a second label is assigned to a pixel adjacent to an upper side of the target pixel, the second labeler is configured to assign, to the target pixel, a second label of a same kind as that of the pixel adjacent to the upper side of the target pixel, and (d) when a pixel value of the target pixel is not less than the predetermined value and a second label is not assigned to the pixels adjacent to the right side and the upper side of the target pixel, the second labeler is configured to assign, to the target pixel, a second label of a kind having not been assigned to other pixels, the line detector is configured to detect, as a line image extending in a first direction, an image made of pixels to each of which a first label of a same kind has been assigned and the number of which counted by the first label counter is not less than the threshold value, and the line detector configured to detect, as a line image extending in a second direction, an image made of pixels to each of which a second label of a same kind has been assigned and the number of which counted by the second label counter is not less than the threshold value.

3. The image processing apparatus as set forth in claim 1, wherein the input image data is indicative of pixel values of a plurality of pixels arranged in a matrix manner, the line detector further includes:

a first labeling labeler configured to perform a first labeling process in which a process of shifting a target pixel one by one from left to right in each of a plurality of lines each made of a plurality of pixels in a horizontal direction is serially performed from an upper line to a lower line, and one of plural kinds of first labels is assigned to each target pixel in accordance with a relation between a pixel value of the target pixel and pixel values of peripheral pixels of the target pixel;

a first label start-end coordinate memory configured to store, with respect to each kind of first labels, start coordinates and end coordinates of a region made of pixels to each of which a first label is assigned by the first labeler;

a second labeling labeler configured to perform a second labeling process in which a process of shifting a target pixel one by one from right to left in each of a plurality of lines each made of a plurality of pixels in a horizontal direction is serially performed from an upper line to a lower line, and one of a plural kinds of second labels is assigned to each target pixel in accordance with a relation between a pixel value of the target pixel and pixel values of peripheral pixels of the target pixel; and a second label start-end coordinate memory configured to store, with respect to each kind of second labels, start coordinates and end coordinates of a region made of pixels to each of which a second label is assigned by the second labeler;

(1) when a pixel value of a target pixel is less than a predetermined value, the first labeling labeler is not configured to assign a first label to the target pixel, (2) when a pixel value of the target pixel is not less than the predetermined value and a first label is assigned to a pixel adjacent to a left, side of the target pixel, the first labeler is configured to assign, to the target pixel, a first label of a same kind as that of the pixel adjacent to the left side of the target pixel, (3) when a pixel value of the target pixel is not less than the predetermined value and a first label is not assigned to a pixel adjacent to the left side of the target pixel and a first label is assigned to a pixel adjacent to an upper side of the target pixel, the first labeler is configured to assign, to the target pixel, a first label of a same kind as that of the pixel adjacent to the upper side of the target pixel, and (4) when a pixel value of the target pixel is not less than the predetermined value and a first label is not assigned to the pixels adjacent to the left side and the upper side of the target pixel, the first labeler is configured to assign, to the target pixel, a first label of a kind having not been assigned to other pixels, (a) when a pixel value of a target pixel is less than a predetermined value, the second labeling labeler is not configured to assign a second label to the target pixel, (b) when a pixel value of the target pixel is not less than the predetermined value and a second label is assigned to a pixel adjacent to a right side of the target pixel, the second labeler is configured to assign, to the target pixel, a second label of a same kind as that of the pixel adjacent to the right side of the target pixel, (c) when a pixel value of the target pixel is not less than the predetermined value and a second label is not assigned to a pixel adjacent to the right side of the target pixel and a second label is assigned to a pixel adjacent to an upper side of the target pixel, the second labeler is configured to assign, to the target pixel, a second label of a same kind as that of the pixel adjacent to the upper side of the target pixel, and (d) when a pixel value of the target pixel is not less than the predetermined value and a second label is not assigned to the pixels adjacent to the right side and the upper side of the target pixel, the second labeler is configured to assign, to the target pixel, a second label of a kind having not been assigned to other pixels, the line detector configured to detect, as a line image extending in a first direction, an image made of pixels to which a first label of a same kind is assigned and whose distance between the start coordinates and the end coordinates of the first label that are stored in the first label start-end coordinate memory is not less than a threshold value, and the line detector configured to detect, as a line image extending in a second direction, an image made of pixels to which a second label of a same kind is assigned and whose distance between the start coordinates and the end coordinates of the second label that are stored in the second label start-end coordinate memory is not less than a threshold value.

4. The image processing apparatus as set forth in claim 1, wherein
the input image data is indicative of pixel values of a plurality of pixels arranged in a matrix manner,
the line detector further includes:
a first labeling labeler configured to perform a first labeling process in which a process of shifting a target pixel one by one from left to right in each of a plurality of lines each made of a plurality of pixels in a horizontal direction is serially performed from an upper line to a lower line, and one of plural kinds of first labels is assigned to each target pixel in accordance with a relation between a pixel value of the target pixel and pixel values of peripheral pixels of the target pixel;
a first label counter configured to count the number of pixels to which a first label is assigned by the first labeler with respect to each kind of the first labels;
a second labeling labeler configured to perform a second labeling process in which a process of shifting a target pixel one by one from right to left in each of a plurality of lines each made of a plurality of pixels in a horizontal direction is serially performed from an upper line to a lower line, and one of a plural kinds of first labels is assigned to each target pixel in accordance with a relation between a pixel value of the target pixel and pixel values of peripheral pixels of the target pixel; and
a second label counter configured to count the number of pixels to which a second label is assigned by the second labeler with respect to each kind of the second labels,
(1) when a pixel value of a target pixel is less than a predetermined value, the first labeling labeler is not configured to assign a first label to the target pixel, (2) when a pixel value of the target pixel is not less than the predetermined value and a first label is assigned to a pixel adjacent to a left side of the target pixel, the first labeler is configured to assign, to the target pixel, a first label of a same kind as that of the pixel adjacent to the left side of the target pixel, (3) when a pixel value of the target pixel is not less than the predetermined value and a first label is not assigned to a pixel adjacent to the left side of the target pixel and a first label is assigned to a pixel adjacent to an upper side of the target pixel, the first labeler is configured to assign, to the target pixel, a first label of a same kind as that of the pixel adjacent to the upper side of the target pixel, (4) when a pixel value of the target pixel is not less than the predetermined value and a first label is not assigned to the pixels adjacent to the left side and the upper side of the target pixel and a first label is assigned to a pixel adjacent to an upper left side of the target pixel, the first labeler is configured to assign, to the target pixel, a first label of a same kind as that of the pixel adjacent to the upper left side of the target pixel, and (5) when a pixel value of the target pixel is not less than the predetermined value and a first label is not assigned to the pixels adjacent to the left side, the upper side, and the upper left side of the target pixels, the first labeler is configured to assign, to the target pixel, a first label of a kind having not been assigned to other pixels,
(a) when a pixel value of a target pixel is less than a predetermined value, the second labeling labeler is not configured to assign a second label to the target pixel, (b) when a pixel value of the target pixel is not less than the predetermined value and a second label is assigned to a pixel adjacent to a right side of the target pixel; the second labeler is configured to assign, to the target pixel, a second label of a same kind as that of the pixel adjacent to the right side of the target pixel, (c) when a pixel value of the target pixel is not less than the predetermined value and a second label is not assigned to a pixel adjacent to the right side of the target pixel and a second label is assigned to a pixel adjacent to an upper side of the target pixel, the second labeler is configured to assign, to the target pixel, a second label of a same kind as that of the pixel adjacent to the upper side of the target pixel, (d) when a pixel value of the target pixel is not less than the predetermined value and a second label is not assigned to the pixels adjacent to the right side and the upper side of the target pixel and a second label is assigned to a pixel adjacent to an upper right side of the target pixel, the second labeler is configured to assign, to the target pixel, a second label of a same kind as that of the pixel adjacent to the upper right side of the target pixel, and (e) when a pixel value of the target pixel is not less than the predetermined value and a second label is not assigned to the pixels adjacent to the right side, the upper side, and the upper right side of the target pixels, the second labeler is configured to assign, to the target pixel, a second label of a kind having not been assigned to other pixels,
the line detector configured to detect, as a line image extending in a first direction, an image made of pixels to each of which a first label of a same kind has been assigned and the number of which counted by the first label counter is not less than the threshold value, and
the line detector configured to detect, as a line image extending in a second direction, an image made of pixels to each of which a second label of a same kind has been assigned and the number of which counted by the second label counter is not less than the threshold value.

5. The image processing apparatus as set forth in claim 1, wherein
the input image data is indicative of pixel values of a plurality of pixels arranged in a matrix manner,
the line detector further includes:
a first labeling labeler configured to perform a first labeling process in which a process of shifting a target pixel one by one from left to right in each of a plurality of lines each made of a plurality of pixels in a horizontal direction is serially performed from an upper line to a lower line, and one of plural kinds of first labels is assigned to each target pixel in accordance with a relation between a pixel value of the target pixel and pixel values of peripheral pixels of the target pixel;
a first label start-end coordinate memory configured to store, with respect to each kind of first labels, start coordinates and end coordinates of pixels to each of which a first label is assigned by the first labeler;
a second labeling labeler configured to perform a second labeling process in which a process of shifting a target pixel one by one from right to left in each of a plurality of lines each made of a plurality of pixels in a horizontal direction is serially performed from an upper line to a lower line, and one of a plural kinds of second labels is assigned to each target pixel in accordance with a relation between a pixel value of the target pixel and pixel values of peripheral pixels of the target pixel; and a second label start-end coordinate memory configured to store, with respect to each kind of second labels, start coordinates and end coordinates of pixels to each of which a second label is assigned by the second labeler;

(1) when a pixel value of a target pixel is less than a predetermined value, the first labeling labeler is not configured to assign a first label to the target pixel, (2) when a pixel value of the target pixel is not less than the predetermined value and a first label is assigned to a pixel adjacent to a left side of the target pixel, the first labeler is configured to assign, to the target pixel, a first label of a same kind as that of the pixel adjacent to the left side of the target pixel, (3) when a pixel value of the target pixel is not less than the predetermined value and a first label is not assigned to a pixel adjacent to the left side of the target pixel and a first label is assigned to a pixel adjacent to an upper side of the target pixel, the first labeler is configured to assign, to the target pixel, a first label of a same kind as that of the pixel adjacent to the upper side of the target pixel, (4) when a pixel value of the target pixel is not less than the predetermined value and a first label is not assigned to the pixels adjacent to the left side and the upper side of the target pixel and a first label is assigned to a pixel adjacent to an upper left side of the target pixel, the first labeler is configured to assign, to the target pixel, a first label of a same kind as that of the pixel adjacent to the upper left side of the target pixel, and (5) when a pixel value of the target pixel is not less than the predetermined value and a first label is not assigned to the pixels adjacent to the left side, the upper side, and the upper left side of the target pixels, the first labeler is configured to assign, to the target pixel, a first label of a kind having not been assigned to other pixels, (a) when a pixel value of a target pixel is less than a predetermined value, the second labeling labeler is not configured to assign a second label to the target pixel, (b) when a pixel value of the target pixel is not less than the predetermined value and a second label is assigned to a pixel adjacent to a right side of the target pixel, the second labeler is configured to assign, to the target pixel, a second label of a same kind as that of the pixel adjacent to the right side of the target pixel, (c) when a pixel value of the target pixel is not less than the predetermined value and a second label is not assigned to a pixel adjacent to the right side of the target pixel and a second label is assigned to a pixel adjacent to an upper side of the target pixel, the second labeler is configured to assign, to the target pixel, a second label of a same kind as that of the pixel adjacent to the upper side of the target pixel, (d) when a pixel value of the target pixel is not less than the predetermined value and a second label is not assigned to the pixels adjacent to the right side and the upper side of the target pixel and a second label is assigned to a pixel adjacent to an upper right side of the target pixel, the second labeler is configured to assign, to the target pixel, a second label of a same kind as that of the pixel adjacent to the upper right side of the target pixel, and (e) when a pixel value of the target pixel is not less than the predetermined value and a second label is not assigned to the pixels adjacent to the right side, the upper side, and the upper right side of the target pixels, the second labeler is configured to assign, to the target pixel, a second label of a kind having not been assigned to other pixels, the line detector is configured to detect, as a line image extending in a first direction, an image made of pixels to which a first label of a same kind is assigned and whose distance between the start, coordinates and the end coordinates of the first label that are stored in the first label start-end coordinate memory is not less than a threshold value, and the line detector is configured to detect, as a line image extending in a second direction, an image made of pixels to which a second label of a same kind is assigned and whose distance between the start coordinates and the end coordinates of the second label that are stored in the second label start-end coordinate memory is not less than a threshold value.

6. The image processing apparatus as set forth in claim 1, wherein the line detector is configured to perform a process of detecting line images extending in a horizontal direction and a vertical direction before performing a process of detecting line images extending in the first direction and the second direction, and in a case where the number of intersections of line images extending in horizontal and vertical directions is not less than a predetermined value, the intersection calculator is configured to not detect the line images extending in the first direction and the second direction.

7. The image processing apparatus as set forth in claim 1, wherein the intersection calculator includes an instruction input from which a user inputs an instruction, and in accordance with the instruction, it is configured to judge whether to perform a process of detecting the line images extending in the first direction and the second direction.

8. An image processing apparatus, comprising:

a feature point calculator configured to calculate feature points included in input image data; and a features calculator configured to calculate features of the input image data in accordance with relative positions of the feature points calculated by the feature point calculator, the feature point calculator including:

a line detector configured to detect, from the input image data, a line image extending in a first direction and a line image extending in a second direction that is different from the first direction, wherein the first direction is a first oblique direction that is oblique to lower right with respect to a horizontal direction of the input image data, and the second direction is a second oblique direction that is oblique to lower left with respect to the horizontal direction of the input image data, and wherein further the line detector is configured to detect a line image extending in a horizontal direction and a line image extending in a vertical direction; and an intersection calculator configured to calculate, as a feature point, an intersection of the line image extending in the first direction and the line image extending in the second direction, and also configured to detect an intersection of the line image extending in the horizontal direction and the line image extending in the vertical direction, wherein further in a case where an intersection of the line image extending in the first direction and the line image extending in the second direction is made of a plurality of pixels, the intersection calculator is configured to calculate, as the feature point, centric coordinates, barycentric coordinates, or coordinates of a predetermined position in a region consisting of the pixels.

9. The image processing apparatus as set forth in claim 1, wherein the intersection calculator is configured to calculate an equation of a line corresponding to a line image extending in the first direction and an equation of a line corresponding to a line image extending in the second direction, to calculate an intersection of the lines in accordance with the equations, and to calculate, as the feature point, coordinates corresponding to the calculated intersection.

10. The image processing apparatus as set forth in claim 1, further comprising:

a non-transitory memory in which identification information for identifying a reference image is stored in such a manner that the identification information is related to features oldie reference image; and a similarity determination component configured to determine a similarity between an input image and the reference image in accordance with the features of the input image data calculated by the features calculator and the features of the reference image stored in the non-transitory memory.

11. The image processing apparatus as set forth in claim 1, further comprising:

a skew detector configured to detect a skew angle of a document image included in the input image data; and a skew corrector configured to correct a skew of the document image in accordance with the skew angle detected by the skew detector, input image data having been subjected to the skew correction being input to the intersection calculator.

12. An image processing apparatus, comprising:

a feature point calculator configured to calculate feature points included in input image data; and a features calculator configured to calculate features of the input image data in accordance with relative positions of the feature points calculated by the feature point calculator, the feature point calculator including:

a line detector configured to detect, from the input image data, a line image extending in a first direction and a line image extending in a second direction that is different from the first direction; and an intersection calculator configured to calculate, as a feature point, an intersection of the line image extending in the first direction and the line image extending in the second direction;

a dilation component configured to perform a dilation process in which the number of a black pixel included in a target pixel and peripheral pixels of the target pixel in the input image data is counted, and a target pixel whose count value is not less than a first threshold value is regarded as a black pixel and a target pixel whose count value is less than the first threshold value is regarded as a white pixel; and an erosion component configured to perform an erosion process in which the number of a white pixel included in a target pixel and peripheral pixels of the target pixel in the input image data subjected to the dilation process is counted, and a target pixel whose count value is not less than a second threshold value is regarded as a white pixel and a target pixel whose count value is less than the second threshold value is regarded as a black pixel, the input image data subjected to the erosion process being input to the intersection calculator.

13. An image forming apparatus, comprising:

an image processing apparatus, including a feature point calculator configured to calculate feature points included in input image data, and a features calculator configured to calculate features of the input image data in accordance with relative positions of the feature points calculated by the feature point calculator, the feature point calculator including, a line detector configured to detect, from the input image data, a line image extending in a first direction and a line image extending in a second direction that is different from the first direction, wherein the first direction is a first oblique direction that is oblique to lower right with respect to a horizontal direction of the input image data, and the second direction is a second oblique direction that is oblique to lower left with respect to the horizontal direction of the input image data, wherein the line detector is further configured to detect a line image extending in a horizontal direction and a line image extending in a vertical direction;

an intersection calculator configured to calculate, as a feature point, an intersection of the line image extending in the first direction and the line image extending in the second direction, and also configured to calculate an intersection of the line image extending in the horizontal direction and the line image extending in the vertical direction; and an image output for forming an image corresponding to input image data on a recording material.

14. An image processing method for calculating feature points of input image data and calculating features of the input image data in accordance with relative positions of the calculated feature points, the method comprising the steps of:

detecting, from the input image data, a line image extending in a first direction and a line image extending in a second direction that is different from the first direction, wherein the first direction is a first oblique direction that is oblique to lower right with respect to a horizontal direction of the input image data, and the second direction is a second oblique direction that is oblique to lower left with respect to the horizontal direction of the input image data;

detecting a line image extending in a horizontal direction and a line image extending in a vertical direction;

calculating, as a feature point, an intersection of the line image extending in the first direction and a the line image extending in the second direction, and calculating an intersection of the line image extending in the horizontal direction and the line image extending in the vertical direction.

15. An image processing system, comprising:

an image processing apparatus; and a server communicably connected with the image processing apparatus, including a feature point calculator configured to calculate feature points of input image data and a features calculator configured to calculate features of the input image data in accordance with relative positions of the feature points calculated by the feature point calculator being included in the image processing, apparatus or the server, or being divided into the image processing apparatus and the server, the feature point calculator including a line detector configured to detect a line image extending in a first direction and a line image extending in a second direction that is different from the first direction, wherein the first direction is a first oblique direction that is oblique to lower right with respect to a horizontal direction of the input image data, and the second direction is a second oblique direction that is oblique to lower left with respect to the horizontal direction of the input image data, wherein the line detector is further configured to detect a line image extending in a horizontal direction and a line image extending in a vertical direction, and an intersection calculator configured to calculate, as a feature point, an intersection of the line image extending in the first direction and the line image extending in the second direction, and also configured to calculate an intersection of the line image extending in the horizontal direction and the line image extending in the vertical direction.

16. A non-transitory computer-readable storage medium for storing computer-executable instructions thereon that when executed cause an image processing apparatus to operate, the image processing apparatus including a feature point calculator configured to calculate feature points included in input image data, and a features calculator configured to calculate features of the input image data in accordance with relative positions of the feature points calculated by the feature point calculator, the feature point calculator including:

a line detector configured to detect, from the input image data, a line image extending in a first direction and a line image extending in a second direction that is different from the first direction, wherein the first direction is a first oblique direction that is oblique to lower right with respect to a horizontal direction of the input image data, and the second direction is a second oblique direction that is oblique to lower left with respect to the horizontal direction of the input image data, wherein further the line detector is configured to detect a line image extending in a horizontal direction and a line image extending in a vertical direction; and an intersection calculator configured to calculate, as a feature point, an intersection of the line image extending in the first direction and the line image extending in the second direction, and also configured to calculate an intersection of the line image extending in the horizontal direction and the line image extending in the vertical direction, the computer-executable instructions causing a computer to function as the feature point calculator.

* * * * *